United States Patent
Takenaka et al.

(10) Patent No.: US 9,162,726 B2
(45) Date of Patent: Oct. 20, 2015

(54) MOBILE VEHICLE

(71) Applicant: HONDA MOTOR CO., LTD., Tokyo (JP)

(72) Inventors: Toru Takenaka, Wako (JP); Kazushi Akimoto, Wako (JP); Hiroshi Gomi, Wako (JP); Yusuke Yamamoto, Wako (JP); Takashi Kudo, Wako (JP); Makoto Araki, Wako (JP); Yoshiki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/199,363

(22) Filed: Mar. 6, 2014

(65) Prior Publication Data
US 2014/0265224 A1   Sep. 18, 2014

(30) Foreign Application Priority Data

Mar. 12, 2013  (JP) .................................. 2013-049718

(51) Int. Cl.
*B62K 23/00* (2006.01)
*B62K 21/10* (2006.01)

(52) U.S. Cl.
CPC ....................................... *B62K 21/10* (2013.01)

(58) Field of Classification Search
CPC ................................. B62K 21/00; B62K 23/00
USPC .................................................. 180/219, 223
See application file for complete search history.

(56) References Cited

U.S. PATENT DOCUMENTS

| 4,600,207 A | * | 7/1986 | Zosi ............................. 280/279 |
| 4,624,470 A | * | 11/1986 | Love ............................ 280/279 |
| 2013/0066522 A1 | * | 3/2013 | Haas et al. ..................... 701/41 |

FOREIGN PATENT DOCUMENTS

| JP | 07-215258 | 8/1995 |
| JP | 4181113 | 9/2008 |
| JP | 2008-260316 | 10/2008 |
| JP | 2008260316 A | * 10/2008 |
| JP | 2011-073624 | 4/2011 |
| JP | 2012-076490 | 4/2012 |
| JP | 2012-076502 | 4/2012 |
| JP | 2012-076511 | 4/2012 |
| WO | 03/090979 | 11/2003 |

* cited by examiner

*Primary Examiner* — Joseph Rocca
*Assistant Examiner* — Felicia L Brittman
(74) *Attorney, Agent, or Firm* — Rankin, Hill & Clark LLP

(57) ABSTRACT

A mobile vehicle 1A includes a front-wheel support mechanism 4 having a trail adjustment mechanism 9, a steering actuator 8 which generates a steering force for steering a front wheel 3*f*, a trail adjustment actuator 15 which generates a driving force for changing a trail of the front wheel 3*f*, and a control device 50. The control device 50 has a function of controlling the steering actuator 8 so as to stabilize the posture of a vehicle body 2, and a function of controlling the trail adjustment actuator 15 in accordance with an observed value of the vehicle speed.

15 Claims, 27 Drawing Sheets

BALANCE-ASSIST-ON/TRAVEL-ASSIST-OFF MODE PROCESSING

MOBILE VEHICLE

BACKGROUND OF THE INVENTION

1. Field of the Invention

The present invention relates to a mobile vehicle (mobile object) such as a two-wheeled vehicle having a front wheel and a rear wheel.

2. Description of the Related Art

In a mobile vehicle, for example a motorcycle, having a front wheel and a rear wheel arranged spaced apart from each other in the longitudinal direction of the vehicle body, the front wheel usually serves as a steered wheel.

Further, a motorcycle in which the rear wheel is made steerable, in addition to the front wheel, is also known as seen, for example, in Japanese Patent Application Laid-Open No. 2008-260316 (hereinafter, referred to as "Patent Literature 1"). In the motorcycle of this Patent Literature 1, the rear wheel is steered as appropriate, in accordance with the traveling conditions, to improve the turning performance, for example, of the vehicle.

In a motorcycle of this type, the steering axis of the front wheel (rotational axis of steering of the front wheel) is generally arranged such that the point of intersection of the steering axis and the ground surface with which the wheels come into contact lies in front of the ground contact point of the front wheel (i.e. such that the trail becomes positive).

SUMMARY OF THE INVENTION

For a two-wheeled vehicle such as a motorcycle, it is desired to enhance the stability of the posture of the vehicle body particularly when the vehicle is stopped.

On the other hand, during a high-speed traveling of the two-wheeled vehicle, it is desirable that a rider can readily control the posture of the vehicle body by banking the vehicle body in the roll direction, for example, at the time of turning of the two-wheeled vehicle.

In view of the foregoing, it is an object of the present invention to provide a mobile vehicle which can enhance the stability of the posture of the vehicle body at a standstill and which also allows a rider to readily control the posture of the vehicle body during a high-speed traveling.

To achieve the above object, a mobile vehicle according to the present invention is a mobile vehicle having a vehicle body and a front wheel and a rear wheel arranged spaced apart from each other in a longitudinal direction of the vehicle body, the front wheel being a steered wheel which can be steered about a steering axis, wherein the mobile vehicle includes:

a front-wheel support mechanism configured to support the front wheel so as to be steerable about the steering axis and having a trail adjustment mechanism which makes a trail of the front wheel adjustable;

a steering actuator which generates a steering force for steering the steered wheel;

a trail adjustment actuator which generates a driving force for changing the trail of the front wheel; and a control device which controls the steering actuator and the trail adjustment actuator, wherein the control device is configured to include a steering control section which controls the steering actuator so as to stabilize a posture of the vehicle body in accordance with at least an observed value of an inclination angle in a roll direction of the vehicle body, and a trail control section which controls the trail adjustment actuator in accordance with an observed value of a vehicle speed of the mobile vehicle such that at least the trail in a case where the observed value of the vehicle speed is zero becomes smaller than the trail in a case where the observed value of the vehicle speed is greater than a first prescribed speed (a first aspect of the invention).

It should be noted that, in the first aspect of the invention, "to stabilize (the) posture of the vehicle body" means to generate a moment (in the roll direction) that acts on the mobile vehicle so as to make the posture in the roll direction of the vehicle body converge to, or approach, a desired posture.

Further, in the first aspect of the invention, the trail of the front wheel means a distance between the ground contact point of the front wheel and the point of intersection of the ground surface and the steering axis of the front wheel in a basic posture state of the mobile vehicle. The "basic posture state" is, specifically, the state in which the front wheel and the rear wheel are both stationary in an upright posture in contact with a flat ground surface and in which the axle centerlines (centers of rotational axes) of the front wheel and the rear wheel extend in parallel with each other in the direction orthogonal to the longitudinal direction of the vehicle body.

In this case, the polarity of the trail is defined to be positive when the point of intersection of the steering axis of the front wheel and the ground surface lies in front of the ground contact point of the front wheel, and it is defined to be negative when the point of intersection of the steering axis of the front wheel and the ground surface lies behind the ground contact point of the front wheel.

The present inventors have found, through various experiments and studies, that steering the front wheel of the mobile vehicle makes it possible to cause a moment in the roll direction to act on the vehicle body, and that, in this case, the magnitude or direction of the moment generated in accordance with the steering of the front wheel has dependency on the trail of the front wheel.

As will be described later in detail, according to the experiments and studies conducted by the present inventors, in order to cause an appropriate moment for stabilizing the posture of the vehicle body to act on the vehicle body by the steering of the front wheel, it is preferable that the trail takes a value (including zero or a negative value) that is smaller than a certain positive value. Further, the moment that can be generated per unit amount of change of the steering angle of the front wheel becomes larger as the trail becomes smaller (in the case of a negative trail, as the absolute value becomes larger).

In a situation where stabilization of the posture of the vehicle body is highly demanded, as in the case where the mobile vehicle is at a standstill, it is desirable that a sufficient moment can be generated sensitively by the steering of the front wheel for stabilizing the posture. Therefore, in such a situation, a trail of a relatively small value is preferable. A negative trail is further preferable.

On the other hand, in a situation where the mobile vehicle is traveling at a vehicle speed of a certain level or higher, setting a trail to a prescribed positive value can improve the operation stability, as known as general characteristics of two-wheeled vehicles.

When the trail is set in the above-described manner, if the mobile vehicle leans in the situation where it is traveling at a vehicle speed of a certain level or higher, a self-steering function works to restore the posture of the vehicle body, without the need to cause the aforesaid steering actuator to generate a steering force for steering the front wheel. This effect leads to improved operation stability.

Conversely, in this case, if the control is performed to cause the steering actuator to generate a large steering force, the rider may have a sense of discomfort when maneuvering the vehicle body of the mobile vehicle by shifting the body weight or manipulating the operation apparatus. Therefore, in the situation where the mobile vehicle is traveling at a vehicle speed of a certain level or higher, it is desirable that the trail is set to a prescribed positive value and that the operation of stabilizing the posture of the vehicle body by the steering actuator is restricted.

In view of the foregoing, the mobile vehicle of the first aspect of the invention is configured such that the front wheel can be steered by the steering force of the steering actuator. Further, the mobile vehicle is configured such that the trail of the front wheel can be adjusted by the trail adjustment actuator.

Further, the control device is configured to include: the steering control section which controls the steering actuator so as to stabilize the posture of the vehicle body in accordance with at least the observed value of the inclination angle in the roll direction of the vehicle body; and the trail control section which controls the trail adjustment actuator, in accordance with the observed value of the vehicle speed of the mobile vehicle, such that at least the trail in the case where the observed value of the vehicle speed is zero becomes smaller than the trail in the case where the observed value of the vehicle speed is greater than a first prescribed speed.

According to the first aspect of the invention, in the case where the observed value of the vehicle speed of the mobile vehicle is zero, i.e. when the mobile vehicle is at a standstill, the actual trail of the front wheel becomes relatively small (for example, it takes a negative value). Therefore, a moment in the roll direction appropriate for stabilizing the posture of the vehicle body can be generated by controlling the steering actuator by the steering control section.

In the case where the observed value of the vehicle speed is greater than the first prescribed speed, i.e. when the mobile vehicle is traveling at a vehicle speed in a relatively high-speed range, the actual trail of the front wheel becomes relatively large (for example, it takes a positive value). This enables the self-steering function to work appropriately, resulting in improved operation stability. Consequently, the rider can readily and freely operate the vehicle body by him/herself.

Therefore, according to the first aspect of the invention, it is possible to enhance the stability of the posture of the vehicle body at a standstill, and also allow the rider to readily control the posture of the vehicle body during a high-speed traveling.

In the first aspect of the invention, it is preferable that the trail control section is configured to control the trail adjustment actuator such that the trail takes a prescribed positive value in the case where the observed value of the vehicle speed is greater than the first prescribed speed (a second aspect of the invention).

According to the second aspect of the invention, the actual trail becomes positive in the case where the mobile vehicle is traveling at a vehicle speed in a relatively high-speed range. This can further improve the operation stability of the mobile vehicle.

Further, in the first or second aspect of the invention, the trail control section is configured, for example, to control the trail adjustment actuator to make the trail match a prescribed upper trail limit in the case where the observed value of the vehicle speed is greater than the first prescribed speed, and control the trail adjustment actuator to make the trail match a prescribed lower trail limit which is smaller than the upper trail limit in the case where the observed value of the vehicle speed is zero.

In this case, it is preferable that the trail control section is configured to control the trail adjustment actuator to make the trail match the lower trail limit while the observed value of the vehicle speed increases from zero to the first prescribed speed, control the trail adjustment actuator to make the trail match the upper trail limit when the observed value of the vehicle speed has exceeded the first prescribed speed and until the observed value of the vehicle speed drops below a second prescribed speed which is smaller than the first prescribed speed, and control the trail adjustment actuator to make the trail match the lower trail limit when the observed value of the vehicle speed has dropped below the second prescribed speed (a third aspect of the invention).

According to the third aspect of the invention, in the case where the observed value of the vehicle speed is in a high-speed range (at least greater than the first prescribed speed), the trail of the front wheel is controlled to match the upper trail limit. Further, in the case where the observed value of the vehicle speed is in a low-speed range (at least smaller than the second prescribed speed (including zero)), the trail of the front wheel is controlled to match the lower trail limit.

As the observed value of the vehicle speed increases (during acceleration), the trail is switched from the lower trail limit to the upper trail limit at the time when the observed value has exceeded the first prescribed speed. On the other hand, as the observed value of the vehicle speed decreases (during deceleration), the trail is switched from the upper trail limit to the lower trail limit at the time when the observed value has dropped below the second prescribed speed (<first prescribed speed).

Accordingly, during the acceleration and deceleration of the mobile vehicle, the trail is switched so as to have hysteresis characteristics with respect to the change in vehicle speed. This can prevent the trail from being switched frequently between the upper trail limit and the lower trail limit in the situation where the mobile vehicle is traveling at a vehicle speed near the first or second prescribed speed.

Further, in the first or second aspect of the invention, the trail control section may be configured to successively determine a desired trail as a desired value of the trail such that the desired trail changes continuously between a prescribed upper trail limit and a prescribed lower trail limit which is smaller than the upper trail limit in accordance with the observed value of the vehicle speed, and such that the desired trail becomes larger as the observed value of the vehicle speed becomes larger, and the trail control section may be configured to control the trail adjustment actuator to make an actual trail track the desired trail (a fourth aspect of the invention).

According to the fourth aspect of the invention, it is possible to control the actual trail to a trail suitable for each vehicle speed of the mobile vehicle. The trail may take a value intermediate between the upper trail limit and the lower trail limit.

In the third aspect of the invention, it is preferable that the mobile vehicle further includes a lock mechanism operable, at least in a state where the trail matches the upper trail limit, to lock a mobile section which is included in the trail adjustment mechanism and which moves in conjunction with a change of the trail (a fifth aspect of the invention). The same applies to the above-described fourth aspect of the invention (a sixth aspect of the invention).

According to the fifth or sixth aspect of the invention, in the state where the trail matches the upper trail limit, i.e. while the mobile vehicle is traveling at a vehicle speed in a high-speed range, the mobile section is locked by the lock mechanism. Accordingly, the trail can be mechanically maintained at the upper trail limit, without the need of the control by the trail adjustment actuator.

This can increase the robustness of the function of maintaining the trail during the high-speed traveling of the mobile vehicle. This can also reduce the energy consumption by the trail adjustment actuator.

In the first through sixth aspects of the invention, it is preferable that the steering control section is configured to control the steering actuator so as to stabilize controlled state quantities for stabilizing the posture of the vehicle body, wherein the controlled state quantities include a motional state quantity of an inclination state quantity which is a prescribed kind of state quantity having a value responsive to the inclination angle in the roll direction of the vehicle body and a motional state quantity of a steering angle of the front wheel (a seventh aspect of the invention).

It should be noted that, in the seventh aspect of the invention, "to stabilize (the) controlled state quantities" means to generate a moment (in the roll direction) that acts on the mobile vehicle so as to make the actual values of the controlled state quantities converge to, or approach, prescribed desired values (for example, values in the aforesaid basic posture state).

Further, for the "motional state quantity of (the) inclination state quantity" in the seventh aspect of the invention, for example, one or both of the value of the "inclination state quantity" as it is and a temporal change rate thereof may be adopted. Similarly, for the "motional state quantity of (the) steering angle", for example, one or both of the value of the "steering angle" as it is and a temporal change rate thereof may be adopted.

Further, for the "inclination state quantity", the inclination angle in the roll direction of the vehicle body may be adopted. Alternatively, the state quantity related to the position in the horizontal direction of an inverted pendulum mass point which will be described below (for example, the position in the horizontal direction of the inverted pendulum mass point, or the amount of relative movement in the horizontal direction of the inverted pendulum mass point with respect to a given reference position, or the inclination angle in the roll direction of the line segment connecting the inverted pendulum mass point and a given reference point) may be adopted.

Here, generally, dynamics of the mobile vehicle may be equivalently transformed to a dynamics model which is expressed by dynamics of a mass point system which is made up of an inverted pendulum mass point and a ground surface mass point, wherein the inverted pendulum mass point moves in a horizontal direction above a ground surface, with which the mobile vehicle comes into contact, in accordance with the inclination angle in the roll direction of the vehicle body and the steering angle of the steered wheel, and wherein the ground surface mass point moves horizontally on the ground surface, with which the mobile vehicle comes into contact, in accordance with the steering angle of the steered wheel, independently of the inclination angle in the roll direction of the vehicle body. The above-described "inverted pendulum mass point" related to the "inclination state quantity" in the seventh aspect of the invention means the inverted pendulum mass point in the dynamics model obtained by the equivalent transformation.

Therefore, the motional state quantity of the inverted pendulum mass point in the case where the dynamics of the mobile vehicle is equivalently transformed to the dynamics model which is expressed by the dynamics of the mass point system made up of the inverted pendulum mass point, which moves in the horizontal direction above the ground surface, with which the mobile vehicle comes into contact, in accordance with the inclination angle in the roll direction of the vehicle body and the steering angle of the steered wheel, and the ground surface mass point, which moves horizontally on the ground surface, with which the mobile vehicle comes into contact, in accordance with the steering angle of the steered wheel, independently of the inclination angle in the roll direction of the vehicle body, may be adopted as the "motional state quantity of (the) inclination state quantity" in the seventh aspect of the invention.

According to the seventh aspect of the invention, it is possible to perform the control such that the motional state quantity of the inclination state quantity and the motional state quantity of the steering angle of the front wheel both converge to, or approach, the desired values. This can effectively stabilize the posture of the vehicle body of the mobile vehicle, including the steered state of the front wheel.

In the seventh aspect of the invention, it is preferable that in the case where a steering angular acceleration of the front wheel steered by the steering actuator or a torque about the steering axis applied to the front wheel from the steering actuator is defined as a reference quantity, the steering control section is configured to control the steering actuator such that a sensitivity Ra of the change in value of the reference quantity to the change in observed value of the motional state quantity of the inclination state quantity included in the controlled state quantities changes in accordance with the trail, with a characteristic that the sensitivity Ra becomes higher as the trail becomes larger (an eighth aspect of the invention).

According to the various experiments and studies conducted by the present inventors, the moment in the roll direction which can be generated per unit change amount of the steering angle of the front wheel becomes larger as the trail of the front wheel becomes smaller, as stated above. Conversely, when the trail of the front wheel is large, compared to when it is small, it becomes harder to generate the moment in the roll direction for stabilizing the posture of the vehicle body with respect to a unit change amount of the steering angle of the front wheel.

In view of the foregoing, in the eighth aspect of the invention, the steering control section controls the steering actuator such that the sensitivity Ra of the change in value of the reference quantity changes, in accordance with the trail, with the characteristic that the sensitivity Ra becomes higher as the trail becomes larger. With this configuration, in the state where the trail is controlled to be small, the moment in the roll direction which is generated in response to the steering of the front wheel by the steering actuator can be prevented from becoming too large. In the state where the trail is controlled to be relatively large, the moment in the roll direction generated in response to the steering of the front wheel by the steering actuator can be prevented from becoming too small.

It should be noted that in the eighth aspect of the invention, in the case where the motional state quantity of the inclination state quantity includes both of the value of the inclination state quantity and a temporal change rate thereof, the above-described sensitivity Ra means the sensitivity for each of the value of the inclination state quantity and the temporal change rate thereof.

In the seventh aspect of the invention, it is preferable that in the case where a steering angular acceleration of the front wheel steered by the steering actuator or a torque about the steering axis applied to the front wheel from the steering actuator is defined as a reference quantity, the steering control section is configured to control the steering actuator such that a sensitivity Rb of the change in value of the reference quantity to the change in observed value of the motional state quantity of the steering angle of the front wheel, included in the controlled state quantities, changes in accordance with the observed value of the vehicle speed, with a characteristic that the sensitivity Rb becomes lower as the vehicle speed becomes higher (a ninth aspect of the invention).

According to the ninth aspect of the invention, in the state where the mobile vehicle is traveling at a vehicle speed in a high-speed range, even if the actual steering angle of the front wheel deviates from a required or desired value, the steering of the front wheel by the steering actuator is restricted. This allows the rider to more easily operate the mobile vehicle according to the rider's preferences in the state where the mobile vehicle is traveling at a vehicle speed in a high-speed range.

It should be noted that the eighth aspect and the ninth aspect of the invention may be combined.

In the eighth aspect of the invention, it is preferable that the steering control section is configured to control the steering actuator such that the sensitivity Ra of the change in value of the reference quantity to the change in observed value of the motional state quantity of the inclination state quantity changes in accordance with the observed value of the vehicle speed, with a characteristic that the sensitivity Ra becomes lower as the vehicle speed becomes higher (a tenth aspect of the invention). The same applies to the above-described ninth aspect of the invention (an eleventh aspect of the invention).

With this configuration, when the observed value of the vehicle speed of the mobile vehicle is in a high-speed range, even if the inclination state quantity deviates from a required or desired value, the steering of the front wheel by the steering actuator is restricted as compared to when the observed value of the vehicle speed is in a low-speed range.

Therefore, in the case where a rider is riding the mobile vehicle at a vehicle speed in a high-speed range, the rider can readily bank the vehicle body of the mobile vehicle for turning.

On the other hand, while the mobile vehicle is stopped or traveling at a vehicle speed in a low-speed range, in the case where the inclination state quantity deviates from the desired value, the steering of the front wheel by the steering actuator is performed aggressively to eliminate the deviation, as compared to when the vehicle speed of the mobile vehicle is in a high-speed range. Consequently, the posture of the vehicle body can be stabilized autonomously, without the need of skillful operation by the rider.

Further, in the eighth aspect of the invention, it is preferable that the steering control section is configured to control the steering actuator such that the sensitivity Ra of the change in value of the reference quantity to the change in observed value of the motional state quantity of the inclination state quantity changes in accordance with an observed value of the steering angle of the front wheel, with a characteristic that the sensitivity Ra becomes lower as a magnitude of the steering angle of the front wheel becomes larger (a twelfth aspect of the invention). The same applies to the above-described ninth aspect of the invention (a thirteenth aspect of the invention).

Specifically, in the case where the magnitude of the actual steering angle of the front wheel is large, compared to the case where it is small, the radius of curvature of the ground contact part of the front wheel as seen in a cross section including the ground contact point of the front wheel and having a normal direction corresponding to the longitudinal direction of the vehicle body generally becomes larger.

Therefore, in the case where the magnitude of the actual steering angle of the front wheel is large, compared to the case where it is small, the change in movement amount of the ground contact point of the front wheel according to the change in the steering angle becomes larger. Because of this, the moment in the roll direction which is generated according to a unit amount of change of the actual steering angle of the front wheel changes in accordance with the actual steering angle of the front wheel. Therefore, if it is configured such that the aforesaid sensitivity Ra is independent of the actual steering angle of the front wheel, oscillation is likely to occur in the control of the posture of the vehicle body when the steering angle is relatively large.

In view of the foregoing, in the twelfth or thirteenth aspect of the invention, it has been configured such that the sensitivity Ra changes in accordance with the observed value of the steering angle of the front wheel, as described above. This configuration can prevent the above-described oscillation even in the case where the magnitude of the actual steering angle of the front wheel is large. Consequently, it is possible to secure high robustness in the posture control of the vehicle body of the mobile vehicle over a wide steering range of the front wheel.

It should be noted that the configuration of the twelfth aspect of the invention may be combined with the tenth or eleventh aspect of the invention.

In the eighth aspect of the invention, it is preferable that the steering control section is configured to control the steering actuator such that the sensitivity Ra of the change in value of the reference quantity to the change in observed value of the motional state quantity of the inclination state quantity and sensitivity Rb of the change in value of the reference quantity to the change in observed value of the motional state quantity of the steering angle of the front wheel both become zero in the case where the observed value of the vehicle speed is greater than a third prescribed speed (a fourteenth aspect of the invention). The same applies to the above-described ninth aspect of the invention (a fifteenth aspect of the invention).

According to the fourteenth or fifteenth aspect of the invention, when the mobile vehicle is traveling at a vehicle speed of higher than the third prescribed speed, even if the inclination state quantity or the steering angle of the front wheel deviates from a required or desired value, the steering of the front wheel by the steering actuator is not carried out. This allows the rider to bank the vehicle body and/or steer the front wheel freely according to the rider's preferences.

It should be noted that the configuration of the fourteenth aspect of the invention may be combined with any of the above-described ninth to thirteenth aspects of the invention.

Further, in the first through fifteenth aspects of the invention, it is preferable that the control device has a posture-control disabled mode which is an operating mode in which the control of the steering actuator by the steering control section is disabled, and in the posture-control disabled mode, the trail control section is configured to control an actual trail to become a prescribed trail determined in advance, and that the mobile vehicle further includes a clutch mechanism which interrupts power transmission between the steering actuator and the front wheel in the posture-control disabled mode (a sixteenth aspect of the invention).

According to the sixteenth aspect of the invention, in the posture-control disabled mode, the power transmission between the steering actuator and the front wheel is interrupted by the clutch mechanism. This can reduce friction about the steering axis that would disturb the working of the self-steering function. Further, the actual trail is maintained constantly at a prescribed trail, so that the behavioral characteristics of the mobile vehicle in response to the rider's shifting of the body weight or manipulation of the operation apparatus become invariant. This facilitates the operation of the mobile vehicle by the rider.

It should be noted that the prescribed trail described above is preferably a positive trail, which is for example the aforesaid upper trail limit. When it is assumed that the prescribed trail is the upper trail limit, the fifth aspect and the sixteenth aspect of the invention may be combined so that, in the state where the actual trail matches the upper trail limit in the posture-control disabled mode, the trail can be maintained at the upper trail limit without the need of the driving force of the trail adjustment actuator.

Supplementally, in the seventh through sixteenth aspects of the invention, the steering control section may adopt, by way of example, the following configuration. The steering control section includes, for example, an actuator operational target determining section which successively receives observed values of the actual values of the aforesaid controlled state quantities and determines an operational target of the aforesaid steering actuator (for example, the desired value of the aforesaid reference quantity), in accordance with deviations of the received observed values from desired values of the corresponding controlled state quantities for stabilizing the controlled state quantities, so as to make the deviations approach zero, by a feedback control law. The steering control section is configured to control the steering actuator in accordance with the determined operational target.

Further, in the present specification, the "observed value" of a given state quantity related to the mobile vehicle (such as the vehicle speed, inclination state quantity, or steering angle of the front wheel) means a detected value or an estimate of the actual value of the state quantity. In this case, the "detected value" means an actual value of the state quantity which is detected by an appropriate sensor. The "estimate" means a value which is estimated from a detected value of at least one state quantity having correlation with the state quantity, on the basis of the correlation, or it means a pseudo estimate which can be considered to coincide, or almost coincide, with the actual value of the state quantity.

For the "pseudo estimate", for example in the case where it is expected that the actual value of the state quantity can adequately track a desired value of the state quantity, the desired value may be adopted as the pseudo estimate of the actual value of the state quantity.

DESCRIPTION OF THE PREFERRED EMBODIMENTS

An embodiment of the present invention will be described below with reference to FIGS. 1 to 29.

First of all, the fundamental technical matters related to the present embodiment will be described with reference to FIGS. 1 to 8.

Figure 1:
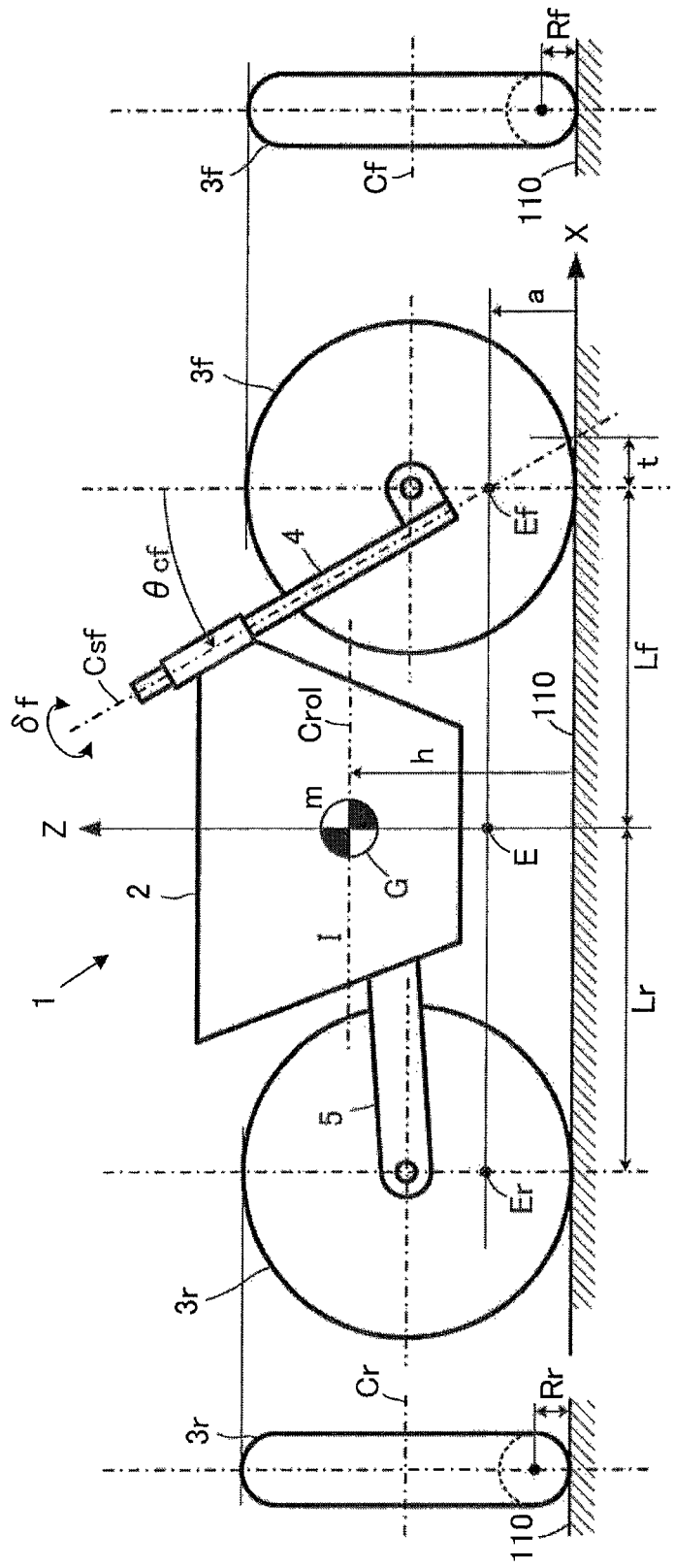
FIG. 1 is a diagram schematically showing a two-wheeled vehicle for illustrating the fundamental technical matters related to an embodiment of the present invention.

FIG. 1 is a schematic side view of a two-wheeled vehicle 1 (specifically, the two-wheeled vehicle 1 in the basic posture state as will be described later) which is a mobile vehicle having a vehicle body 2 and a front wheel 3f and a rear wheel 3r arranged spaced apart from each other in the longitudinal direction of the vehicle body 2. In FIG. 1, besides the side view of the two-wheeled vehicle 1, the rear wheel 3r as seen from the back of the two-wheeled vehicle 1 is illustrated on the left side of the two-wheeled vehicle 1, and the front wheel 3f as seen from the front of the two-wheeled vehicle 1 is illustrated on the right side of the two-wheeled vehicle 1.

The front wheel 3f is axially supported in a rotatable manner by a front-wheel support mechanism 4 provided at the front portion of the vehicle body 2. The front-wheel support mechanism 4 is made up, for example, of a front fork. The front wheel 3f is a steered wheel which can be steered (turned) about a steering axis Csf which is tilted backward.

It should be noted that the steering axis Csf being tilted backward means that the steering axis Csf extends obliquely with respect to the longitudinal direction and up-and-down direction of the vehicle body 2 such that the steering axis Csf has its upper portion located rearward relative to its lower portion in the front-rear (longitudinal) direction of the vehicle body 2.

The rear wheel 3r is axially supported in a rotatable manner by a rear-wheel support mechanism 5 provided at the rear portion of the vehicle body 2. The rear-wheel support mechanism 5 is made up, for example, of a swing arm. This rear wheel 3r is a non-steered wheel.

According to various experiments and studies conducted by the present inventors, generally, the dynamic behaviors related to the change in posture in the roll direction (direction about the longitudinal axis of the vehicle body 2) of the two-wheeled vehicle 1 having the above-described structure can be approximately expressed by the dynamics of a mass point system which is made up of an inverted pendulum mass point, which moves in a horizontal direction above a ground surface 110, with which the two-wheeled vehicle 1 comes into contact, in accordance with an inclination angle in the roll direction of the vehicle body 2 and the steering angle of the steered wheel, and a ground surface mass point, which moves horizontally on the ground surface 110 in accordance with the steering angle of the steered wheel (front wheel 3f), independently of the inclination angle in the roll direction of the vehicle body 2.

The dynamics will now be described.

It is here assumed, by way of example, that a two-wheeled vehicle 1 which is in the state of standing still in a straight-ahead posture on a flat ground surface 110, as shown in FIG. 1, is regarded as one rigid body having the entire mass and inertia moment concentrated on the vehicle body 2. It should be noted that the state in which the two-wheeled vehicle 1 is standing still in the straight-ahead posture means the state in which the front wheel 3f and the rear wheel 3r are both stationary in the upright posture in contact with the ground surface 110 and in which the axle centerlines (centers of rotational axes) Cf and Cr of the front wheel 3f and the rear wheel 3r extend in parallel with each other in the direction orthogonal to the longitudinal direction of the vehicle body 2. Hereinafter, the state in which the two-wheeled vehicle 1 is standing still in the straight-ahead posture as described above will be referred to as the "basic posture state" of the two-wheeled vehicle 1.

In the state where the two-wheeled vehicle 1 in the basic posture state is regarded as one rigid body, the overall mass of the two-wheeled vehicle 1 (hereinafter, also simply referred to as "total mass") is denoted as m, the height of the overall center of gravity G of the two-wheeled vehicle 1 (hereinafter, also simply referred to as "center-of-gravity height") is denoted as h, and the overall inertia moment of the two-wheeled vehicle 1 (hereinafter, also simply referred to as "overall inertia") about the longitudinal axis Crol (hereinafter, referred to as "central roll axis Crol") which extends in the longitudinal direction of the vehicle body 2 while passing through the overall center of gravity G is denoted as I.

m: total mass
h: center-of-gravity height
I: overall inertia

Figure 2:
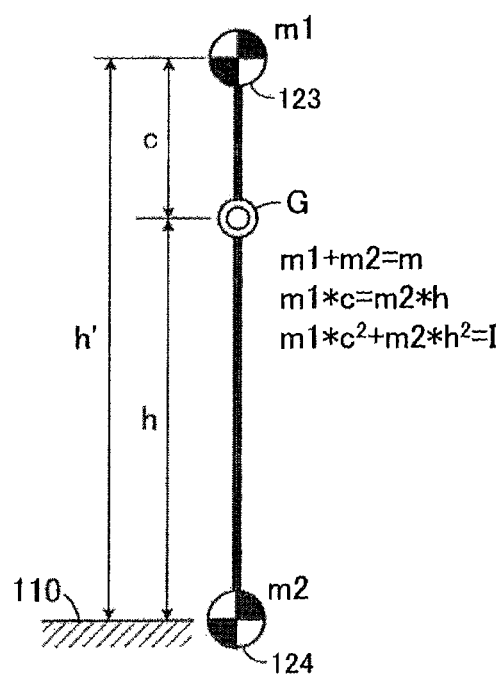
FIG. 2 is a diagram showing a mass point system (equivalent two-mass-point system) for expressing the dynamics of the two-wheeled vehicle in FIG. 1.

The system obtained when the two-wheeled vehicle 1 is regarded as one rigid body as described above can be equivalently transformed to a system, as shown in FIG. 2, which is made up of two mass points of a first mass point 123 having a height h' (>the above-described center-of-gravity height h) from the ground surface 110, and a second mass point 124 located on the ground surface 110. Hereinafter, this system will be referred to as "equivalent two-mass-point system".

Here, as shown below, the mass of the first mass point 123 in the equivalent two-mass-point system is denoted as m1, the mass of the second mass point 124 as m2, and the difference (=h'−h) between the height h' of the first mass point 123 and the aforesaid center-of-gravity height h as c (where c>0). In other words, the height h' of the first mass point 123 from the ground surface 110 is (h+c).

m1: mass of the first mass point 123
m2: mass of the second mass point 124
c: difference between the height h' of the first mass point 123 and the center-of-gravity height h (where c>0)

In order for the equivalent two-mass-point system shown in FIG. 2 to be a system that is equivalent to the two-wheeled vehicle 1 regarded as one rigid body, the following condition needs to be satisfied: the overall mass of the equivalent two-mass-point system matches the aforesaid total mass m. This condition is expressed by the following expression (1).

$$m1+m2=m \quad (1)$$

Further, the following condition also needs to be satisfied: the height of the overall center of gravity of the mass points 123 and 124 in the equivalent two-mass-point system in FIG. 2 matches the aforesaid center-of-gravity height h. This condition is expressed by the following expression (2).

$$m1*c=m2*h \quad (2)$$

Further, the following condition also needs to be satisfied: the inertia moment about the overall center of gravity in the equivalent two-mass-point system in FIG. 2 (specifically, the inertia moment about the longitudinal axis passing through the overall center of gravity in the equivalent two-mass-point system) matches the aforesaid overall inertia I. This condition is expressed by the following expression (3).

$$m1*c*c+m2*h*h=I \quad (3)$$

From the above expressions (1) to (3), the following expressions (4), (5), and (6) are obtained.

$$c=I/(m*h) \quad (4)$$

$$m1=(h/(h+I/(m*h)))*m \quad (5)$$

$$m2=((I/(m*h))/(h+I/(m*h)))*m \quad (6)$$

Therefore, the equivalent two-mass-point system in FIG. 2 is, in other words, a system which has a first mass point 123 whose height h' from the ground surface 110 is higher than the center-of-gravity height h of the two-wheeled vehicle 1 in the basic posture state and a second mass point 124 on the ground surface 110 (second mass point 124 whose height from the ground surface 110 is "0"), and in which the difference c (=h'−h) between the height h' of the first mass point 123 and the center-of-gravity height h and the masses m1 and m2 are set by the above expressions (4), (5), and (6) in accordance with the total mass m, overall inertia I, and center-of-gravity height h of the two-wheeled vehicle 1.

Figure 3:
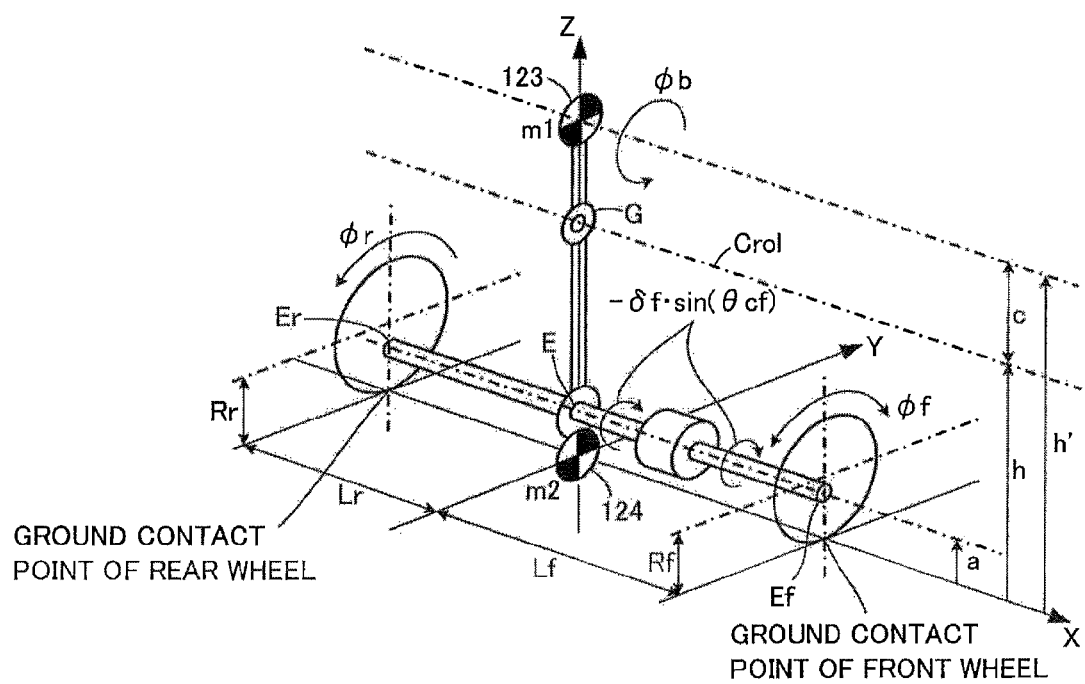
FIG. 3 is a diagram showing a model related to the behavior of the two-wheeled vehicle in FIG. 1.

FIG. 3 shows an approximate dynamics model which approximately expresses the dynamics of the two-wheeled vehicle 1 in the aforesaid basic posture state and similar posture states (close to the basic posture state). This approximate dynamics model has been established by regarding the two-wheeled vehicle 1 as the above-described equivalent two-mass-point system.

It is here assumed a three-axis orthogonal coordinate system (XYZ coordinate system) in which a projected point obtained by projecting the overall center of gravity G of the two-wheeled vehicle 1 in the basic posture state onto the ground surface 110 in the perpendicular direction (up-and-down direction) is defined as the origin, the longitudinal direction of the vehicle body 2 of the two-wheeled vehicle 1 as the X-axis direction, the lateral direction (vehicle width direction) as the Y-axis direction, and the vertical direction as the Z-axis direction. In this case, the positive directions of the X, Y, and Z axes correspond to the forward, leftward, and upward directions, respectively.

Further, in terms of rotation or angle, the direction about the X axis is called the roll direction, the direction about the Y axis is called the pitch direction, and the direction about the Z axis is called the yaw direction. The positive directions of the roll, pitch, and yaw directions are each determined as the direction of rotation of a right-hand screw when the screw is turned so as to move in the positive direction of the corresponding one of the X, Y, and Z axes.

Further, the caster angle of the front wheel $3f$ (the inclination angle (with respect to the up-and-down direction) of the steering axis Csf of the front wheel $3f$ in the basic posture state) is denoted as θcf. In this case, the caster angle θcf in the case where the steering axis Csf of the front wheel $3f$ is tilted backward as shown in FIG. 1 is defined to be positive.

It is now assumed that, in the basic posture state of the two-wheeled vehicle 1, the steering angle of the front wheel $3f$ (hereinafter, also simply referred to as "front-wheel steering angle") is changed instantaneously from "0" to δf (≠0). It is defined that the front-wheel steering angle is "0" in the basic posture state (non-steered state of the front wheel $3f$). It is also defined that the positive rotational direction of the front-wheel steering angle (rotational angle) about the steering axis Csf corresponds to the direction of rotation that makes the front end of the front wheel $3f$ turn left with respect to the vehicle body 2 (so that the two-wheeled vehicle 1 turns to the left when traveling forward).

Figure 4:
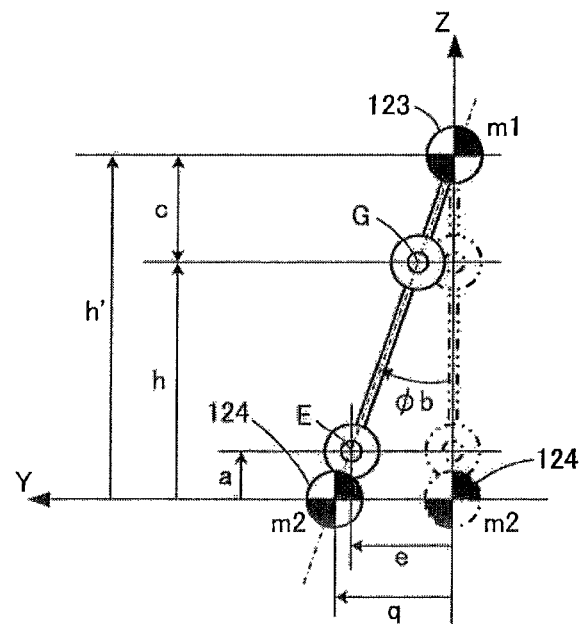
FIG. 4 is a diagram for illustrating the behavior of the model in FIG. 3.

As shown in FIG. 4, the inclination angle in the roll direction (hereinafter, also referred to as "roll angle") of the vehicle body 2 immediately after the instantaneous change of the front-wheel steering angle from "0" to δf (≠0) is denoted as φb, and the movement amount in the Y-axis direction of the second mass point 124 is denoted as q. It should be noted that the inclination angle in the roll direction of the line segment connecting the first mass point 123 and the second mass point 124 agrees with the roll angle φb of the vehicle body 2.

According to the dynamic relationship, the moment generated about the X axis by the resultant force of a reaction force that the two-wheeled vehicle 1 receives from the ground surface 110 and an inertial force resulting from the motions of the mass points 123 and 124 is "0".

Here, the reaction force that the two-wheeled vehicle 1 receives from the ground surface 110 is composed of a reaction force in the vertical direction (vertical load) and a friction force in the horizontal direction. The friction force, however, does not generate a moment in the roll direction about the origin.

Further, when the front-wheel steering angle is changed, the ground contact point (point of application of the reaction force in the vertical direction) moves by a finite distance. Immediately after the instantaneous change of the front-wheel steering angle, however, the lapse time is infinitesimal. Therefore, a value obtained by time integration of the moment in the roll direction generated by the reaction force in the vertical direction is infinitesimal. That is, immediately after the instantaneous change of the front-wheel steering angle, the total angular momentum (in the roll direction) about the origin due to the motions of the mass points 123 and 124 is infinitesimal.

Incidentally, the height of the second mass point 124 is "0", and the motion of the second mass point 124 is limited to the transverse direction. Therefore, the angular momentum about the origin due to the motion of the second mass point 124 is "0".

On the basis of the above, the angular momentum about the origin due to the motion of the first mass point 123 becomes infinitesimal. That is, the first mass point 123 is instantaneously held still. As a result, the rotation in the roll direction (change in roll angle) of the vehicle body 2 is performed about the mass point 123. In other words, it can be considered that the position of the first mass point 123 is fixed at the instant when the steering angle of the front wheel $3f$ is changed from the basic posture state.

In this case, the movement amount q in the Y-axis direction (hereinafter, simply referred to as "lateral movement amount q") of the second mass point 124 is expressed by the following expression (7).

$$q = (c+h)*\phi b \qquad (7)$$

In the expression (7), it is considered that the magnitude of φb is sufficiently small and that the following holds: sin(φb)≈φb.

The roll angle of the front wheel $3f$ is denoted as φf, and the roll angle of the rear wheel $3r$ is denoted as φr.

Since the caster angle θcf is not "0", the steering of the front wheel $3f$ causes a rotational motion component in the roll direction to be generated on the front wheel $3f$. Therefore, the roll angle φf of the front wheel $3f$ is obtained approximately from the following expression (8). In the expression (8), the magnitude of δf is considered to be sufficiently small.

$$\phi f = -\sin(\theta cf)*\delta f + \phi b \qquad (8)$$

Further, the roll angle φr of the rear wheel $3r$ is obtained by the following expression (9).

$$\phi r = \phi b \qquad (9)$$

Further, as shown in FIG. 1, a distance in the longitudinal direction (in the X-axis direction) between the overall center of gravity G of the two-wheeled vehicle 1 and the ground contact point of the front wheel $3f$ in the basic posture state is denoted as Lf, and a distance in the longitudinal direction (in the X-axis direction) between the overall center of gravity G of the two-wheeled vehicle 1 and the ground contact point of the rear wheel $3r$ in the basic posture state is denoted as Lr. That is, Lf represents the longitudinal distance between the center of the axle of the front wheel $3f$ and the overall center of gravity G of the two-wheeled vehicle 1 in the basic posture state, and Lr represents the longitudinal distance between the center of the axle of the rear wheel $3r$ and the overall center of gravity G of the two-wheeled vehicle 1 in the basic posture state.

Further, in the basic posture state, the point of intersection of the steering axis Csf and a straight line connecting the center of the axle and the ground contact point of the front wheel $3f$ is denoted as Ef, and the height of the intersection point Ef (height from the ground surface 110) is denoted as a.

It should be noted that the height a of the intersection point Ef indicates the position in the Z-axis direction (Z coordinate) of the intersection point Ef. When the intersection point Ef lies above the ground surface 110, a>0; when the intersection point Ef lies below the ground surface 110, a<0. Furthermore, in the case where the caster angle θcf is positive, the height a being positive means a positive trail (t shown in FIG. 1), whereas the height a being negative means a negative trail t.

The relationship between the height a of the intersection point Ef and the trail t is expressed by the following expression (10).

$$t = a * \tan(\theta cf) \quad (10)$$

Further, as shown in FIG. 1, on a straight line connecting the center of the axle of the rear wheel 3r and its ground contact point in the basic posture state, a point whose height from the ground surface 110 coincides with the aforesaid height a is denoted as Er. The points Ef and Er are fixed to the vehicle body 2. The line segment connecting these points Ef and Er intersects the line segment connecting the mass points 123 and 124 (i.e. the line segment which is orthogonal to the X axis and which passes through the overall center of gravity G). This point of intersection is denoted as E, as shown in FIG. 1.

The movement amount in the Y-axis direction (lateral movement amount) of the point Ef at the time when the front wheel 3f is instantaneously steered from the basic posture state is denoted as ef, and the movement amount in the Y-axis direction (lateral movement amount) of the point Er at that time is denoted as er. These ef and er are expressed by the following expressions (11) and (12), respectively.

$$ef = -a * \phi f \quad (11)$$

$$er = -a * \phi r \quad (12)$$

In the expressions (11) and (12), it is considered that the magnitudes of φf and φr are sufficiently small and that the following hold: $\sin(\phi f) \approx \phi f$, $\sin(\phi r) \approx \phi r$.

The movement amount in the Y-axis direction (lateral movement amount) of the point E is denoted as e. As the point E is an internally dividing point between the points Ef and Er, the lateral movement amount e of the point E is expressed by the following expression (13).

$$e = (Lr/(Lf+Lr))*ef + (Lf/(Lf+Lr))*er \quad (13)$$

On the other hand, as shown in FIG. 4, the inclination of the line segment connecting the point E and the second mass point 124 is equal to the roll angle φb of the vehicle body 2. The height of the point E is a. Therefore, the following expression (14) holds. In the expression (14), it is considered that the magnitude of φb is sufficiently small and that the following holds: $\sin(\phi b) \approx \phi b$.

$$q = e + a*\phi b \quad (14)$$

From the above expressions (9) and (11) to (14), the following expression (15) is obtained.

$$q = Lr/(Lf+Lr)*a*\sin(\theta cf)*\delta f \quad (15)$$

From the expressions (4), (7), and (15), the following expression (16) is obtained.

$$\phi b = a*(Lr/((Lf+Lr)*(h+I/(m*h))))*\sin(\theta cf)*\delta f \quad (16)$$

As shown in FIG. 1 or 3, the radius of curvature of the transverse cross-sectional shape of the front wheel 3f at the position of the ground contact point of the front wheel 3f in the basic posture state is denoted as Rf. Similarly, the radius of curvature of the transverse cross-sectional shape of the rear wheel 3r at the position of the ground contact point of the rear wheel 3r in the basic posture state is denoted as Rr.

It should be noted that the above-described transverse cross-sectional shape of the front wheel 3f means the shape of the ground contact part as seen in a transverse cross section including the axle centerline Cf and the ground contact point of the front wheel 3f (this corresponds to the transverse cross-sectional shape of the ground contact part of the tire of the front wheel 3f). The radius of curvature at the point of contact with the ground surface 110 in this transverse cross-sectional shape is the above-described Rf. The same applies to the rear wheel 3r.

The point of application, on the ground surface 110, of the resultant force of the reaction force in the vertical direction which acts on the front wheel 3f from the ground surface 110 and the reaction force in the vertical direction which acts on the rear wheel 3r from the ground surface 110, i.e. the center of contact pressure, is denoted as COP, and the movement amount in the Y-axis direction (lateral movement amount) of the COP is denoted as p.

Figure 5:
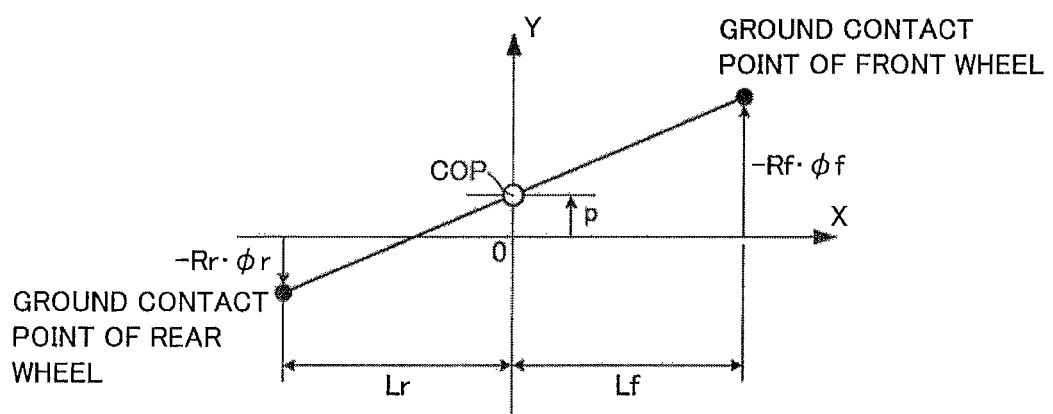
FIG. 5 is a graph for illustrating the behavior of the model in FIG. 3.

As shown in FIG. 5, the movement amount in the Y-axis direction of the ground contact point of the front wheel 3f is (−Rf*φf), and the movement amount in the Y-axis direction of the ground contact point of the rear wheel 3r is (−Rr*φr). The example shown in FIG. 5 is the case where φr>0 and φf<0.

The COP is, as shown in FIG. 5, the point of intersection between the Y axis and the line segment connecting the ground contact point of the front wheel 3f and the ground contact point of the rear wheel 3r. Therefore, the lateral movement amount p of the COP is expressed by the following expression (17).

$$p = -(Lr/(Lf+Lr))*Rf*\phi f - (Lf/(Lf+Lr))*Rr*\phi r \quad (17)$$

From the expressions (8), (9), and (17), the following expression (18) is obtained.

$$p = (Lr/(Lf+Lr))*Rf*\sin(\theta cf)*\delta f - ((Lf/(Lf+Lr))*Rr + (Lr/(Lf+Lr))*Rf)*\phi b \quad (18)$$

Supplementally, it can be interpreted that the part (Lr/(Lf+Lr))*Rf in the first term on the right side of the expression (18) corresponds to a virtual tire radius (tire radius as seen on the plane orthogonal to the X axis) at the position immediately beneath the overall center of gravity G corresponding to the roll angle resulting from the steering of the front wheel 3f.

Further, it can be interpreted that the part ((Lf/(Lf+Lr))*Rr+(Lr/(Lf+Lr))*Rf) in the second term on the right side of the expression (18) corresponds to a virtual tire radius (tire radius as seen on the plane orthogonal to the X axis) at the position immediately beneath the overall center of gravity G corresponding to the roll angle of the vehicle body 2.

Consideration will now be given to balancing in moment about the origin (of the XYZ coordinate system) immediately after the steering angle of the front wheel 3f of the two-wheeled vehicle 1 in the basic posture state is changed stepwise from "0" to δf (≠0) at a given initial time t0.

Figure 6:
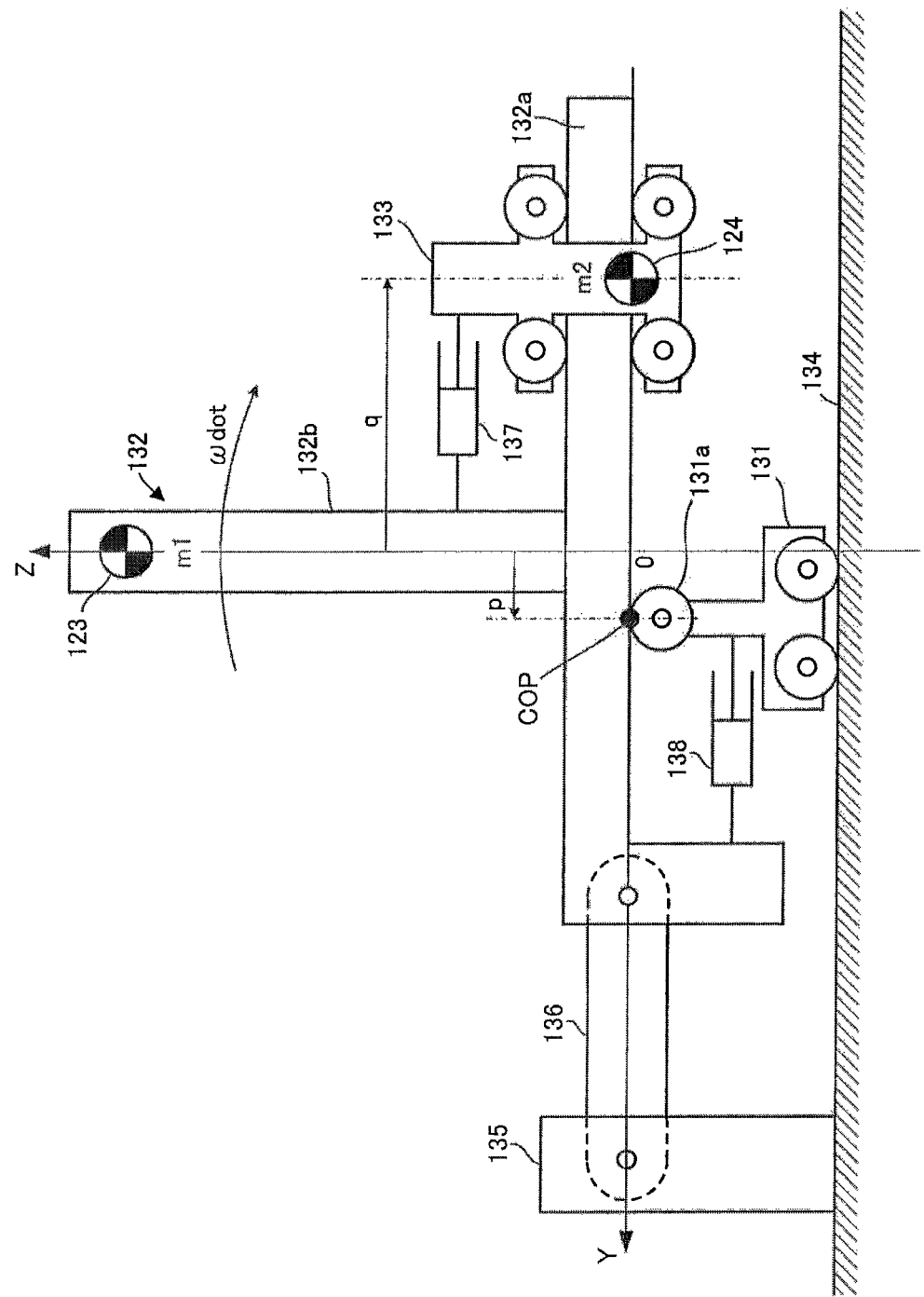
FIG. 6 is a diagram showing a model for illustrating a dynamic behavior of the two-wheeled vehicle in FIG. 1.

The dynamic behavior at this time can be expressed by a model shown in FIG. 6.

This model includes, as virtual components, a body link 132 which is supported on a dolly 131 movable in the Y axis direction, and a mobile section 133 which is movably supported by the body link 132. The body link 132 and the mobile section 133 correspond to the vehicle body 2.

The Y axis is set above a floor 134 which supports the dolly 131. The floor 134 does not correspond to the actual ground surface 110 with which the two-wheeled vehicle 1 comes into contact. That is, the floor 134 is simply a virtual plane that supports the dolly 131 to enable the dolly 131 to move in a horizontal direction. The actual ground surface 110 exists at the level of the Y axis (the level where the Z coordinate (position coordinate in the Z-axis direction) becomes "0").

In the model shown in FIG. 6, all the components are set to have the inertia moment of "0". Of the components of this model, the components except the body link 132 and the mobile section 133 are set to have the mass of "0".

The body link 132 has a rail portion 132a which extends in the transverse direction and an erecting portion 132b which extends upward from the rail portion 132a. The model has a first mass point 123 having a mass m1 at the upper portion of the erecting portion 132b. Before the initial time t0, the Y coordinate of the position of the first mass point 123 is "0", and its Z coordinate is (h+c) (=h+I/(m*h)).

The body link 132 is connected via a link 136 to a member 135 which is fixedly secured to the floor 134. This constrains the movement in the Y-axis direction of the body link 132; it cannot move in the Y-axis direction. Before the initial time t0, the rail portion 132a of the body link 132 extends in the Y-axis direction.

The mobile section 133 is supported by the rail portion 132a of the body link 132 so as to be movable along the rail portion 132a. The position in the Y-axis direction (Y coordinate) of this mobile section 133 is controlled by an actuator 137 which is interposed between the mobile section 133 and the erecting portion 132b of the body link 132.

Further, the mobile section 133 has a second mass point 124 having a mass m2. Before the initial time t0, the Z coordinate of the position of the mass point 124 is "0".

The dolly 131 supporting the body link 132 is freely movable in a horizontal direction on the floor 134. This dolly 131 has a wheel 131a at its upper end, and is in contact (point contact) with the body link 132 via the wheel 131a, thereby supporting the body link 132 from underneath. The point of contact between the wheel 131a of the dolly 131 and the body link 132 corresponds to the aforesaid COP. With the COP as the fulcrum, the body link 132 can be inclined in the direction about the X axis (roll direction).

The Z coordinate of the position of the COP is always "0". Further, the Y coordinate of the position of the COP is controlled by an actuator 138 which is interposed between the lower portion of the rail portion 132a of the body link 132 and the dolly 131. Supplementally, the inclination in the direction about the X axis (roll direction) of the line segment connecting the first mass point 123 and the second mass point 124 corresponds to the inclination in the direction about the X axis (roll direction) of the vehicle body 2.

Before the initial time t0, the Y coordinate of the position of the COP and the Y coordinate of the position of the second mass point 124 are both "0".

It is here assumed that, with a stepwise change (from "0" to δf) of the front-wheel steering angle at the initial time t0, the Y coordinate of the position of the COP has instantaneously become p by the actuator 138 and the Y coordinate of the position of the second mass point 124 has instantaneously become q by the actuator 137.

Before the initial time t0, the Y coordinate of the position of the first mass point 123 is "0". Further, instantaneously, the first mass point 123 can be regarded as a fixed point, as stated above. Therefore, immediately after the initial time t0, the moment in the roll direction which is generated about the origin due to the gravitational force acting on the first mass point 123 is "0".

Further, the moment M2 (hereinafter, also referred to as "gravitational moment M2") in the roll direction which is generated about the origin due to the gravitational force acting on the second mass point 124 is obtained by the following expression (19). It should be noted that g represents the gravitational acceleration constant (>0).

$$M2 = -m2 * g * q \quad (19)$$

Further, the moment Mp (hereinafter, also referred to as "road surface reaction force moment Mp") in the roll direction which is generated about the origin due to the road surface reaction force in the vertical direction (vertical load) acting on the COP from the ground surface 110 is obtained by the following expression (20).

$$Mp = m * g * p \quad (20)$$

According to the dynamic relationship, the sum of the above-described moments M2 and Mp coincides with the sign-reversed (or, opposite-polarity) total inertial force moment Ma in the roll direction generated about the origin due to the motions of the first mass point 123 and the second mass point 124. That is, the following expression (21) holds.

$$Ma + M2 + Mp = 0 \quad (21)$$

Consideration will now be given to the inertial force moment Ma.

The motions of the first mass point 123 and the second mass point 124 are made up of the motion which is generated by the actuator 137 and the motion which is generated as the body link 132 inclines (rotates) in the roll direction about the COP.

The direction of the acceleration of the second mass point 124 generated by the actuator 137 corresponds to the direction of the straight line connecting the second mass point 124 and the origin. Thus, the inertial force moment in the roll direction generated about the origin due to the motion of the second mass point 124 by the actuator 137 is "0".

Here, the rotational angular velocity of the body link 132 which inclines in the roll direction about the COP is denoted as ω, and its differential value (i.e. rotational angular acceleration) is denoted as ωdot. The inertial force moment in the roll direction generated about the origin due to the motions of the mass points 123 and 124 resulting from this rotational motion is obtained as a sum, multiplied by −1, of the square of the distance between the first mass point 123 and the origin multiplied by the mass m1 and ωdot, and the square of the distance between the second mass point 124 and the origin multiplied by the mass m2 and ωdot.

The distance between the origin and the second mass point 124, however, is "0" before the initial time t0. Even after the initial time t0, it is considered that the distance between the origin and the second mass point 124 (=absolute value of q) is sufficiently small compared to the distance between the origin and the first mass point 123 (=h+c). Further, the mass m2 is generally smaller than the mass m1.

Therefore, the magnitude of the inertial force moment due to the motion of the second mass point 124 is sufficiently small compared to the magnitude of the inertial force moment due to the motion of the first mass point 123, so that the inertial force moment due to the motion of the second mass point 124 can be ignored. Accordingly, Ma becomes comparable to the inertial force moment generated due to the motion of the first mass point 123 accompanying the inclination of the vehicle body 2.

As a result, the total inertial force moment Ma in the roll direction generated about the origin is obtained by the following expression (22).

$$Ma = -m1 * (h + I/(m*h)) * (h + I/(m*h)) * \omega dot \quad (22)$$

From the expressions (21) and (22), the following expression (23) is obtained.

$$m1*(h+I/(m*h))*(h+I/(m*h))*\dot{\omega}=Mp+M2 \quad (23)$$

The expression (23) can be interpreted that it expresses the behavior of inclination of an inverted pendulum, having a mass m1 and a mass point height (h+I/(m*h)) and having the origin at the fulcrum, at the time when the moment (Mp+M2) is applied to the fulcrum of the inverted pendulum. Thus, hereinafter, the first mass point 123 may also be referred to as "inverted pendulum mass point 123".

Even if the body link 132 inclines in the roll direction about the COP, the position of the origin of the body link 132 hardly moves in the transverse direction. Therefore, the inclination of the inverted pendulum mass point 123 coincides with the inclination in the roll direction of the body link 132.

Further, the position of the fulcrum of the inverted pendulum mass point 123 corresponds to the origin of the aforesaid three-axis orthogonal coordinate system (the projected point obtained by projecting the overall center of gravity G in the basic posture state of the two-wheeled vehicle 1 onto the ground surface 110 in the perpendicular direction (up-and-down direction)).

Furthermore, since the first mass point (inverted pendulum mass point) 123 and the second mass point 124 (hereinafter, also referred to as "ground surface mass point 124") are on the plane of symmetry of the vehicle body 2 (plane of symmetry when the vehicle body 2 is considered to be bilaterally symmetrical), the inclination in the roll direction of the line segment connecting the first mass point 123 and the second mass point 124 corresponds to the inclination in the roll direction of the vehicle body 2 of the two-wheeled vehicle 1.

Further, as can be seen from the expression (15), the movement amount q in the Y-axis direction of the second mass point 124 is determined uniquely from the steering angle δf. It should be noted that in an actual two-wheeled vehicle such as the two-wheeled vehicle 1A in an embodiment which will be described later, the movement amount q is determined from the steering angle δf by a nonlinear function.

On the basis of the foregoing, stabilizing the motional state of the inverted pendulum mass point 123 while stabilizing the steering angle δf becomes equivalent to stabilizing the inclination in the roll direction of the vehicle body 2 of the two-wheeled vehicle 1 while stabilizing the steering angle 6f.

It can be appreciated from the above expression (23) that the rotational angular acceleration ωdot in the roll direction of the body link 132 (in other words, the rotational angular acceleration in the roll direction of the line segment connecting the origin and the inverted pendulum mass point 123, or in yet other words, the rotational angular acceleration in the roll direction of the inverted pendulum mass point 123 as seen from the origin) at the instant immediately after the initial time t0 is determined depending on: the aforesaid road surface reaction force moment Mp, which is generated about the origin due to the reaction force in the vertical direction acting on the two-wheeled vehicle 1 from the ground surface 110 via the COP, and the aforesaid gravitational moment M2, which is generated about the origin due to the gravitational force acting on the second mass point (ground surface mass point) 124.

Accordingly, it is possible to use (Mp+M2) as a manipulation moment for controlling the motional state of the inverted pendulum mass point 123. Consequently, it is possible to use (Mp+M2) as a manipulation moment for controlling the posture (inclination angle in the roll direction) of the vehicle body 2 of the two-wheeled vehicle 1 to a desired or required posture. Therefore, hereinafter, (Mp+M2) is denoted as Msum, as in the following expression (24), and is called the "posture controlling manipulation moment".

$$Msum=Mp+M2 \quad (24)$$

This posture controlling manipulation moment Msum is expressed by the following expression (25) from the aforesaid expressions (6), (15), (16), (18), (19), (20), and (24).

$$Msum=-(((Rg+I/(m*h))/(h+I/(m*h)))*a-Rf)*(Lr/(Lf+Lr))*m*g*\sin(\theta cf)*\delta f \quad (25)$$

$$\text{where } Rg=(Lr/(Lf+Lr))*Rf+(Lf/(Lf+Lr))*Rr \quad (25a)$$

As can be seen from the aforesaid expression (18), Rg corresponds to the ratio of the amount of change in lateral movement amount p of the COP to the amount of change in roll angle of the vehicle body 2 (i.e. sensitivity of the change in lateral movement amount p of the COP to a small change in roll angle) in the case where the roll angle of the vehicle body 2 is changed by a small amount from the basic posture state.

On the other hand, the gravitational moment M2 is expressed by the following expression (26) from the aforesaid expressions (6), (15), and (19).

$$M2=-((I/(m*h))/(h+I/(m*h)))*(Lr/(Lf+Lr))*a*m*g*\sin(\theta cf)*\delta f \quad (26)$$

Further, the road surface reaction force moment Mp is expressed by the following expression (27) from the aforesaid expressions (16), (18), (20), and (25a).

$$Mp=-((Rg/(h+I/(m*h)))*a-Rf)*(Lr/(Lf+Lr))*m*g*\sin(\theta cf)*\delta f \quad (27)$$

Here, a_sum, k_sum, a_p, k_p, and k_m are defined as follows.

$$a\_sum=((h+I/(m*h))/(Rg+I/(m*h)))*Rf \quad (28)$$

$$k\_sum=-((Rg+I/(m*h))/(h+I/(m*h)))*(Lr/(Lf+Lr))*m*g*\sin(\theta cf) \quad (29)$$

$$k\_m=-((I(m*h))/(h+I/(m*h)))*(Lr/(Lf+Lr))*m*g*\sin(\theta cf) \quad (30)$$

$$a\_p=((h+I/(m*h))/Rg)*Rf \quad (31)$$

$$k\_p=-((Rg/(h+I/(m*h)))*(Lr/(Lf+Lr))*m*g*\sin(\theta cf) \quad (32)$$

From the expressions (25), (28), and (29), the following expression (33) is obtained.

$$Msum=k\_sum*(a-a\_sum)*\delta f \quad (33)$$

Further, from the expressions (26) and (30), the following expression (34) is obtained.

$$M2=k\_m*a*\delta f \quad (34)$$

Further, from the expressions (27), (31), and (32), the following expression (35) is obtained.

$$Mp=k\_p*(a-a\_p)*\delta f \quad (35)$$

As can be seen from the expressions (33), (34), and (35), Msum, M2, and Mp are proportional to the steering angle δf.

It should be noted that, from the expressions (28) and (31), the following magnitude relationship holds between a_sum and a_p.

$$0<a\_sum<a\_p \quad (36)$$

Figure 7:
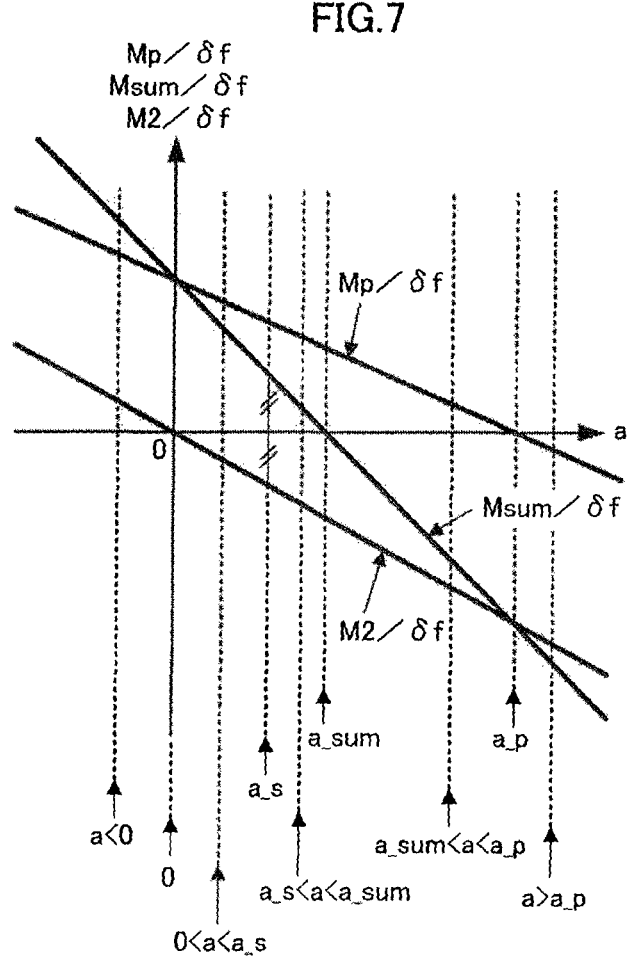
FIGS. 7 and 8 are graphs showing the behavioral characteristics of the two-wheeled vehicle in FIG. 1.

FIG. 7 is a graph showing the relationships between the height a and Msum/δf, M2/δf, and Mp/δf (indicated by the expressions (33), (34), and (35)).

Consideration will now be given to the relation between the setting value of the height a and the stability of the two-wheeled vehicle 1 at a standstill, with reference to FIG. 7.

First, the case is assumed where the height a coincides with a_sum determined by the expression (28) (the case where a=a_sum). In this case, the posture controlling manipulation moment Msum obtained by the aforesaid expression (33) is always "0", irrespective of a change in front-wheel steering angle. Therefore, it is not possible to control, using Msum, the motional state of the inverted pendulum mass point 123 (or the posture (inclination angle in the roll direction) of the vehicle body 2 of the two-wheeled vehicle 1).

Next, the case is assumed where the height a is greater than a_sum and smaller than a_p, as shown by the following expression (37).

$$a\_sum < a < a\_p \qquad (37)$$

In this case, as shown in FIG. 7, Msum/δf takes a negative value. Therefore, when the steering angle δf is positive, Msum becomes negative; when the steering angle δf is negative, Msum becomes positive.

Accordingly, it is theoretically possible to control the posture (inclination angle in the roll direction) of the vehicle body 2 of the two-wheeled vehicle 1 by manipulating the front-wheel steering angle. According to the experiments and studies conducted by the present inventors, however, it has been found that the following disadvantages arise in this case.

In the case where a_sum<a<a_p, as shown in FIG. 7, M2/δf and Mp/δf differ in polarity from each other, and the absolute value of M2/δf is larger than the absolute value of Mp/δf.

Therefore, the posture controlling manipulation moment Msum obtained by manipulating the front-wheel steering angle depends primarily on M2. Further, Mp functions to disturb the control of the posture of the vehicle body 2 of the two-wheeled vehicle 1 by Msum generated in the same direction as M2 (making the absolute value of Msum decreased further than the absolute value of M2).

This means that, in order to generate the posture controlling manipulation moment Msum of the magnitude sufficient for controlling the posture of the vehicle body 2 of the two-wheeled vehicle 1, the front-wheel steering angle will have to be manipulated more largely compared to the case where the assumption is made that Mp would not disturb the control of the posture of the vehicle body 2 (i.e. the case where Mp=0, or Mp and M2 are in the same polarity).

That is, in the case where a_sum<a<a_p, when the posture (inclination angle in the roll direction) of the vehicle body 2 of the two-wheeled vehicle 1 deviates from a desired or required posture, in order to generate a restoring force for making the posture of the vehicle body 2 restored to the required posture (that can stabilize the inverted pendulum mass point 123), it is necessary to considerably increase the absolute value of the feedback gain for changing the front-wheel steering angle in response to the change in inclination angle in the roll direction of the vehicle body 2 of the two-wheeled vehicle 1.

Incidentally, in the case where the front-wheel steering angle is changed from the basic posture state of the two-wheeled vehicle 1 and, thus, the second mass point 124 is accelerated in the lateral direction of the two-wheeled vehicle 1, the inertial force generated by the second mass point 124 by the acceleration is balanced with the friction force which acts on the two-wheeled vehicle 1 from the ground surface 110.

The tires fitted to the front wheel 3*f* and the rear wheel 3*r* generally undergo shear deformation in the transverse direction due to the friction force received from the ground surface 110. This generally causes a delay in response of the behavior of the second mass point 124 to the change in front-wheel steering angle and, hence, a delay in response of the change of the gravitational moment M2 to the change in front-wheel steering angle.

Therefore, if the absolute value of the feedback gain for changing the front-wheel steering angle in response to the change in inclination angle of the vehicle body 2 of the two-wheeled vehicle 1 is set large, an oscillation phenomenon is likely to occur in the control system due to the delay in response of the change of the gravitational moment M2 and the delay in response of the inclination angle in the roll direction of the vehicle body 2 of the two-wheeled vehicle 1 to the change in front-wheel steering angle. This leads to degradation in robustness of the control of the posture of the vehicle body 2 by the manipulation of the front-wheel steering angle.

As such, when the posture controlling manipulation moment Msum becomes highly dependent on M2, an oscillation phenomenon becomes more likely to occur in the control system due to the effect of the delay in response of the change of M2 attributable to the shear deformation of the tires fitted to the front wheel 3*f* and the rear wheel 3*r*. That is, in the case where a_sum<a<a_p, the oscillation phenomenon is likely to occur in the control system due to the effect of the delay in response of the change of M2 caused by the shear deformation of the tires.

Further, in the case where a_sum<a<a_p, at the time when the absolute value of the steering angle δf is large, it is difficult to stabilize the control of the posture of the two-wheeled vehicle 1, for the following reasons.

When the absolute value of the steering angle δf is large, the radius of curvature of the ground contact part of the steered wheel (front wheel 3*f*) as seen in a cross section including the ground contact point of the steered wheel (front wheel 3*f*) and having a normal corresponding to the X-axis direction (longitudinal direction of the vehicle body 2) becomes greater than the radius of curvature in the case where the steering angle δf is "0". Accordingly, the substantial Rf becomes larger as the absolute value of the steering angle δf becomes larger. Further, Mp has dependency on Rf, as indicated by the aforesaid expression (27).

Figure 8:
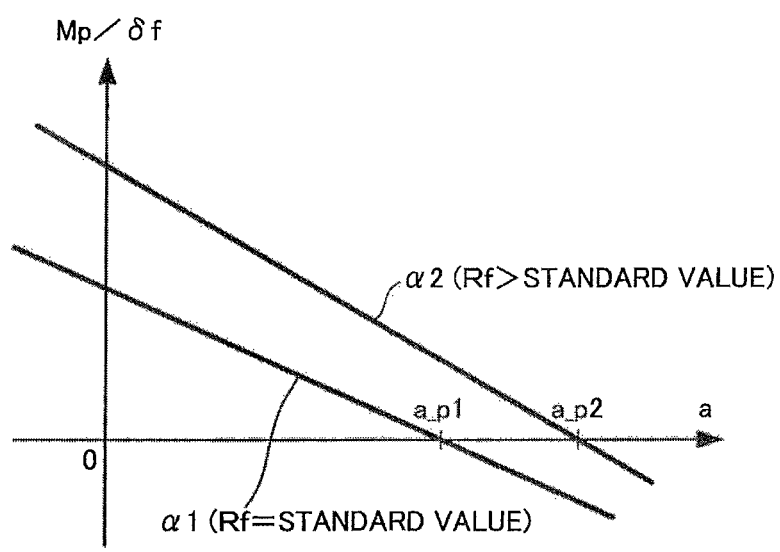

FIG. 8 illustrates differences in graphs of Mp/δf due to the differences in magnitude of Rf. A straight line α1 illustrates a graph of Mp/δf in the case where Rf takes a standard value (radius of curvature of the transverse cross-sectional shape of the front wheel 3*f* at the position of the ground contact point of the front wheel 3*f* in the basic posture state). A straight line α2 illustrates a graph of Mp/δf in the case where Rf is larger than the standard value. Further, a_p1 and a_p2 denote the values of a_p (values of a when Mp/δf is "0") corresponding respectively to the straight lines α1 and α2.

As shown in FIG. 8, a_p2, i.e. the value of a_p when Rf is large, is larger than a_p1, i.e. the value of a_p when Rf is small. Further, the inclination of the straight line α2 when Rf is large is greater than the inclination of the straight line α1 when Rf is small.

Therefore, in the case where a takes a value satisfying a_sum<a<a_p, when Rf becomes larger, Mp/δf increases in the positive direction (that is, it changes toward a direction of opposite polarity to that of M2/δf). This causes Msum/δf to approach "0". Accordingly, the restoring force for making the posture of the vehicle body 2 of the two-wheeled vehicle 1 restored to a desired or required posture is decreased. Alternatively, the polarity of Msum/δf is reversed from negative to positive. This makes it difficult to stabilize the control of the posture of the vehicle body 2.

As such, in the case where a_sum<a<a_p, when the absolute value of the steering angle δf is large, it is difficult to stabilize the control of the motional state of the inverted pendulum mass point 123 (and, hence, the control of the posture of the vehicle body 2 of the two-wheeled vehicle 1)

because the substantial Rf deviates from the Rf (standard value) in the basic posture state.

Next, the case is assumed where the height a is not smaller than a_p, as shown by the following expression (38).

$$a \geq a\_p \quad (38)$$

In this case, as shown in FIG. 7, Msum/δf takes a negative value. Therefore, when the steering angle δf is positive, Msum becomes negative; when the steering angle δf is negative, Msum becomes positive, as in the case where a_sum<a<a_p.

Accordingly, it is theoretically possible to control the motional state of the inverted pendulum mass point 123 by manipulating the front-wheel steering angle. Consequently, it is possible to control the posture (inclination angle in the roll direction) of the vehicle body 2 of the two-wheeled vehicle 1 by the manipulation of the front-wheel steering angle.

Further, in this case, M2/δf and Mp/δf will not become opposite in polarity. That is, in the case where a=a_p, Mp/δf=0 and M2/δf<0. In the case where a>a_p, M2/δf and Mp/δf are in the same polarity. Therefore, it is possible to generate the posture controlling manipulation moment Msum by M2 alone, or by cooperation of M2 and Mp.

Accordingly, the absolute value of the feedback gain for the posture control of the vehicle body 2 can be set to a value smaller than in the case where a_sum<a<a_p.

However, since the absolute value of M2/δf is larger than the absolute value of Mp/δf, as shown in FIG. 7, Msum is highly dependent on M2. Further, since the height a is large, the lateral acceleration (acceleration in the Y-axis direction) of the second mass point 124 tends to become large.

Therefore, the effect of the shear deformation of the tires fitted to the front wheel 3f and the rear wheel 3r becomes large, as in the case where a_sum<a<a_p. The response of the change of the gravitational moment M2 to the change of the front-wheel steering angle is likely to delay, and accordingly, an oscillation phenomenon is likely to occur in the control system.

Next, the value of a which makes the following expression (39) hold is denoted as a_s.

$$M\text{sum} = -M2 \quad (39)$$

The state where the above expression (39) holds corresponds to the state where M2 functions to disturb the control of the posture of the vehicle body 2 of the two-wheeled vehicle 1 by Msum (i.e. the direction of M2 becomes opposite to the direction of Msum) and where the absolute values of M2 and Msum are equal to each other.

From the expressions (25) and (27), the above a_s is expressed by the following expression (40).

$$a\_s = ((h + I/(m^*h))/(Rg + 2^*I/(m^*h)))^*Rf \quad (40)$$

From the fact that all the parameters on the right side of the expression (40) are positive and from the aforesaid expressions (28) and (40), the relationship in the following expression (41) is obtained.

$$0 < a\_s < a\_\text{sum} \quad (41)$$

Next, the case is assumed where the height a is larger than a_s and smaller than a_sum, as shown by the following expression (42).

$$a\_s < a < a\_\text{sum} \quad (42)$$

In this case, Msum/δf (=Mp/δf+M2/δf) takes a positive value. In other words, Mp/δf>−M2/δf.

Therefore, when the steering angle δf is positive, the posture controlling manipulation moment Msum becomes positive; when the steering angle δf is negative, the posture controlling manipulation moment Msum becomes negative. Accordingly, it is theoretically possible to control the motional state of the inverted pendulum mass point 123 by manipulating the front-wheel steering angle. Consequently, it is possible to control the posture (inclination angle in the direction about the X axis) of the vehicle body 2 of the two-wheeled vehicle 1 by the manipulation of the front-wheel steering angle.

In the case where a_s<a<a_sum, the absolute value of M2 becomes smaller than in the case where a>a_sum. Consequently, the oscillation in the control of the posture of the vehicle body 2 resulting from the shear deformation of the tires of the front wheel 3f and the rear wheel 3r is restricted. However, compared to the case where 0<a≤a_s which will be described later, oscillation is still likely to occur in the control of the posture of the vehicle body 2 due to the shear deformation of the tires of the front wheel 3f and the rear wheel 3r, for the following reasons.

In the case where a takes a value satisfying the expression (42), Msum/δf and M2/δf are opposite in polarity, as shown in FIG. 7. That is, M2 functions to disturb the control of the posture of the vehicle body 2 by Msum. In addition, as explained above, M2 is accompanied by lateral acceleration due to the movement of the second mass point 124, causing shear deformation of the tires of the front wheel 3f and the rear wheel 3r. Consequently, an oscillation phenomenon is likely to occur in the control system because of the delay in response resulting from the shear deformation.

Further, when a takes a value satisfying the expression (42), the absolute value of Msum/δf is smaller than the absolute value of M2/δf. That is, the absolute value of the posture controlling manipulation moment Msum becomes smaller than the absolute value of M2 which disturbs the posture control of the vehicle body 2 and causes an oscillation phenomenon in the control system. Therefore, when the absolute value of the feedback gain is set to a relatively small value so as to avoid the oscillation phenomenon in the control system, the magnitude of the posture controlling manipulation moment Msum is likely to become insufficient.

Next, the case is assumed where the height a is larger than "0" and not larger than a_s, as shown by the following expression (43).

$$0 < a \leq a\_s \quad (43)$$

In this case, Msum/δf becomes positive, as shown in FIG. 7. Therefore, Msum becomes positive when the steering angle δf is positive, while Msum becomes negative when the steering angle δf is negative.

Further, in this case, Msum/δf and M2/δf are opposite in polarity, as in the case where a_s<a<a_sum. That is, M2 functions to disturb the control of the posture of the vehicle body 2 by Msum.

However, when a takes a value satisfying the expression (43), the absolute value of Msum/δf becomes equal to or larger than the absolute value of M2/δf. In other words, Msum/δf>−M2/δf. That is, the absolute value of M2 which disturbs the posture control of the vehicle body 2 and causes the oscillation phenomenon in the control system is kept at or below the absolute value of the posture controlling manipulation moment Msum.

Accordingly, even if the absolute value of the feedback gain is set to a relatively large value in order to cause a sufficiently large posture controlling manipulation moment Msum to be generated for making the posture (inclination angle in the roll direction) of the vehicle body 2 restored to a required posture, oscillation is not likely to occur in the control system. That is, it is possible to enhance the stability of the control of the motional state of the inverted pendulum mass point 123 by the manipulation of the front-wheel steering angle (and, hence, the stability of the posture control of the vehicle body 2 of the two-wheeled vehicle 1).

Next, the case is assumed where the height a is "0" (in the case where a=0).

In this case, as shown in FIG. 7, Msum/δf becomes positive. Thus, Msum becomes positive when the steering angle δf is positive, while Msum becomes negative when the steering angle δf is negative.

Further, in this case, M2 is always "0". Therefore, the posture controlling manipulation moment Msum caused by the manipulation of the front-wheel steering angle is generated by Mp alone. In this case, even if the front-wheel steering angle is manipulated from the basic posture state, the movement amount in the Y-axis direction of the second mass point 124 is "0". Accordingly, no friction force is generated to act on the two-wheeled vehicle 1 from the ground surface 110.

Therefore, the tires of the front wheel 3f and the rear wheel 3r do not undergo shear deformation, and thus, an oscillation phenomenon in the control system due to the shear deformation of the tires is unlikely to occur. Accordingly, it is possible to further increase the absolute value of the aforesaid feedback gain, than in the case where the value of a satisfies the aforesaid expression (43). As a result, the restoring force for making the motional state of the inverted pendulum mass point 123 restored to the required state can be increased. Further, the stability of the control of the motional state can be enhanced. Consequently, the restoring force for making the posture of the vehicle body 2 restored to the required posture can be increased. Furthermore, the stability of the control of the posture can be enhanced.

Further, the magnitude of Msum which can be generated per unit change amount of the front-wheel steering angle becomes larger than in the case where the value of a satisfies the aforesaid expression (43). Accordingly, it is also possible to decrease the magnitude of the change amount of the front-wheel steering angle that is necessary for making the posture of the vehicle body 2 restored to the required posture.

Next, the case is assumed where the height a is negative (in the case where a<0).

In this case, as shown in FIG. 7, Msum/δf becomes positive. Thus, the posture controlling manipulation moment Msum becomes positive when the steering angle δf is positive, while the posture controlling manipulation moment Msum becomes negative when the steering angle δf is negative.

Further, in this case, M2/δf and Mp/δf are in the same polarity. This enables M2 and Mp to cooperate to generate the posture controlling manipulation moment Msum. As a result, the magnitude of Msum that can be generated per unit change amount of the front-wheel steering angle becomes larger than in the case where a=0. Accordingly, it is possible to still further decrease the magnitude of the change amount of the front-wheel steering angle necessary for making the posture of the vehicle body 2 restored to the required posture.

It can be said from the foregoing that, in the case of attempting to control the posture (inclination angle in the roll direction) of the vehicle body 2 of the two-wheeled vehicle 1 to a required posture by steering of the front wheel 3f of the two-wheeled vehicle 1 (in the case of attempting to control the motional state of the inverted pendulum mass point 123 in the dynamics model of the two-wheeled vehicle 1), setting the arrangement position of the backwardly tilted steering axis Csf of the front wheel 3f (steered wheel) such that the height a of the intersection point Ef of the steering axis Csf and the straight line connecting the center of the axle of the front wheel 3f (steered wheel) and the ground contact point of the front wheel 3f becomes smaller than a_sum defined by the expression (28) is a preferable condition for stably controlling the motional state of the inverted pendulum mass point 123 (and, hence, the posture of the vehicle body 2).

In the case where the arrangement position of the steering axis Csf is set as described above, Msum/δf becomes positive, as shown in FIG. 7. Therefore, the polarity of the posture controlling manipulation moment Msum generated by the steering of the front wheel 3f agrees with the polarity of the steering angle δf. Accordingly, in the case where the vehicle body 2 leans to the left from the basic posture state as seen from the back of the two-wheeled vehicle 1, the posture controlling manipulation moment Msum in the direction of making the inclination in the roll direction of the vehicle body 2 restored to the basic posture state can be generated by steering the front wheel 3f counterclockwise as seen from the above (so that the front end of the front wheel 3f turns toward the left).

On the contrary to the above, in the case where the vehicle body 2 leans to the right from the basic posture state, the posture controlling manipulation moment Msum in the direction of making the inclination in the roll direction of the vehicle body 2 restored to the basic posture state can be generated by steering the front wheel 3f clockwise as seen from the above (so that the front end of the front wheel 3f turns toward the right).

The direction of steering of the front wheel 3f so as to generate the posture controlling manipulation moment Msum as described above agrees with the direction of steering of the front wheel 3f by the self-steering function in the case where the vehicle body 2 leans in the roll direction while the two-wheeled vehicle 1 is traveling at a relatively high vehicle speed.

Therefore, from the standstill state to the high-speed traveling state of the two-wheeled vehicle 1, the polarity of the steering direction of the front wheel 3f with respect to the inclination in the roll direction of the vehicle body 2 remains the same, so that the rider can readily operate the two-wheeled vehicle 1.

Further, in order to suppress the oscillation phenomenon in the control system due to the tire shear deformation, it is preferable to set the arrangement position of the steering axis Csf such that the height a becomes not larger than a_s defined by the expression (40).

Moreover, for still further decreasing the magnitude of the change amount of the front-wheel steering angle necessary for making the posture of the vehicle body 2 restored to the required posture, it is preferable to set the arrangement position of the steering axis Csf such that the height a becomes "0" or takes a negative value.

As such, in order to make the posture of the vehicle body 2 stably restored to a required posture, it is preferable that the height a takes a value smaller than a_sum, including zero or a negative value. Further, the sensitivity of the change of the posture controlling manipulation moment Msum to the change in front-wheel steering angle can be made higher as the height a becomes smaller.

Here, the relationship between the height a and the trail t is expressed by the aforesaid expression (10). Thus, the height a being smaller than a_sum means that the trail t is smaller than a_sum*tan(θcf), the height a being not larger than a_s means that the trail t is not larger than a_s*tan(θcf), and the height a being not larger than "0" means that the trail t is not larger than "0".

Therefore, in order to make the posture of the vehicle body 2 stably restored to the required posture, the arrangement position of the steering axis Csf may be set such that the trail t of the two-wheeled vehicle 1 takes a value smaller than a_sum*tan(θcf) (suitably, a value not larger than a_s*tan(θcf), or a negative value).

As described above, in the case of controlling the posture in the roll direction of the vehicle body 2 of the two-wheeled vehicle 1 by steering the front wheel 3f, the dynamic behavior of the two-wheeled vehicle 1 can be approximately expressed by the dynamic behavior of the aforesaid equivalent two-mass-point system. In this case, controlling the front-wheel steering angle so as to stabilize the motional state of the first mass point (inverted pendulum mass point) 123 of the equivalent two-mass-point system can stabilize the posture of the vehicle body 2 of the two-wheeled vehicle 1.

In the case of controlling the posture in the roll direction of the vehicle body 2 of the two-wheeled vehicle 1 by steering the front wheel 3f while the two-wheeled vehicle 1 is stopped or traveling at a vehicle speed in a low-speed range, it is preferable that the height a is smaller than a_sum, or, in other words, that the trail t takes a value smaller than a_sum*tan(θcf) (for example, a negative value).

In order to improve the operation stability of the two-wheeled vehicle 1 while the vehicle is traveling at a vehicle speed in a high-speed range, however, it is preferable that the trail t takes a positive value, or, that the point of intersection of the ground surface 110 and the steering axis Csf of the front wheel 3f in the basis posture state lies in front of the ground contact point of the front wheel 3f.

Incidentally, it can be considered that it is practically impossible in the two-wheeled vehicle 1 that the center-of-gravity height h becomes equal to or smaller than Rg defined by the aforesaid expression (25a).

Even assuming that the center-of-gravity height h is Rg or smaller, in this case, the two-wheeled vehicle 1 becomes dynamically stable in the basic posture state, without the need of posture control by steering of the front wheel 3f. Therefore, in discussing the stability of the posture control of the vehicle body 2 by way of steering, it is only necessary to consider the case where the center-of-gravity height h is larger than Rg.

In this case, the value of ((h+I/(m*h))/(Rg+I/(m*h))) in the two-wheeled vehicle 1 becomes larger than 1, so that the right side of the expression (28) becomes larger than Rf. That is, as long as h is larger than Rg, the value of a_sum determined by the expression (28) becomes always larger than Rf with respect to arbitrary h, I, and m.

On the other hand, when the height a is smaller than a_sum, Mp/δf becomes positive, Mp/δf>(−M2/δf), and Msum/δf becomes positive, as explained above.

From the above, when a is set to Rf or lower, as long as h is larger than Rg, Mp/δf becomes positive, Mp/δf>(−M2/δf), and Msum/δf becomes positive with respect to arbitrary h, I, and m.

That is, when a is set to Rf or lower, even in the case where the values of h, I, and m have not been calculated at the planning phase, or the values of h, I, and m have not been measured, or even in the case where the values of h, I, and m may vary because a given object may be mounted on or attached to the two-wheeled vehicle 1, Mp/δf becomes always positive, Mp/δf becomes always greater than (−M2/δf), and Msum/δf becomes always positive, as long as h is larger than Rg. Accordingly, it is possible to cause the posture controlling manipulation moment Msum for making the posture (inclination angle in the roll direction) of the vehicle body 2 restored to a required posture to be generated in an appropriate direction, independently of the values of h, I, and m.

Accordingly, for controlling the posture in the roll direction of the vehicle body 2 by steering of the front wheel 3f, the height a may be set to Rf or smaller, instead of being set to a value smaller than a_sum. In other words, the trail t may be set to Rf*tan(θcf) or smaller.

Further preferably, the height a may be set to 0 or smaller, instead of Rf or smaller. In other words, the trail t may be set to 0 or smaller.

Supplementally, in the dynamics model of the two-wheeled vehicle 1 described above, the mass and the inertia moment (inertia) were concentrated on the vehicle body 2. In the model, the gravitational force which acts on a steering mobile section made up of the front wheel 3f and the front-wheel support mechanism 4, and the inertial force of the steering mobile section which is generated when the steering mobile section makes a motion relative to the vehicle body 2 in accordance with the steering of the front wheel 3f were both ignored.

Alternatively, the two-wheeled vehicle 1 may be modeled by further taking into account the gravitational force which acts on the steering mobile section made up of the front wheel 3f and the front-wheel support mechanism 4 as well as the inertial force of the steering mobile section which is generated when the steering mobile section makes a motion relative to the vehicle body 2.

In this case as well, the two-wheeled vehicle 1 can be equivalently transformed to a model having the structure similar to that shown in FIG. 2 (model made up of a first mass point which is an inverted pendulum mass point and a second mass point which is a ground surface mass point).

That is, even in the case where at least one of a mass point and an inertia moment is set for the steering mobile section made up of the front wheel 3f and the front-wheel support mechanism 4 in addition to the mass point and the inertia moment set for the vehicle body 2, it is possible to equivalently transform the dynamic behavior of the two-wheeled vehicle 1 to the behavior of a system which is made up of a mass point (inverted pendulum mass point) that moves in accordance with the inclination angle in the roll direction of the vehicle body 2 and the steering angle of the front wheel 3f, and a mass point (ground surface mass point) that moves on the ground surface 110 in accordance with the steering angle of the front wheel 3f, independently of the inclination angle in the roll direction of the vehicle body 2.

The above has described the fundamental technical matters related to the present embodiment.

An embodiment of the present invention will be described in detail below on the premise of the above-described matters. In the description of the present embodiment, for convenience sake, the components having the same functions as those of the two-wheeled vehicle 1 shown in FIG. 1 will be denoted by the same reference signs as those used in FIG. 1.

Figure 9:
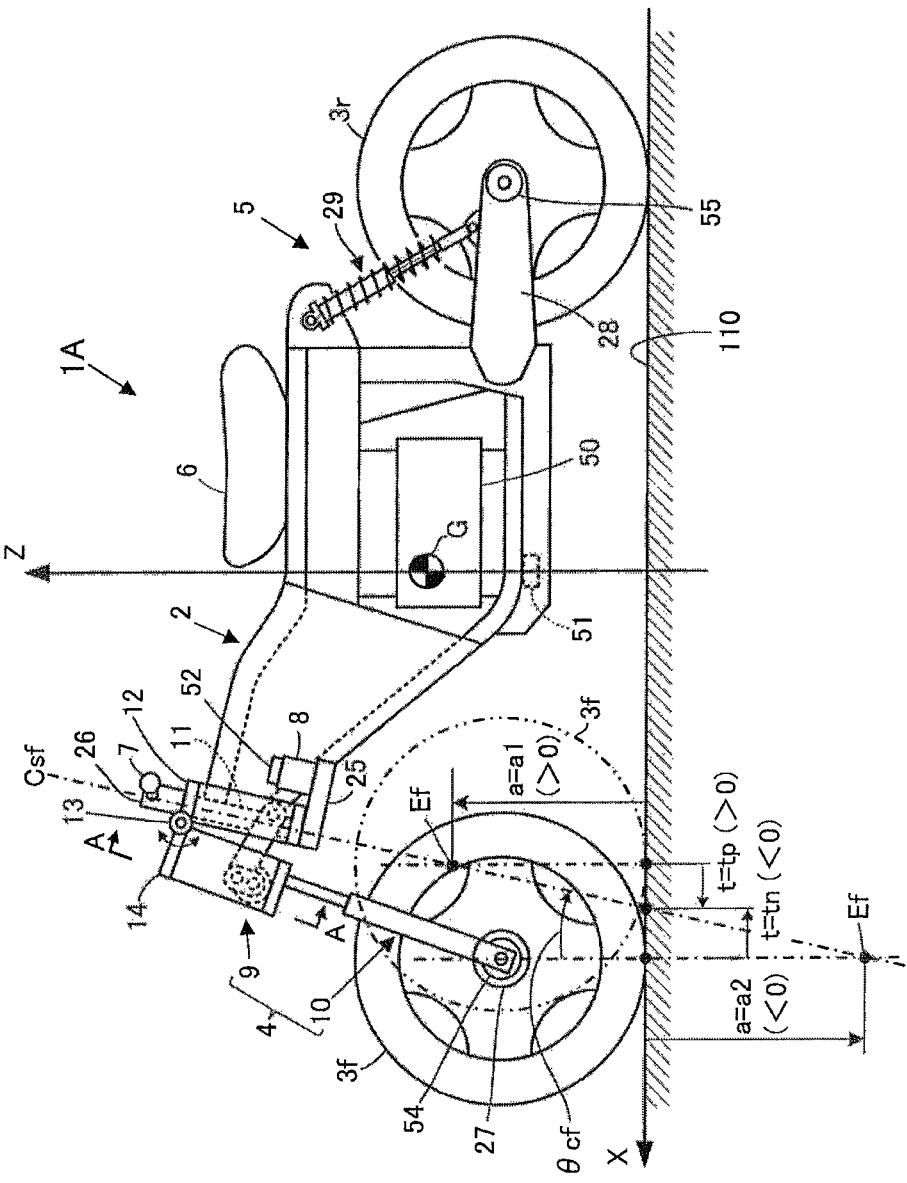
FIG. 9 is a side view of a mobile vehicle (two-wheeled vehicle) according to an embodiment of the present invention.

Referring to FIG. 9, a mobile vehicle 1A according to the present embodiment is a two-wheeled vehicle which has a vehicle body 2, and a front wheel 3f and a rear wheel 3r arranged spaced apart from each other in the longitudinal direction of the vehicle body 2. The mobile vehicle 1A will be hereinafter referred to as "two-wheeled vehicle 1A".

On the upper surface of the vehicle body 2, a seat 6 is provided for a rider to sit astride.

At the front portion of the vehicle body 2, a front-wheel support mechanism 4 for axially supporting the front wheel 3f, an operation apparatus 7 for a rider who has sat on the seat 6 to hold, and an actuator 8 (hereinafter, also referred to as "steering actuator 8") which generates a steering force for steering the front wheel 3f are mounted.

The front-wheel support mechanism 4 includes a trail adjustment mechanism 9, which is a mechanism for making the trail t of the front wheel 3f adjustable, and a front fork 10 which includes a suspension mechanism such as a damper. At a lower end of the front fork 10, the front wheel 3f is axially supported, via bearings or the like, such that it can rotate about the axle centerline Cf (rotational axis of the front wheel 3f) that extends in the direction orthogonal to the diameter direction of the front wheel 3f.

Figure 10:
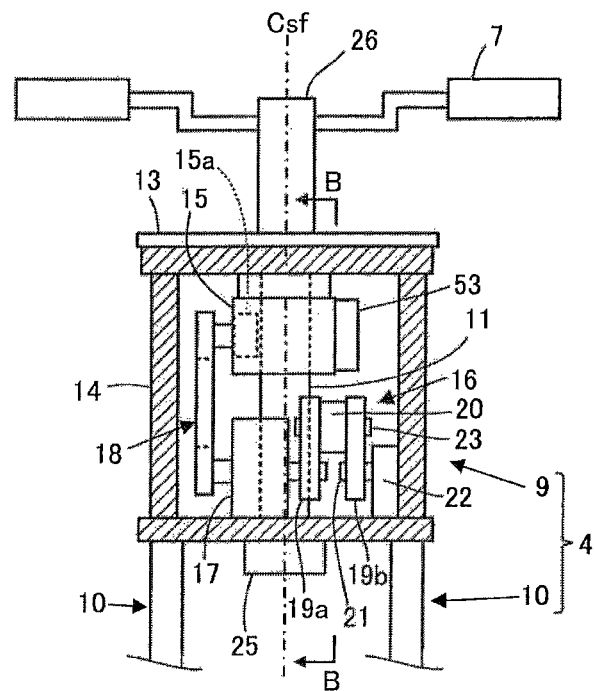
FIG. 10 is a cross-sectional view taken along the line A-A in FIG. 9.
Figure 11:
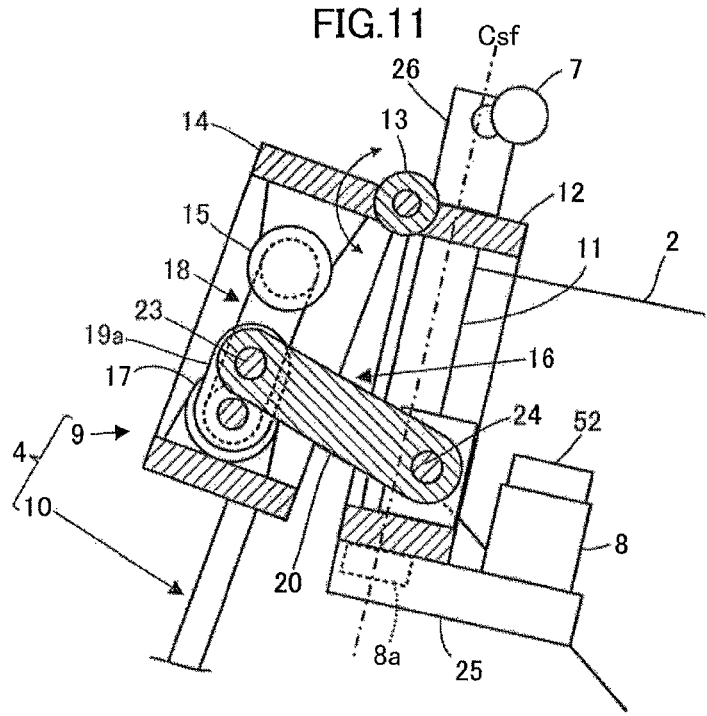
FIG. 11 is a cross-sectional view taken along the line B-B in FIG. 10.

The trail adjustment mechanism 9 is configured as shown in FIGS. 10 and 11.

Specifically, the trail adjustment mechanism 9 includes a frame-shaped steering rotation section 12, which is rotatably supported by a head pipe 11 provided at the front end of the vehicle body 2, a frame-shaped swing section 14, which is swingably attached to the steering rotation section 12 via a hinge mechanism 13, an actuator 15 (hereinafter, also referred to as "trail adjustment actuator 15"), which generates a driving force for causing the swing section 14 to swing, and a crank mechanism 16, which causes the swing section 14 to swing with respect to the steering rotation section 12 by the driving force of the actuator 15.

The head pipe 11 has its shaft center corresponding to the steering axis Csf of the front wheel 3f. The head pipe 11 is fixedly secured to the front end of the vehicle body 2 such that the steering axis Csf is tilted backward. The steering rotation section 12 is arranged such that the head pipe 11 is placed between an upper end portion and a lower end portion of the steering rotation section 12. The steering rotation section 12 is fitted to the head pipe 11 so as to be able to rotate about the steering axis Csf relative to the head pipe 11.

It should be noted that, as the steering axis Csf is tilted backward, the front wheel 3f has a positive caster angle ° cf.

The swing section 14 is arranged in front of the steering rotation section 12. The swing section 14 has its upper end portion connected to the upper end portion of the steering rotation section 12 via the hinge mechanism 13. The front fork 10 extends downward from the lower end portion of the swing section 14.

With this configuration, the swing section 14 is rotatable about the steering axis Csf in an integrated manner with the steering rotation section 12, together with the front fork 10 and the front wheel 3f. The swing section 14 is also swingable, relative to the steering rotation section 12, in the direction about the center of the rotational axis of the hinge mechanism 13. In this case, the center of the rotational axis of the hinge mechanism 13 (central axis of swing of the swing section 14) extends in the lateral direction (vehicle width direction) of the vehicle body 2. Accordingly, the swing section 14 swings in the pitching direction with respect to the steering rotation section 12 in the basic posture state of the two-wheeled vehicle 1A.

It should be noted that the basic posture state of the two-wheeled vehicle 1A is, as with the basic posture state of the two-wheeled vehicle 1 in FIG. 1, the state where the front wheel 3f and the rear wheel 3r are both stationary in the upright posture in contact with the ground surface 110 and the axle centerlines (centers of the rotational axes) Cf and Cr of the front wheel 3f and the rear wheel 3r extend in parallel with each other in the direction orthogonal to the longitudinal direction of the vehicle body 2.

The trail adjustment actuator 15 is made up of an electric motor mounted to the swing section 14. The trail adjustment actuator 15 outputs a rotative driving force via a speed reducer 17. More specifically, in the example of the present embodiment, the trail adjustment actuator 15 and the speed reducer 17 are arranged inside the swing section 14, at an upper portion and a lower portion, respectively, therein. The housings of the trail adjustment actuator 15 and the speed reducer 17 are each fixedly secured to the swing section 14. It should be noted that the speed reducer 17 may have an arbitrary structure; it may be, for example, Harmonic Drive (registered trademark), or a structure comprising a plurality of gears.

The trail adjustment actuator 15 has its output shaft connected to the input shaft of the speed reducer 17 via a power transmission mechanism 18 which is formed by a pulley-belt mechanism or the like. With this configuration, the rotative driving force generated by the trail adjustment actuator 15 is input from the output shaft of the actuator 15 via the power transmission mechanism 18 to the speed reducer 17, and it is further output from the speed reducer 17.

Further, in the present embodiment, the trail adjustment actuator 15 has an electric lock mechanism 15a built therein. The lock mechanism 15a holds the output shaft of the actuator 15 in a non-rotatable state. The lock mechanism 15a is formed by a friction brake mechanism or the like.

It should be noted that the power transmission mechanism 18 may be configured to have the function as a speed reducer, in which case the speed reducer 17 can be omitted. Alternatively, the output shaft of the trail adjustment actuator 15 and the input shaft of the speed reducer 17 may be coupled in a coaxial manner, so that the rotative driving force of the trail adjustment actuator 15 is input directly to the speed reducer 17.

Further, the trail adjustment actuator 15 may be made up of a hydraulic actuator.

The crank mechanism 16 includes a pair of crank arms 19a and 19b, arranged to rotate in an integrated manner with the output shaft of the speed reducer 17, and a connecting rod 20 which connects the crank arms 19a and 19b to the steering rotation section 12.

The crank arms 19a and 19b are arranged inside the swing section 14 such that they face each other, with spacing therebetween, in the axis direction of the output shaft of the speed reducer 17.

One crank arm 19a has a portion near its one end fixedly secured to the output shaft of the speed reducer 17, so that it can rotate in an integrated manner with the output shaft.

The other crank arm 19b has, at a portion near its one end, a spindle 21 which is secured concentrically with the output shaft of the speed reducer 17. Via this spindle 21, the crank arm 19b is axially supported in a rotatable manner by a bearing 22 fixedly secured to the swing section 14.

These crank arms 19a and 19b have their other ends connected to each other via an eccentric shaft 23 which is eccentric from the shaft center of the output shaft of the speed reducer 17 (=axes of rotation of the crank arms 19a and 19b). The connecting rod 20 has its one end arranged between the crank arms 19a and 19b and axially supported in a rotatable manner by the eccentric shaft 23. The other end of the connecting rod 20 is axially supported, inside the steering rotation section 12, in a rotatable manner by a spindle 24 which is fixedly secured to the steering rotation section 12. The axis direction of the spindle 24 is parallel to the shaft center of the eccentric shaft 23.

The trail adjustment mechanism 9 is configured as described above. Therefore, as the steering rotation section 12 and swing section 14 of the trail adjustment mechanism 9 are caused to rotate about the steering axis Csf, the front wheel 3f is steered about the steering axis Csf.

Furthermore, as the crank arms 19a and 19b are caused to rotate about the shaft center of the output shaft of the speed reducer 17 by the rotative driving force of the trail adjustment actuator 15, the swing section 14 swings about the center of the rotational axis of the hinge mechanism 13, relative to the steering rotation section 12, within a prescribed angle range. As the swing section 14 swings, the front wheel 3f also swings about the center of the rotational axis of the hinge mechanism 13. This makes the front wheel 3f displaced in the longitudinal direction with respect to the vehicle body 2. Consequently, the ground contact point of the front wheel 3f is displaced in the longitudinal direction, within a prescribed range, with respect to the point of intersection of the steering axis Csf and the ground surface 110. This results in a change of the trail t within a prescribed range.

In this case, with the swinging of the swing section 14, the front wheel 3f can be displaced in the longitudinal direction between, for example, the state indicated by the solid line in FIG. 9 and the state indicated by the two-dot chain line. In FIG. 9, the state of displacement of the front wheel 3f indicated by the solid line corresponds to the state where the trail t takes a negative value tn. The state of displacement of the front wheel 3f indicated by the two-dot chain line corresponds to the state where the trail t takes a positive value tp. Accordingly, the trail t can be changed within the range between the lower limit tn (<0) and the upper limit tp (>0).

Hereinafter, the above-described lower limit tn will be referred to as "lower trail limit tn", and the above-described upper limit tp will be referred to as "upper trail limit tp". Further, the state of displacement of the front wheel 3f when the trail t is tn (state of displacement of the front wheel 3f shown by the solid line in FIG. 9) will be referred to as "lower trail limit state", and the state of displacement of the front wheel 3f when the trail t is tp (state shown by the two-dot chain line in FIG. 9) will be referred to as "upper trail limit state".

Supplementally, the lower trail limit state is, in other words, the state where the height a of the intersection point Ef of the steering axis Csf and the straight line connecting the ground contact point and the axle center point of the front wheel 3f takes a negative value (the state where the intersection point Ef lies below the ground surface 110) in the basis posture state of the two-wheeled vehicle 1A. Further, the upper trail limit state is, in other words, the state where the above-described height a takes a positive value (the state where the intersection point Ef lies above the ground surface 110) in the basic posture state of the two-wheeled vehicle 1A.

Further, in the present embodiment, the aforesaid lock mechanism 15a mechanically holds the output shaft of the trail adjustment actuator 15 non-rotatable, so that the swing section 14 is held in a non-swingable state with respect to the steering rotation section 12. This enables the trail t to be mechanically fixedly secured (locked), without the need to control the driving force of the trail adjustment actuator 15.

In the present embodiment, the trail adjustment actuator 15 is provided with the lock mechanism 15a. Alternatively, instead of the lock mechanism 15a, a lock mechanism which holds the output shaft of the speed reducer 17 or the crank arms 19a and 19b non-rotatable, for example, may be provided on the output side of the speed reducer 17.

The aforesaid steering actuator 8 generates, as a steering force for performing the steering of the front wheel 3f, a rotative driving force to cause the front wheel 3f to rotate about the steering axis Csf. In the present embodiment, this steering actuator 8 is made up of an electric motor. The steering actuator 8 has its housing fixedly secured to the vehicle body 2. Further, the output shaft of the steering actuator 8 is connected to the lower end portion of the steering rotation section 12 via a power transmission mechanism 25 which is formed by a pulley-belt mechanism or the like. With this configuration, the rotative driving force about the steering axis Csf is applied from the steering actuator 8 via the power transmission mechanism 25 to the steering rotation section 12. It should be noted that the power transmission mechanism 25 also has a speed reducing function.

As the rotative driving force is applied from the steering actuator 8 to the steering rotation section 12, the front-wheel support mechanism 4 including the trail adjustment mechanism 9 and the front fork 10 is rotatively driven about the steering axis Csf together with the front wheel 3f. As a result, the front wheel 3f is steered by the rotative driving force of the steering actuator 8.

Further, in the present embodiment, a steering clutch 8a, which is a clutch mechanism for interrupting the power transmission between the steering actuator 8 and the steering rotation section 12 as appropriate, is built in the power transmission mechanism 25. This steering clutch 8a is made up, for example, of an electromagnetic clutch.

It should be noted that the steering actuator 8 is not limited to the electric motor; it may be made up, for example, of a hydraulic actuator.

The operation apparatus 7 is mounted to the trail adjustment mechanism 9. In the present embodiment, the operation apparatus 7 is fixedly secured to the upper end portion of the steering rotation section 12 of the trail adjustment mechanism 9 via a support strut 26, such that the operation apparatus 7 rotates about the steering axis Csf in an integrated manner with the steering rotation section 12. Although not shown in detail in the figure, this operation apparatus 7 is equipped with an accelerator grip, brake lever, turn signal switch, and so on, as with the handlebar of a conventional motorcycle.

An actuator 27 for rotatively driving the front wheel 3f about its axle centerline Cf is attached to the axle of the front wheel 3f. The actuator 27 has a function as a power engine which generates a thrust force for the two-wheeled vehicle 1A. In the present embodiment, this actuator 27 (hereinafter, also referred to as "travel-assist actuator 27") is made up of an electric motor (with a speed reducer).

It should be noted that the travel-assist actuator 27 may be made up of a hydraulic actuator, for example, instead of the electric motor. Alternatively, the travel-assist actuator 27 may be made up of an internal combustion engine. Furthermore, the travel-assist actuator 27 may be attached to the vehicle body 2 at a position apart from the axle of the front wheel 3f, and the travel-assist actuator 27 and the axle of the front wheel 3f may be connected by an appropriate power transmission device.

Further, instead of, or in addition to, the travel-assist actuator 27, an actuator for rotatively driving the rear wheel 3r may be provided.

At the rear portion of the vehicle body 2, a rear-wheel support mechanism 5 for axially supporting the rear wheel 3r in a rotatable manner is mounted. The rear-wheel support mechanism 5 includes a swing arm 28, and a suspension mechanism 29 including a coil spring, damper, and so on. These mechanical structures are similar to those in the rear-wheel support mechanism in a conventional motorcycle, for example.

At one end of the swing arm 28 (at its end on the rear side of the vehicle body 2), the rear wheel 3r is axially supported, via bearings or the like, such that it can rotate about the axle centerline Cr (center of the rotational axis of the rear wheel 3r) that extends in the direction orthogonal to the diameter direction of the rear wheel 3r (in the direction perpendicular to the paper plane of FIG. 9). It should be noted that the rear wheel 3r is a non-steered wheel.

Figure 12:
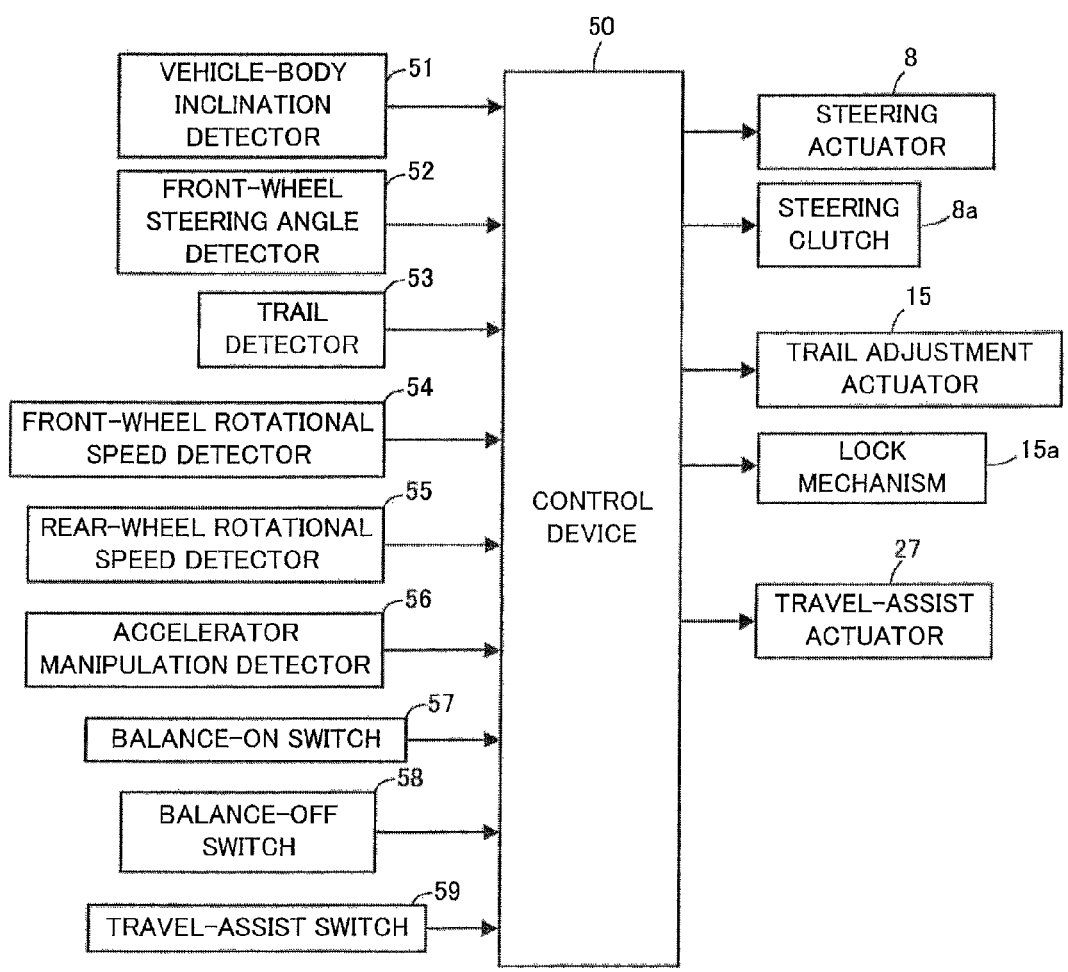
FIG. 12 is a block diagram showing the configuration related to the control of the mobile vehicle in FIG. 9.

Besides the above-described mechanical configuration, the two-wheeled vehicle 1A includes, as shown in FIG. 12, a control device 50 which carries out control processing for controlling the operations of the aforesaid steering actuator 8, steering clutch 8*a*, trail adjustment actuator 15, lock mechanism 15*a*, and travel-assist actuator 27.

The two-wheeled vehicle 1A further includes, as sensors for detecting various kinds of state quantities necessary for the control processing in the control device 50, a vehicle-body inclination detector 51 for detecting an inclination angle φb in the roll direction of the vehicle body 2, a front-wheel steering angle detector 52 for detecting a steering angle δf (angle of rotation about the steering axis Csf) of the front wheel 3*f*, a trail detector 53 for detecting a trail, a front-wheel rotational speed detector 54 for detecting a rotational speed (angular velocity) of the front wheel 3*f*, a rear-wheel rotational speed detector 55 for detecting a rotational speed (angular velocity) of the rear wheel 3*r*, and an accelerator manipulation detector 56 which outputs a detection signal corresponding to the accelerator manipulated variable which is the manipulated variable (rotational amount) of the accelerator grip of the operation apparatus 7.

It should be noted that the steering angle δf of the front wheel 3*f* more specifically means the rotational angle of the front wheel 3*f* from the steering angle (neutral steering angle) in its non-steered state (the state in which the direction of the axle centerline Cf of the front wheel 3*f* corresponds to the direction orthogonal to the longitudinal direction of the vehicle body 2 (or, direction parallel to the Y axis)). Therefore, the steering angle δf of the front wheel 3*f* in the non-steered state is "0". The positive rotational direction of the steering angle δf of the front wheel 3*f* corresponds to the direction of rotation that makes the front end of the front wheel 3*f* turn left with respect to the vehicle body 2 (in other words, the direction in which the front wheel 3*f* turns counterclockwise about the steering axis Csf as the two-wheeled vehicle 1A is seen from above), as in the case of the two-wheeled vehicle 1 shown in FIG. 1.

Further, the two-wheeled vehicle 1A includes an operation switch 57 (hereinafter, referred to as "balance-on switch 57") which instructs the control device 50 to control the posture in the roll direction of the vehicle body 2, an operation switch 58 (hereinafter, referred to as "balance-off switch 58") which instructs the control device 50 to release the posture control, and an operation switch 59 (hereinafter, referred to as "travel-assist switch 59") which instructs the control device 50 to start assisted traveling of the two-wheeled vehicle 1A (traveling by the driving force of the travel-assist actuator 27).

The control device 50, which is an electronic circuit unit made up of a CPU, RAM, ROM, interface circuit and so on, is mounted on the vehicle body 2. This control device 50 is configured to receive outputs (detection signals) from the above-described detectors 51 to 56 and outputs from the switches 57 to 59 (signals indicating the operational states of the switches 57 to 59).

The control device 50 may include a plurality of CPUs or processors. Further, the control device 50 may be made up of a plurality of mutually communicable electronic circuit units.

The vehicle-body inclination detector 51, which is made up of an acceleration sensor and a gyro sensor (angular velocity sensor), for example, is mounted on the vehicle body 2. In this case, the control device 50 carries out arithmetic processing on the basis of the outputs of the acceleration sensor and the gyro sensor, to measure the inclination angle in the roll direction (more specifically, the inclination angle in the roll direction with respect to the vertical direction (direction of gravitational force)) of the vehicle body 2. For this measurement, the technique proposed by the present applicant in Japanese Patent No. 4181113, for example, may be adopted.

The front-wheel steering angle detector 52 is made up, for example, of a rotary encoder or other detector attached to the steering actuator 8 (electric motor) (the detector outputting a detection signal responsive to the rotational angle or rotational angular velocity of the output shaft of the steering actuator 8). Alternatively, the front-wheel steering angle detector 52 may be made up of a rotary encoder attached to the aforesaid power transmission mechanism 25 or steering rotation section 12 on the aforesaid steering axis Csf (the detector outputting a detection signal responsive to the rotational angle or rotational angular velocity of the steering rotation section 12).

The trail detector 53 is made up, for example, of a rotary encoder or other detector attached to the aforesaid trail adjustment actuator 15 (electric motor) (the detector outputting a detection signal responsive to the rotational angle or rotational angular velocity of the output shaft of the trail adjustment actuator 15).

Here, in the present embodiment, the trail t is defined in accordance with the amount of swing of the swing section 14 (angle of rotation about the center of rotational axis of the hinge mechanism 13) relative to the steering rotation section 12 of the trail adjustment mechanism 9. The amount of swing of the swing section 14 is defined in accordance with the angles of rotation of the crank arms 19*a* and 19*b*. Further, the angles of rotation of the crank arms 19*a* and 19*b* are defined in accordance with the angle of rotation of the output shaft of the trail adjustment actuator 15. Accordingly, the trail t can be detected from an output of the rotary encoder or other detector attached to the trail adjustment actuator 15.

It should be noted that the trail detector 53 may be made up, for example, of a rotary encoder or other detector attached to the aforesaid speed reducer 17 (the detector outputting a detection signal responsive to the rotational angle or rotational angular velocity of the output shaft of the speed reducer 17).

The front-wheel rotational speed detector 54 is made up, for example, of a rotary encoder or other detector attached to the axle of the front wheel 3*f* (the detector outputting a detection signal responsive to the rotational angle or rotational angular velocity of the front wheel 3*f*).

The rear-wheel rotational speed detector 55 is made up, for example, of a rotary encoder or other detector attached to the axle of the rear wheel 3*r* (the detector outputting a detection signal responsive to the rotational angle or rotational angular velocity of the rear wheel 3*r*).

The accelerator manipulation detector 56 is made up, for example, of a rotary encoder, potentiometer, or other detector built in the operation apparatus 7 (the detector outputting a detection signal responsive to the rotational angle or rotational angular velocity of the accelerator grip).

The balance-on switch 57, balance-off switch 58, and travel-assist switch 59 are each formed of a push-button switch, for example. These switches 57 to 59 are attached to the operation apparatus 7 or the like so that the rider can manipulate them.

The functions of the above-described control device 50 will be described further with reference to FIG. 13. The XYZ coordinate system used in the following description is, as in the case of the two-wheeled vehicle 1 in FIG. 1, a coordinate system in which, in the basic posture state of the two-wheeled vehicle 1A, the vertical direction (up-and-down direction) is defined as the Z-axis direction, the longitudinal direction of the vehicle body 2 as the X-axis direction, the lateral direction of the vehicle body 2 as the Y-axis direction, and a point on the ground surface 110 immediately beneath the overall center of gravity G of the two-wheeled vehicle 1A as the origin (see FIG. 9).

Further, in the following description, the suffix "_act" is added to the reference characters of a state quantity as a sign indicating an actual value or its observed value (detected value or estimate). For a desired value, the suffix "_cmd" is added.

Figure 13:
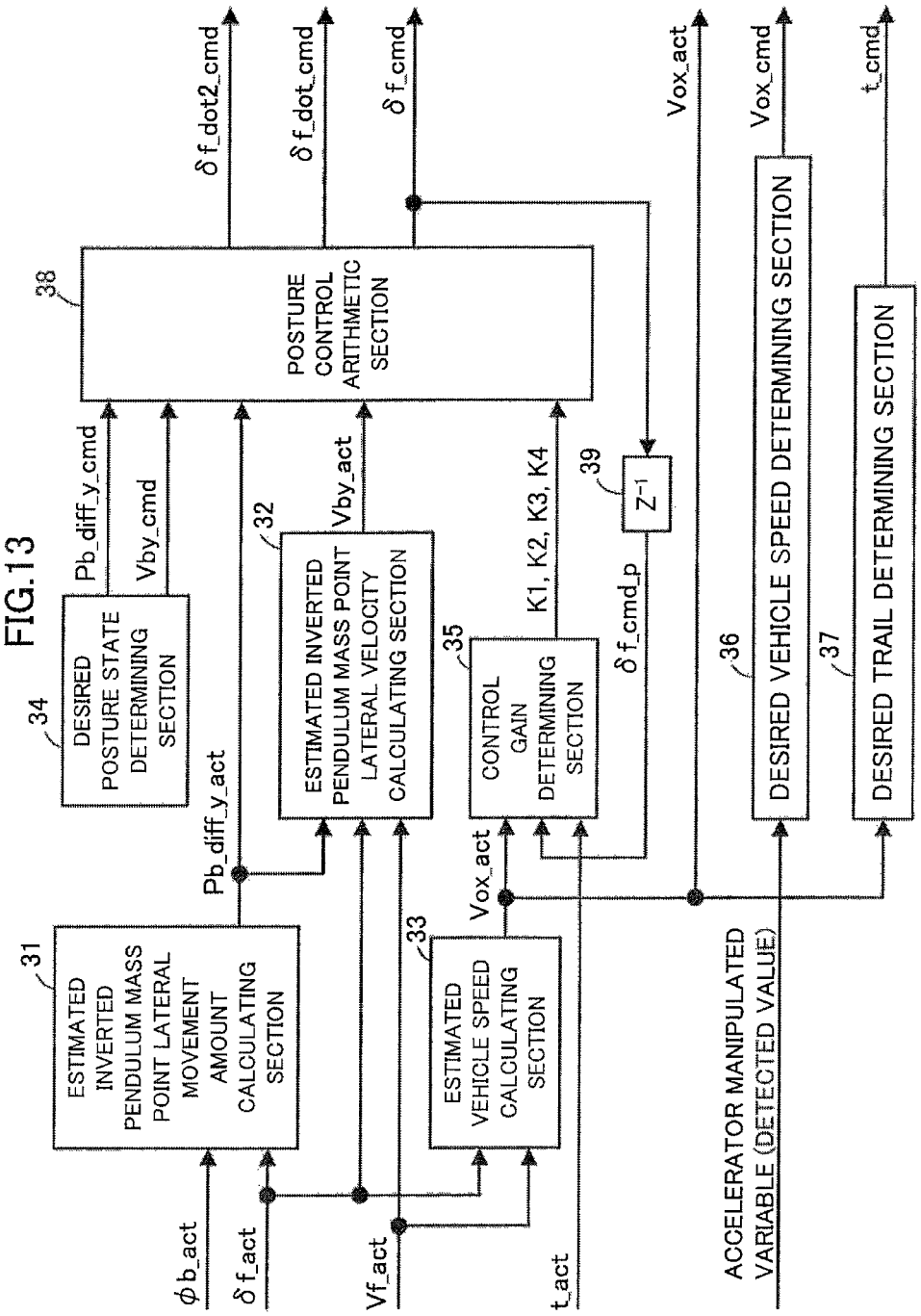
FIG. 13 is a block diagram showing the major functions of the control device shown in FIG. 12.
Figure 14:
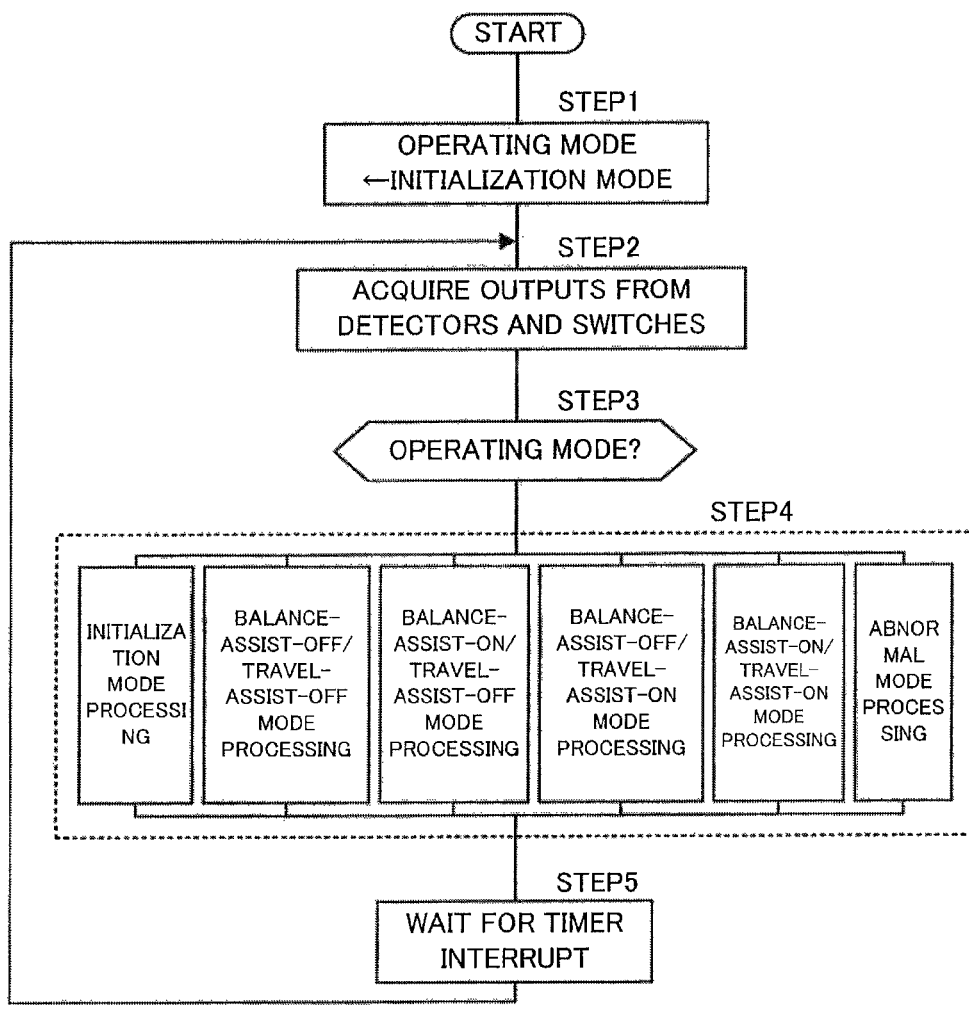
FIG. 14 is a flowchart showing the processing in the control device shown in FIG. 12.

The control device 50 includes, as major functions implemented when the CPU executes installed programs (functions implemented by software) or as major functions implemented by hardware, as shown in FIG. 13: an estimated inverted pendulum mass point lateral movement amount calculating section 31 which calculates an estimate of an actual value Pb_diff_y_act (hereinafter, referred to as "estimated inverted pendulum mass point lateral movement amount Pb_diff_y_act") of an inverted pendulum mass point lateral movement amount Pb_diff_y representing a movement amount in the Y-axis direction (lateral direction of the vehicle body 2) of an inverted pendulum mass point 123 (=first mass point 123) of the two-wheeled vehicle 1A; an estimated inverted pendulum mass point lateral velocity calculating section 32 which calculates an estimate of an actual value Vby_act (hereinafter, referred to as "estimated inverted pendulum mass point lateral velocity Vby_act") of an inverted pendulum mass point lateral velocity Vby representing a translational velocity in the Y-axis direction (lateral direction of the vehicle body 2) of the inverted pendulum mass point 123; an estimated vehicle speed calculating section 33 which calculates an estimate of an actual value Vox_act (hereinafter, referred to as "estimated vehicle speed Vox_act") of the vehicle speed Vox of the two-wheeled vehicle 1A; a desired posture state determining section 34 which determines a desired value Pb_diff_y_cmd (hereinafter, referred to as "desired inverted pendulum mass point lateral movement amount Pb_diff_y_cmd") of the inverted pendulum mass point lateral movement amount Pb_diff_y and a desired value Vby_cmd (hereinafter, referred to as "desired inverted pendulum mass point lateral velocity Vby_cmd") of the inverted pendulum mass point lateral velocity Vby; a control gain determining section 35 which determines values of a plurality of gains K1, K2, K3, and K4 for posture control of the vehicle body 2; a desired vehicle speed determining section 36 which determines a desired value Vox_cmd (hereinafter, referred to as "desired vehicle speed Vox_cmd") of the vehicle speed of the two-wheeled vehicle 1A; and a desired trail determining section 37 which determines a desired value t_cmd (hereinafter, referred to as "desired trail t_cmd") of the trail t.

The control device 50 further includes a posture control arithmetic section 38 which carries out arithmetic processing for the posture control of the vehicle body 2 to thereby determine a desired value δf_cmd (hereinafter, referred to as "desired front-wheel steering angle δf_cmd") of the steering angle δf of the front wheel 3f, a desired value δf_dot_cmd (hereinafter, referred to as "desired front-wheel steering angular velocity δf_dot_cmd") of the steering angular velocity δf_dot which is a temporal change rate of the steering angle δf, and a desired value δf_dot2_cmd (hereinafter, referred to as "desired front-wheel steering angular acceleration δf_dot2_cmd") of the steering angular acceleration δf_dot2 which is a temporal change rate of the steering angular velocity δf_dot.

In controlling the posture in the roll direction of the vehicle body 2, the control device 50 controls the steering actuator 8 in accordance with the desired front-wheel steering angle δf_cmd, the desired front-wheel steering angular velocity δf_dot_cmd, and the desired front-wheel steering angular acceleration δf_dot2_cmd determined by the posture control arithmetic section 38.

In controlling the posture in the roll direction of the vehicle body 2, the control device 50 also controls the trail adjustment actuator 15 in accordance with the desired trail t_cmd determined by the desired trail determining section 37.

During the traveling of the two-wheeled vehicle 1A, the control device 50 controls the travel-assist actuator 27 in accordance with the desired vehicle speed Vox_cmd determined by the desired vehicle speed determining section 36.

A description of how the two-wheeled vehicle 1A of the present embodiment works will be given below, with a focus on the control processing performed by the control device 50.

When a power switch, for example a key switch, (not shown) of the two-wheeled vehicle 1A is turned on, the control device 50 and others are started. The control device 50 executes an installed program to perform the processing shown in the flowchart in FIG. 14.

In the state where the power switch is off, the trail adjustment actuator 15, the steering actuator 8, and the travel-assist actuator 27 are in the off state (where they do not generate driving or steering force). Further, the lock mechanism 15a is in the state where it holds the output shaft of the trail adjustment actuator 15 non-rotatable. Further, the steering clutch 8a is in the off state (where it interrupts the power transmission between the steering actuator 8 and the steering rotation section 12).

First, in STEP 1, the control device 50 selects an initialization mode as the operating mode of the two-wheeled vehicle 1A.

In the present embodiment, the operating modes of the two-wheeled vehicle 1A include: an initialization mode in which initialization processing immediately after the startup is carried out; a balance-assist-off/travel-assist-off mode which is an operating mode in which neither the control of posture in the roll direction of the vehicle body 2 (hereinafter, also simply referred to as "posture control") nor the control of assisted traveling (or, travel-assist control) is carried out; a balance-assist-on/travel-assist-off mode which is an operating mode in which only the posture control out of the posture control and the travel-assist control is carried out; a balance-assist-off/travel-assist-on mode which is an operating mode in which only the travel-assist control out of the posture control and the travel-assist control is carried out; a balance-assist-on/travel-assist-on mode which is an operating mode in which both of the posture control and the travel-assist control are carried out; and an abnormal mode in which processing to be performed in the event of occurrence of a prescribed anomaly is carried out.

The control device 50 selectively carries out the processing in one of the operating modes. In STEP 1 described above, the control device 50 selects the initialization mode as the operating mode immediately after the startup.

Next, in STEP 2, the control device 50 acquires outputs (detection signals) from the detectors 51 to 56 and outputs (operational states) of the switches 57 to 59.

Next, in STEP 3, the control device 50 determines the operating mode currently selected. In STEP 4, the control device 50 carries out the processing corresponding to the operating mode currently selected. Then, in STEP 5, the control device 50 waits for a timer interrupt for each prescribed control processing cycle.

Thereafter, at each prescribed control processing cycle, the processes in STEPS 2 to 5 are carried out successively.

Figure 15:
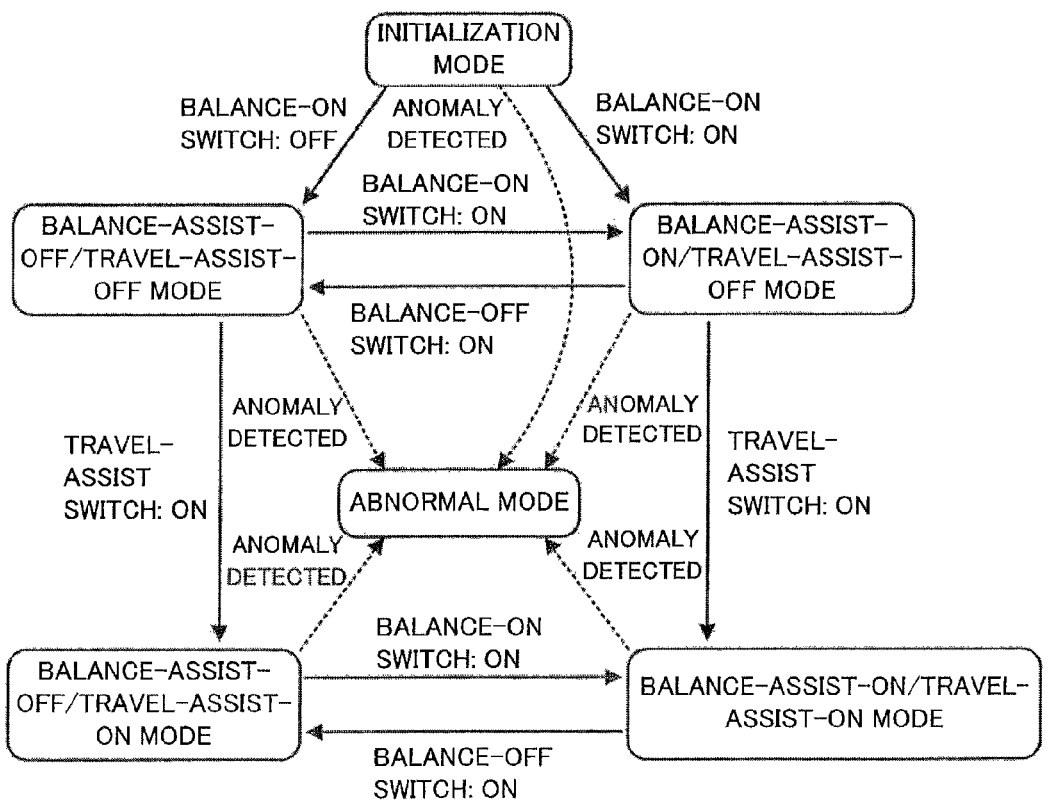
FIG. 15 is a diagram illustrating the transitions between the operating modes in relation to the flowchart in FIG. 14.

Here, a general description of the transitions between the operating modes will be given with reference to FIG. 15. As shown in FIG. 15, immediately after the turning-on of the power switch, the operating mode is set to the initialization mode. In the initialization mode, the on/off state of the balance-on switch 57 is monitored. When the balance-on switch 57 is maintained in the off state (not turned on), the operating mode shifts to the balance-assist-off/travel-assist-off mode. On the other hand, when the balance-on switch 57 is turned on, the operating mode shifts to the balance-assist-on/travel-assist-off mode.

In the balance-assist-off/travel-assist-off mode, the on/off states of the travel-assist switch 59 and the balance-on switch 57 are monitored. When the travel-assist switch 59 is turned on, the operating mode shifts to the balance-assist-off/travel-assist-on mode. When the balance-on switch 57 is turned on, the operating mode shifts to the balance-assist-on/travel-assist-off mode.

In the balance-assist-on/travel-assist-off mode, the on/off states of the travel-assist switch 59 and the balance-off switch 58 are monitored. When the travel-assist switch 59 is turned on, the operating mode shifts to the balance-assist-on/travel-assist-on mode. When the balance-off switch 58 is turned on, the operating mode shifts to the balance-assist-off/travel-assist-off mode.

In the balance-assist-off/travel-assist-on mode, the on/off state of the balance-on switch 57 is monitored. When the balance-on switch 57 is turned on, the operating mode shifts to the balance-assist-on/travel-assist-on mode.

In the balance-assist-on/travel-assist-on mode, the on/off state of the balance-off switch 58 is monitored. When the balance-off switch 58 is turned on, the operating mode shifts to the balance-assist-off/travel-assist-on mode.

In any of the initialization mode, balance-assist-off/travel-assist-off mode, balance-assist-on/travel-assist-off mode, balance-assist-off/travel-assist-on mode, and balance-assist-on/travel-assist-on mode, if there occurs a prescribed anomaly such as an anomaly in output from any of the detectors 51 to 56, an anomaly in operation of any of the actuators 8, 15, and 27, or an anomaly in operation of the electrical equipment system, the operating mode shifts preferentially to the abnormal mode.

Further, in any of the initialization mode, balance-assist-off/travel-assist-off mode, balance-assist-on/travel-assist-off mode, balance-assist-off/travel-assist-on mode, and balance-assist-on/travel-assist-on mode, when the power switch of the two-wheeled vehicle 1A is turned off, the processing in the operating mode is terminated.

It should be noted that the sequence of transitions between the operating modes may be set differently from the above.

The processing in each of the above-described operating modes will now be described.

Figure 16:
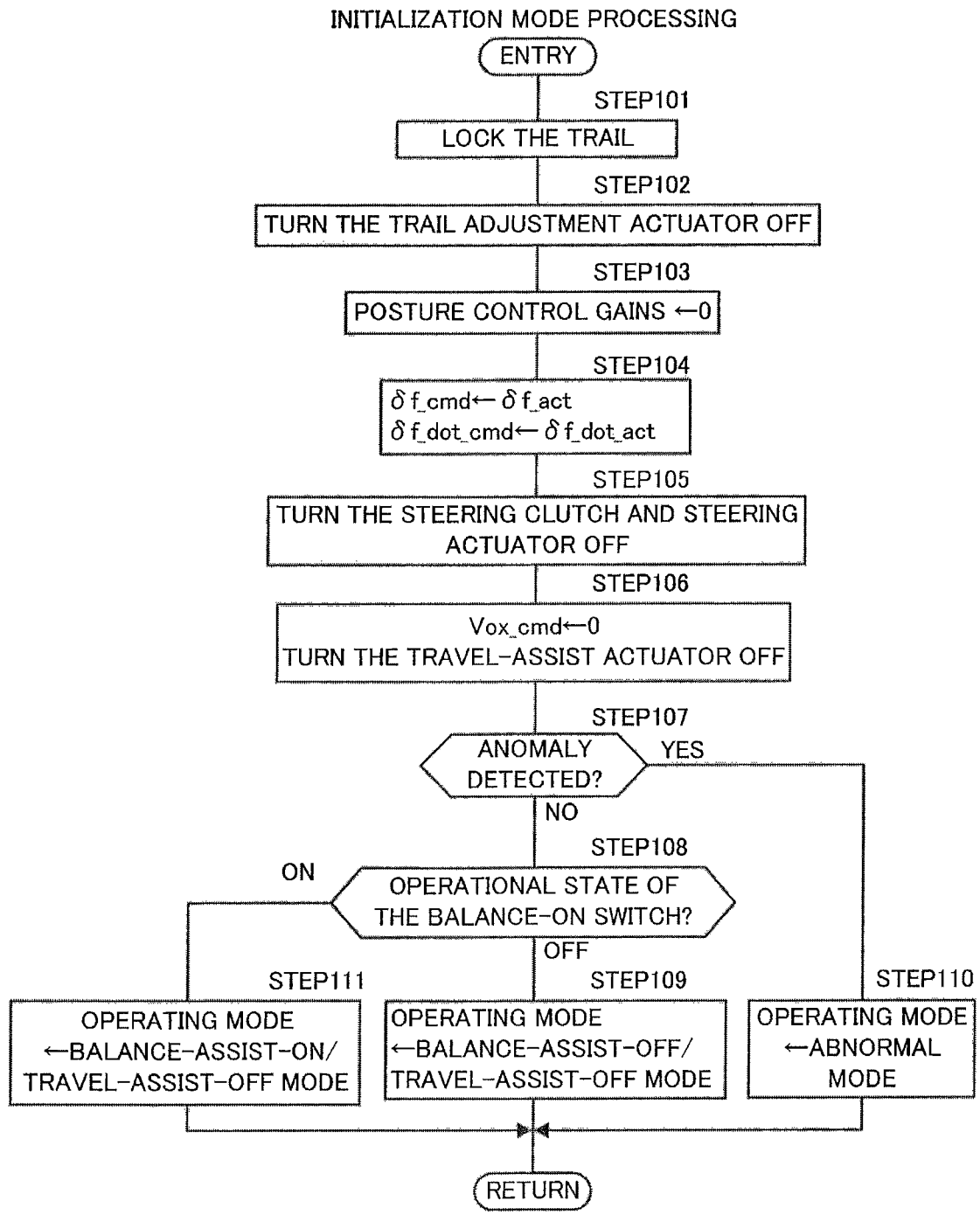
FIG. 16 is a flowchart showing the processing in the initialization mode in the flowchart in FIG. 14.

The processing in the initialization mode is carried out as shown by a flowchart in FIG. 16.

First, in STEP 101, the control device 50 causes the lock mechanism 15a to keep the output shaft of the trail adjustment actuator 15 non-rotatable, to thereby lock the trail t in the current state.

Then, in STEP 102, the control device 50 sets the trail adjustment actuator 15 to the off state (the state of generating no driving force). Specifically, the control device 50 maintains the state where no power is supplied to the trail adjustment actuator 15 (electric motor).

Next, in STEP 103, the control device 50 initializes each of the values of the posture control gains K1, K2, K3, and K4 (described later) for use in posture control of the vehicle body 2, to zero.

Further, in STEP 104, the control device 50 sets a desired front-wheel steering angle δf_cmd and a desired front-wheel steering angular velocity δf_dot_cmd to match a detected value of the actual steering angle δf_act (hereinafter, referred to as "detected front-wheel steering angle δf_act") of the front wheel 3f, and a detected value of the actual steering angular velocity δf_dot_act (hereinafter, referred to as "detected front-wheel steering angular velocity δf_dot_act") of the front wheel 3f, respectively, which are each indicated by an output from the front-wheel steering angle detector 52.

Then, in STEP 105, the control device 50 sets the aforesaid steering clutch 8a to the off state (where the power transmission between the steering actuator 8 and the steering rotation section 12 is interrupted). Further, the control device 50 sets the steering actuator 8 to the off state (the state of generating no steering force). Specifically, the control device 50 maintains the state where no power is supplied to the steering actuator 8 (electric motor).

Next, in STEP 106, the control device 50 sets the value of the desired vehicle speed Vox_cmd of the two-wheeled vehicle 1A to zero, and also sets the travel-assist actuator 27 to the off state (the state of generating no driving force). Specifically, the control device 50 maintains the state where no power is supplied to the travel-assist actuator 27 (electric motor).

Next, in STEP 107, the control device 50 determines whether any of the aforesaid prescribed anomalies has been detected. If no anomaly has been detected, in STEP 108, the control device 50 determines the operational state of the balance-on switch 57.

If it is determined in STEP 108 that the balance-on switch 57 remains in the off state, in STEP 109, the control device 50 sets the operating mode in the next time's control processing cycle to the balance-assist-off/travel-assist-off mode, and terminates the processing in the initialization mode in the current (current time's) control processing cycle.

If it is determined in STEP 108 that the balance-on switch 57 has been turned on, in STEP 111, the control device 50 sets the operating mode in the next time's control processing cycle to the balance-assist-on/travel-assist-off mode, and terminates the processing in the initialization mode in the current time's control processing cycle.

Further, if it is determined in the aforesaid STEP 107 that an anomaly has been detected, in STEP 110, the control device 50 sets the operating mode in the next time's control processing cycle to the abnormal mode, and terminates the processing in the initialization mode in the current time's control processing cycle.

The above has described the processing in the initialization mode. With this processing, when there has occurred an anomaly, when the balance-on switch 57 is in the off state, or when the balance-on switch 57 has been turned on, the operating mode in the next time's control processing cycle shifts to the abnormal mode, the balance-assist-off/travel-assist-off mode, or the balance-assist-on/travel-assist-off mode, respectively.

It should be noted that in the initialization mode, the actuators 8, 15, and 27 are all maintained in the off state.

Figure 17:
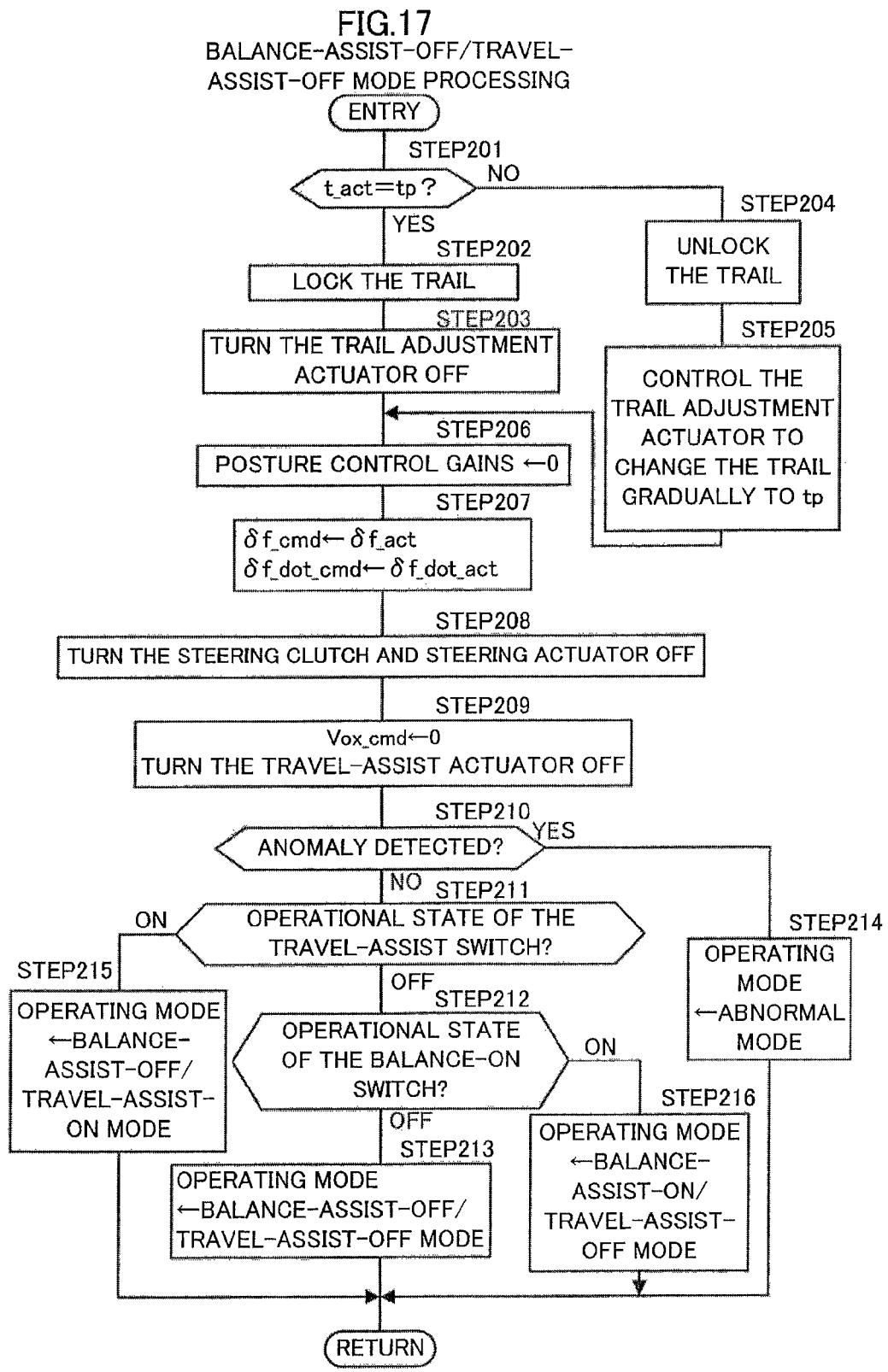
FIG. 17 is a flowchart showing the processing in the balance-assist-off/travel-assist-off mode in the flowchart in FIG. 14.

The processing in the balance-assist-off/travel-assist-off mode is carried out as shown by a flowchart in FIG. 17.

First, in STEP 201, the control device 50 determines whether the detected value of the actual trail t_act (hereinafter, referred to as "detected trail t_act") indicated by an output from the trail detector 53 coincides, or almost coincides, with the aforesaid upper trail limit tp.

This determination is made according to whether the magnitude (absolute value) of the difference between the detected trail t_act and the upper trail limit tp is a predetermined, prescribed value or less. It should be noted that in the state where the trail t_act is being controlled to a required or desired trail t_cmd by the trail adjustment actuator 15, the desired trail t_cmd, instead of the detected trail t_act, may be used to perform the determination process in STEP 201.

If the determination result in STEP 201 is "YES" (when the detected trail t_act coincides, or almost coincides, with the upper trail limit tp), in STEP 202, the control device 50 locks the trail t. Further, in STEP 203, the control device 50 sets the trail adjustment actuator 15 to the off state. The processes in STEPS 202 and 203 are identical to the processes in STEPS 101 and 102, respectively, in the aforesaid initialization mode.

If the determination result in STEP 201 is "NO", in STEP 204, the control device 50 causes the lock mechanism 15a to unlock the trail (or, sets the lock mechanism 15a to the off state). Further, in STEP 205, the control device 50 controls the trail adjustment actuator 15 to change the trail t_act gradually to the upper trail limit tp.

For example, the control device 50 controls the trail adjustment actuator 15 such that it makes the trail t_act approach the upper trail limit tp at a prescribed rate.

Following the STEP 203 or 205, in STEPS 206 to 210, the control device 50 carries out the processes identical to those in STEPS 103 to 107 in the aforesaid initialization mode.

Then, if it is determined in STEP 210 that no anomaly has been detected, in STEP 211, the control device 50 determines the operational state of the travel-assist switch 59.

If it is determined in STEP 211 that the travel-assist switch 59 remains in the off state, next, in STEP 212, the control device 50 determines the operational state of the balance-on switch 57.

If it is determined in STEP 212 that the balance-on switch 57 remains in the off state, in STEP 213, the control device 50 sets the operating mode in the next time's control processing cycle to the balance-assist-off/travel-assist-off mode (which is the same mode as in the current time's control processing cycle), and terminates the processing in the balance-assist-off/travel-assist-off mode in the current time's control processing cycle.

If it is determined in STEP 212 that the balance-on switch 57 has been turned on, in STEP 216, the control device 50 sets the operating mode in the next time's control processing cycle to the balance-assist-on/travel-assist-off mode, and terminates the processing in the balance-assist-off/travel-assist-off mode in the current time's control processing cycle.

Further, if it is determined in the aforesaid STEP 211 that the travel-assist switch 59 has been turned on, in STEP 215, the control device 50 sets the operating mode in the next time's control processing cycle to the balance-assist-off/travel-assist-on mode, and terminates the processing in the balance-assist-off/travel-assist-off mode in the current time's control processing cycle.

Further, if it is determined in the aforesaid STEP 210 that an anomaly has been detected, in STEP 214, the control device 50 sets the operating mode in the next time's control processing cycle to the abnormal mode, and terminates the processing in the balance-assist-off/travel-assist-off mode in the current time's control processing cycle.

The above has described the processing in the balance-assist-off/travel-assist-off mode. With this processing, except for the case where an anomaly has been detected, or the travel-assist switch 59 has been turned on, or the balance-on switch 57 has been turned on, the operating mode in the next time's control processing cycle is maintained in the balance-assist-off/travel-assist-off mode. When an anomaly has been detected, the travel-assist switch 59 has been turned on, or the balance-on switch 57 has been turned on, the operating mode in the next time's control processing cycle shifts to the abnormal mode, the balance-assist-off/travel-assist-on mode, or the balance-assist-on/travel-assist-off mode, respectively.

Further, in the balance-assist-off/travel-assist-off mode, the steering actuator 8 and the travel-assist actuator 27 are in the off state. This allows a rider of the two-wheeled vehicle 1A to freely steer the front wheel 3f by maneuvering the operation apparatus 7. The rider can also move the two-wheeled vehicle 1A by holding the operation apparatus 7 and causing the front wheel 3f and the rear wheel 3r to roll.

At this time, the steering clutch 8a is in the off state. This can reduce the friction at the time when the rider steers the front wheel 3f by operating the operation apparatus 7.

Further, in the balance-assist-off/travel-assist-off mode, the trail t is maintained at the upper trail limit tp (>0), or it is displaced toward the upper trail limit tp and then maintained at the upper trail limit tp. In this case, the trail t is fixedly held at the upper trail limit tp by activation of the lock mechanism 15a. Therefore, in this state, the driving force of the trail adjustment actuator 15 is unnecessary. It is thus possible to set the trail adjustment actuator 15 to the off state to thereby save the electricity otherwise consumed by the trail adjustment actuator 15.

Figure 18:
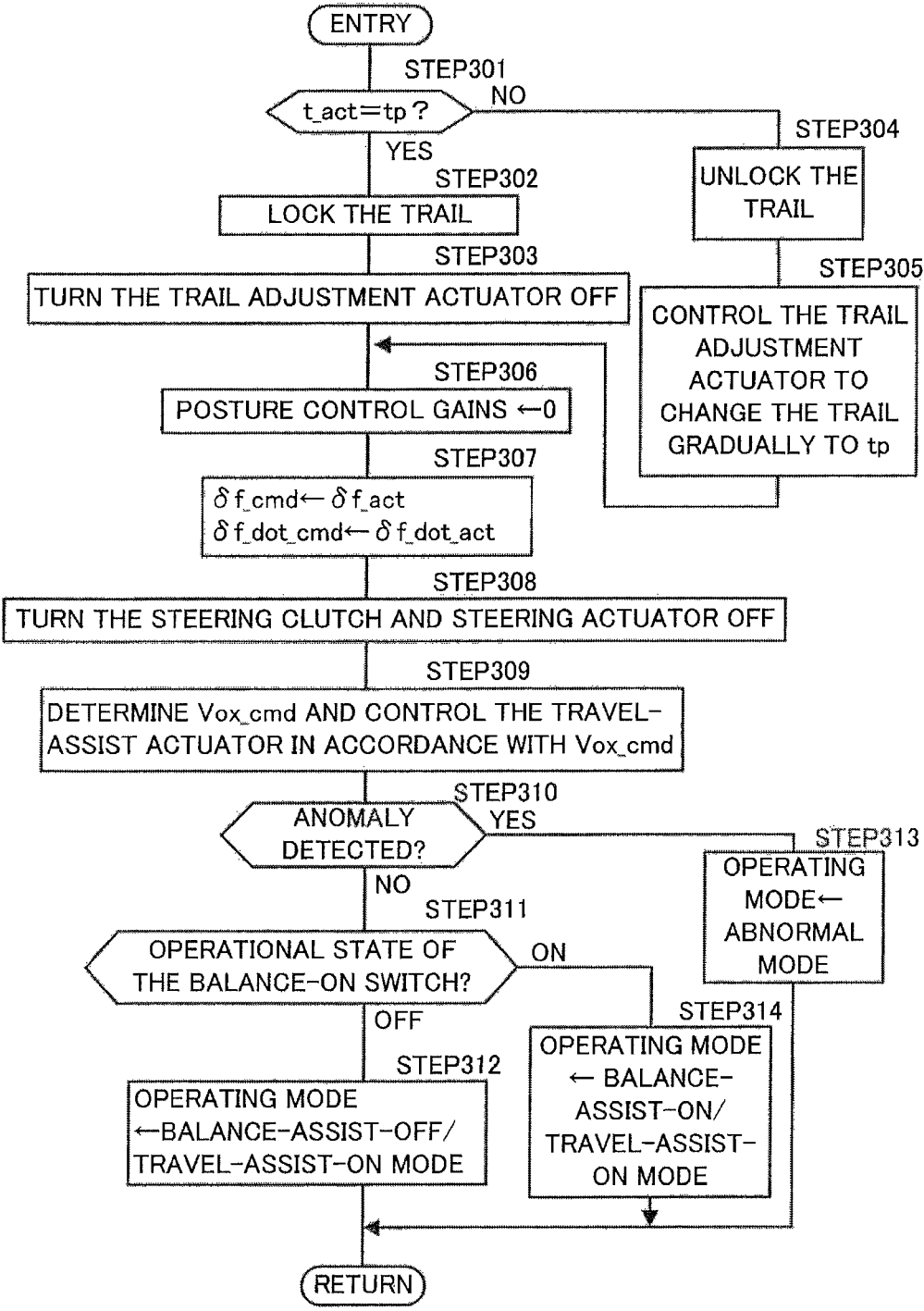
FIG. 18 is a flowchart showing the processing in the balance-assist-off/travel-assist-on mode in the flowchart in FIG. 14.

The processing in the balance-assist-off/travel-assist-on mode is carried out as shown by a flowchart in FIG. 18.

First, in STEPS 301 to 308, the control device 50 carries out the processes identical to those in STEPS 201 to 208 in the aforesaid balance-assist-off/travel-assist-off mode.

Next, in STEP 309, the control device 50 determines a desired vehicle speed Vox_cmd of the two-wheeled vehicle 1A, and controls the travel-assist actuator 27 in accordance with the desired vehicle speed Vox_cmd. The processing in this STEP 309 will be described in detail later.

Next, in STEP 310, the control device 50 carries out the determination process which is identical to that in STEP 107 in the aforesaid initialization mode. That is, the control device 50 determines whether a prescribed anomaly has been detected. If no anomaly has been detected, in STEP 311, the control device 50 determines the operational state of the balance-on switch 57.

If it is determined in STEP 311 that the balance-on switch 57 remains in the off state, in STEP 312, the control device 50 sets the operating mode in the next time's control processing cycle to the balance-assist-off/travel-assist-on mode (which is the same mode as in the current time's control processing cycle), and terminates the processing in the balance-assist-off/travel-assist-on mode in the current time's control processing cycle.

If it is determined in STEP 311 that the balance-on switch 57 has been turned on, in STEP 314, the control device 50 sets the operating mode in the next time's control processing cycle to the balance-assist-on/travel-assist-on mode, and terminates the processing in the balance-assist-off/travel-assist-on mode in the current time's control processing cycle.

Further, if it is determined in the aforesaid STEP 310 that an anomaly has been detected, in STEP 313, the control device 50 sets the operating mode in the next time's control processing cycle to the abnormal mode, and terminates the processing in the balance-assist-off/travel-assist-on mode in the current time's control processing cycle.

The processing in the above-described STEP 309 will now be described in detail. In STEP 309, the control device 50 determines the desired vehicle speed Vox_cmd by the processing in the aforesaid desired vehicle speed determining section 36. Specifically, the desired vehicle speed determining section 36 determines the desired vehicle speed Vox_cmd from the detected value of the actual value of the accelerator manipulated variable indicated by an output from the accelerator manipulation detector 56, in accordance with a preset mapping or arithmetic expression. In this case, the desired vehicle speed Vox_cmd is determined, within the range not exceeding a predetermined maximum value, such that the desired vehicle speed becomes higher as the accelerator manipulated variable becomes larger.

When the brake is being applied to the two-wheeled vehicle 1A, the desired vehicle speed Vox_cmd may be determined in accordance with the detected value of the brake manipulated variable, or in accordance with both of the detected value of the brake manipulated variable and the detected value of the accelerator manipulated variable, by a predetermined mapping or arithmetic expression.

The control device 50 further calculates an estimated vehicle speed Vox_act (an estimate of the actual vehicle speed Vox_act) by the processing in the aforesaid estimated vehicle speed calculating section 33.

In this case, as shown in FIG. 13, the estimated vehicle speed calculating section 33 receives a detected value of the actual value δf_act (hereinafter, referred to as "detected front-wheel steering angle δf_act") of the steering angle δf of the front wheel 3f, and an estimate of the actual value Vf_act (hereinafter, referred to as "estimated front-wheel rotational transfer velocity Vf_act") of the rotational transfer velocity Vf of the front wheel 3f.

It should be noted that the detected front-wheel steering angle δf_act is a detected value (observed value) indicated by an output from the front-wheel steering angle detector 52. Further, the estimated front-wheel rotational transfer velocity Vf_act is a velocity which is calculated by multiplying a detected value (observed value) of the rotational angular velocity of the front wheel 3f, indicated by an output from the aforesaid front-wheel rotational speed detector 54, by a predetermined effective rolling radius of the front wheel 3f.

Figure 22:
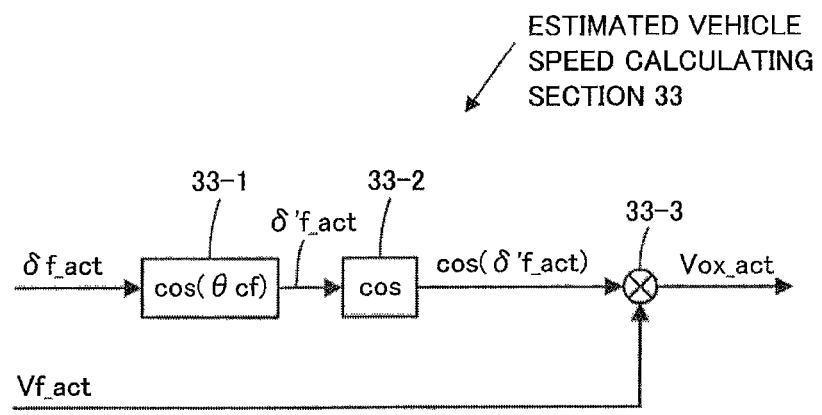
FIG. 22 is a block diagram showing the processing performed by the estimated vehicle speed calculating section shown in FIG. 13.

The estimated vehicle speed calculating section 33 carries out the processing shown in the block diagram in FIG. 22 to calculate the estimated vehicle speed Vox_act.

In FIG. 22, a processing section 33-1 represents a processing section which multiplies a detected front-wheel steering angle δf_act at the current time by a cosine value of the caster angle θcf of the front wheel 3f to calculate an estimate of the actual value δ'f_act (hereinafter, referred to as "estimated front-wheel effective steering angle δ'f_act") of a front-wheel effective steering angle δ'f which corresponds to the rotational angle in the yaw direction of the front wheel 3f, a processing section 33-2 represents a processing section which obtains a cosine value cos(δ'f_act) of the estimated front-wheel effective steering angle δ'f_act, and a processing section 33-3 represents a processing section which multiplies an estimated front-wheel rotational transfer velocity Vf_act at the current time by the above-described cosine value cos (δ'f_act) to thereby calculate an estimated vehicle speed Vox_act.

Accordingly, the estimated vehicle speed calculating section 33 is configured to calculate Vox_act by the following expression (51).

$$\text{Vox\_act} = \text{Vf\_act} * \cos(\delta' \text{f\_act}) \quad (51)$$
$$= \text{Vf\_act} * \cos(\delta \text{f\_act} * \cos(\theta cf))$$

The estimated vehicle speed Vox_act calculated in this manner corresponds to a component in the X-axis direction of the estimated front-wheel rotational transfer velocity Vf_act.

Supplementally, the front-wheel effective steering angle δ'f is an angle of the line of intersection of the ground surface 110 and the rotational plane of the front wheel 3f being steered (plane passing through the center of the axle of the front wheel 3f and orthogonal to the axle centerline Cf of the front wheel 3f) with respect to the longitudinal direction (X-axis direction) of the vehicle body 2.

In the case where the roll angle φb of the vehicle body 2 is relatively small, the estimated front-wheel effective steering angle δ'f_act can be calculated approximately through the computation in the above-described processing section 33-1.

It should be noted that in order to further improve the accuracy of δ'f_act, δ'f_act may be obtained by a mapping from δf_act. Alternatively, to still further improve the accuracy of δ'f_act, δ'f_act may be obtained by a mapping (two-dimensional mapping) or the like from δf_act and a detected value of the actual value φb_act (hereinafter, referred to as "detected roll angle φb_act") of the roll angle φb of the vehicle body 2, which is indicated by an output from the aforesaid vehicle-body inclination detector 51.

The estimated vehicle speed calculating section 33 calculates the estimated vehicle speed Vox_act by the processing described above. It should be noted that a value of the actual rotational transfer velocity of the rear wheel 3r estimated on the basis of an output from the rear-wheel rotational speed detector 55 (specifically, a value obtained by multiplying the rotational angular velocity of the rear wheel 3r, indicated by the output from the rear-wheel rotational speed detector 55, by a predetermined effective rolling radius of the rear wheel 3r) may be obtained as the estimated vehicle speed Vox_act.

The control device 50 controls the travel-assist actuator 27 so as to cause the estimated vehicle speed Vox_act calculated in the above-described manner to track the desired vehicle speed Vox_cmd. For example, the control device 50 multiples the deviation of Vox_act from Vox_cmd by a gain of a prescribed value, to determine an electric current command value of the travel-assist actuator 27 (electric motor) (or, a desired value of the electric current passed through the actuator). The control device 50 then controls the electric current passed through the travel-assist actuator 27 (electric motor) in accordance with the electric current command value.

According to the above-described processing in STEP 309, the travel-assist actuator 27 is controlled such that the actual vehicle speed Vox_act of the two-wheeled vehicle 1A tracks the desired vehicle speed Vox_cmd.

The above has described the processing in the balance-assist-off/travel-assist-on mode. With this processing, except for the case where an anomaly has been detected, or the balance-on switch 57 has been turned on, the operating mode in the next time's control processing cycle is maintained in the balance-assist-off/travel-assist-on mode. When an anomaly has been detected, or the balance-on switch 57 has been turned on, the operating mode in the next time's control processing cycle shifts to the abnormal mode, or the balance-assist-on/travel-assist-on mode, respectively.

In the balance-assist-off/travel-assist-on mode, as the rider manipulates the accelerator, the front wheel 3f is rotatively driven by the driving force of the travel-assist actuator 27, thereby allowing the two-wheeled vehicle 1A to travel by that driving force.

Further, in the balance-assist-off/travel-assist-on mode, the trail t is maintained at the upper trail limit tp (>0), or it is displaced toward the upper trail limit tp and then maintained at the upper trail limit tp. In this case, the trail t is fixedly held at the upper trail limit tp by activation of the lock mechanism 15a. Therefore, in this state, the driving force of the trail adjustment actuator 15 is unnecessary. It is thus possible to set the trail adjustment actuator 15 to the off state to thereby save the electricity otherwise consumed by the trail adjustment actuator 15.

Further, in this case, as the upper trail limit tp takes a positive value, the operation stability during the traveling of the two-wheeled vehicle 1A is secured smoothly.

Further, in the balance-assist-off/travel-assist-on mode, the steering actuator 8 is in the off state. This allows the rider of the two-wheeled vehicle 1A to freely steer the front wheel 3f by maneuvering the operation apparatus 7.

At this time, the steering clutch 8a is in the off state. This can reduce the friction at the time when the rider steers the front wheel 3f by operating the operation apparatus 7.

Figure 19:
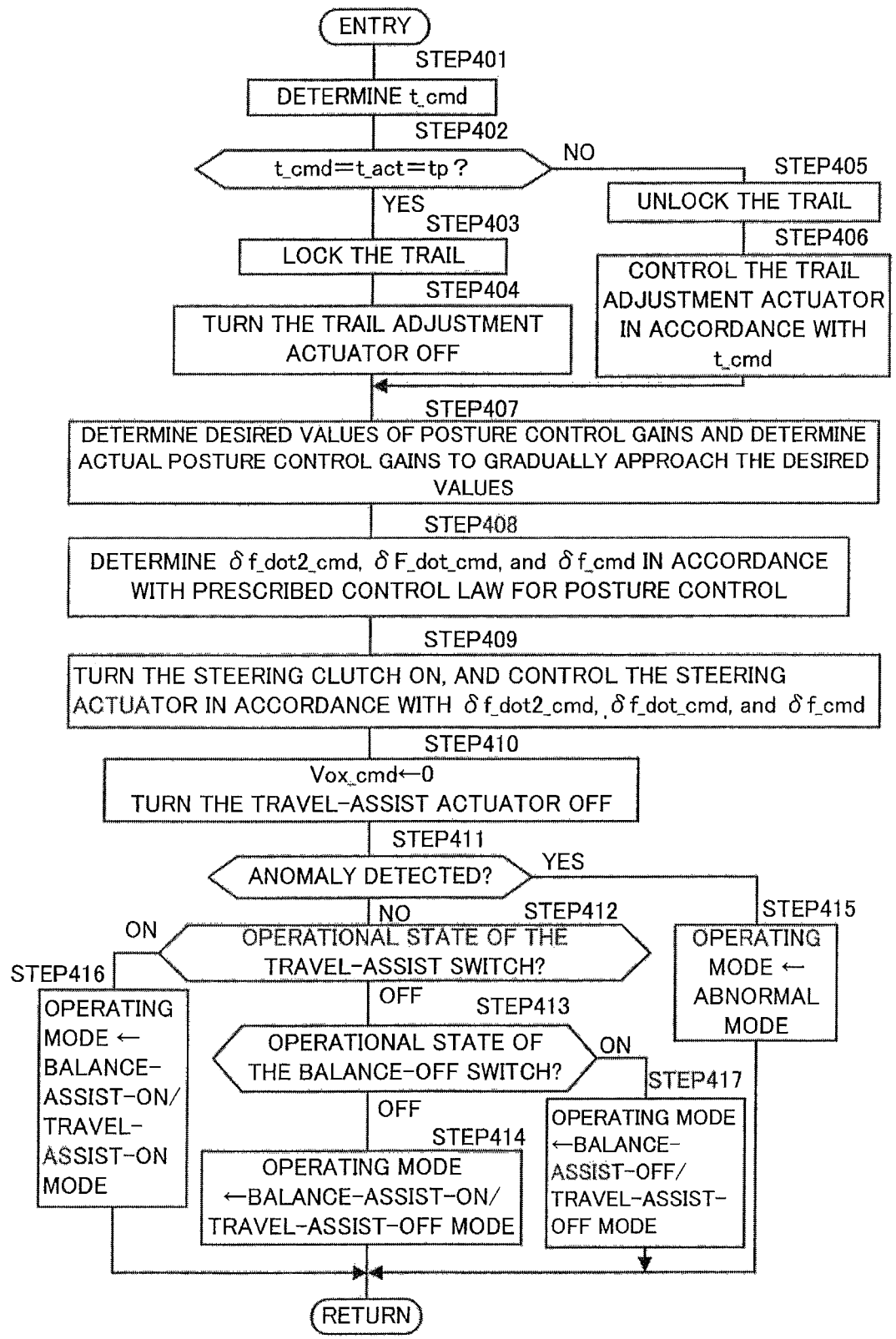
FIG. 19 is a flowchart showing the processing in the balance-assist-on/travel-assist-off mode in the flowchart in FIG. 14.

The processing in the balance-assist-on/travel-assist-off mode is carried out as shown by a flowchart in FIG. 19.

First, in STEP 401, the control device 50 determines a desired trail t_cmd by the processing in the aforesaid desired trail determining section 37.

As shown in FIG. 13, the desired trail determining section 37 successively receives the estimated vehicle speed Vox_act calculated in the above-described manner by the estimated vehicle speed calculating section 33. The desired trail determining section 37 determines the desired trail t_cmd in accordance with the estimated vehicle speed Vox_act at the current time.

Figure 23:
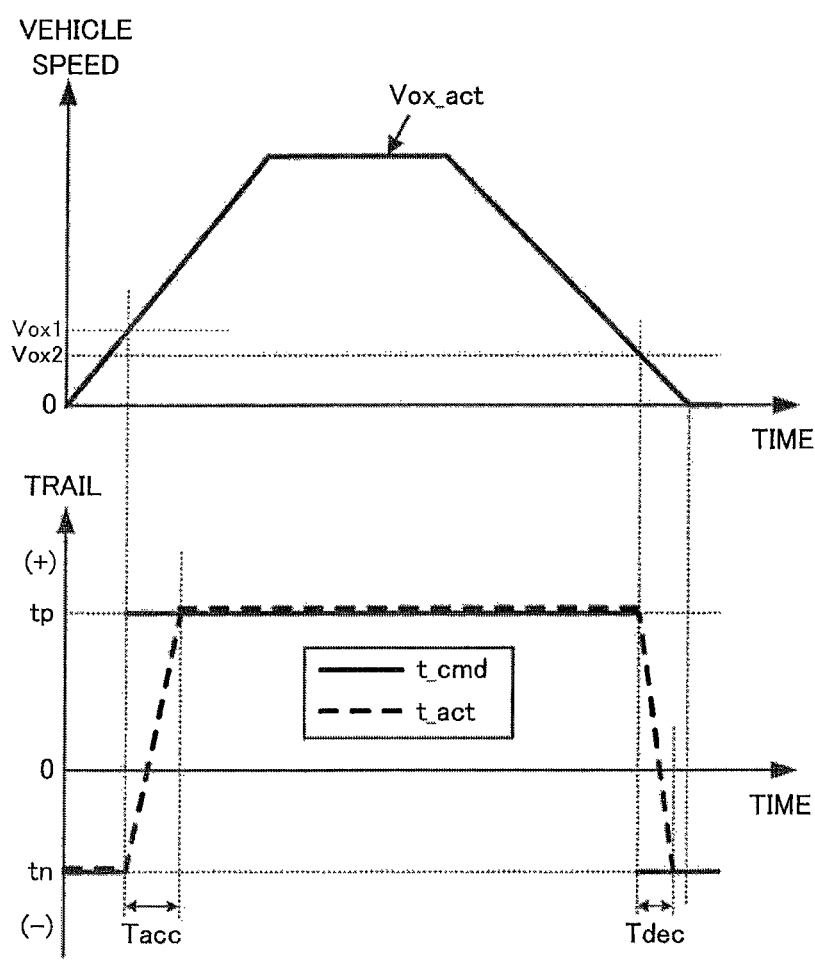
FIG. 23 shows graphs for illustrating, by way of example, the processing performed by the desired trail determining section shown in FIG. 13 and the processing for controlling the actual trail according to the desired trail.

In this case, in the present embodiment, the desired trail t_cmd is determined to either one of the aforesaid upper trail limit tp and lower trail limit tn. More specifically, the desired trail t_cmd is determined, in accordance with the estimated vehicle speed Vox_act, with the characteristics as shown in FIG. 23.

That is, when the estimated vehicle speed Vox_act is zero, the desired trail t_cmd is determined to be the lower trail limit tn (<0). In the state where t_cmd=tn, t_cmd is maintained at the lower trail limit tn (<0) until the estimated vehicle speed Vox_act increases to exceed a predetermined, first prescribed value Vox1 (i.e., as long as Vox_act remains in a low-speed range of not higher than Vox1 (including zero)).

When Vox_act exceeds the first prescribed value Vox1, t_cmd is switched from the lower trail limit tn to the upper trail limit tp (>0). Thereafter, in the state where t_cmd=tp, t_cmd is maintained at the upper trail limit tp (>0) until the estimated vehicle speed Vox_act decreases to a level below a predetermined, second prescribed value Vox2 (i.e. as long as Vox_act is maintained in a high-speed range of not lower than Vox2). In this case, the second prescribed value Vox2 is set smaller than the first prescribed value Vox1.

When Vox_act drops below the second prescribed value Vox2, t_cmd is returned from the upper trail limit tp to the lower trail limit tn.

As described above, basically, the desired trail t_cmd is set to the lower trail limit tn (<0) when the actual vehicle speed Vox_act is in a low-speed range (including the standstill state), and it is set to the upper trail limit tp (>0) when the actual vehicle speed Vox_act is in a high-speed range. In this case, t_cmd is determined in accordance with Vox_act such that it has hysteresis characteristics with respect to the change in Vox_act. Therefore, t_cmd is determined such that it will not be switched frequently in the situation where Vox_act is near the first prescribed value Vox1 or the second prescribed value Vox2.

Supplementally, in the example shown in FIG. 23, the desired trail t_cmd was determined such that it would change to either tn or tp discontinuously. Alternatively, the desired trail t_cmd may be determined such that it changes continuously with respect to the vehicle speed Vox_act.

Figure 24:
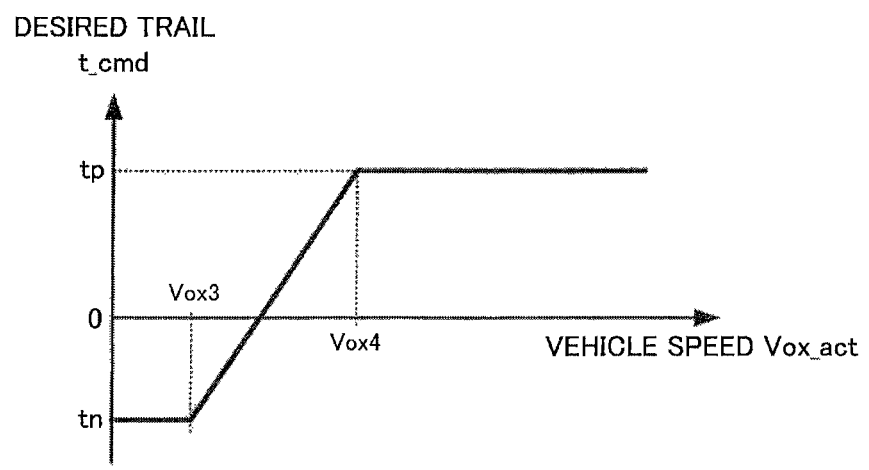
FIG. 24 is a graph for illustrating another example of the processing performed by the desired trail determining section shown in FIG. 13 and the processing for controlling the actual trail according to the desired trail.

For example, the desired trail t_cmd may be determined, in accordance with the vehicle speed Vox_act, with the characteristics as shown in FIG. 24. In this example, in the low vehicle speed range of not higher than a prescribed vehicle speed Vox3, t_cmd is maintained constantly at the lower trail limit tn. Further, in the high vehicle speed range of not lower than a prescribed vehicle speed Vox4, t_cmd is maintained constantly at the upper trail limit tp. In the vehicle speed range between Vox3 and Vox4, t_cmd is increased monotonically with increasing Vox_act.

Next, in STEP 402, the control device 50 determines whether the desired trail t_cmd at the current time is the upper trail limit tp and whether the detected trail t_act at the current time coincides, or almost coincides, with the upper trail limit tp.

In this case, the determination as to whether the detected trail t_act coincides, or almost coincides, with the upper trail limit tp is made in the same manner as in the aforesaid STEP 201.

If the determination result in STEP 402 is "YES" (when t_cmd=tp and t_act coincides, or almost coincides, with tp), in STEP 403, the control device 50 locks the trail t. Further, in STEP 404, the control device 50 sets the trail adjustment actuator 15 to the off state. The processes in STEPS 403 and 404 are identical to the processes in STEPS 101 and 102, respectively, in the aforesaid initialization mode.

If the determination result in STEP 402 is "NO", in STEP 405, the control device 50 causes the lock mechanism 15a to unlock the trail (or, sets the lock mechanism 15a to the off state). Further, in STEP 406, the control device 50 controls the trail adjustment actuator 15 to make the trail t_act converge to or match the desired trail t_cmd.

Specifically, in the case where t_cmd is switched from tn to tp, for example, the trail adjustment actuator 15 is controlled such that t_act changes from tn to tp within a predetermined time Tacc, as shown by the dotted line in the lower graph in FIG. 23. In this case, the trail adjustment actuator 15 is controlled, for example, to maintain the change rate of the trail t_act at a constant value.

In the case where t_cmd is switched from tp to tn, the trail adjustment actuator 15 is controlled such that t_act changes from tp to tn within a predetermined time Tdec, as shown by the dotted line in the lower graph in FIG. 23. In this case, the trail adjustment actuator 15 is controlled, for example, to maintain the change rate of the trail t_act at a constant value.

It should be noted that the predetermined times Tacc and Tdec described above may be the same or different from each other.

Further, when t_cmd is switched, the trail t_act does not necessarily have to be changed at a constant rate. For example, in the case where t_cmd is switched from tp to tn, the trail adjustment actuator 15 may be configured to simply generate a prescribed driving force in the direction of decreasing the trail t_act. The same applies to the case where t_cmd is switched from tn to tp.

Following the STEP 404 or 406, in STEP 407, the control device 50 determines desired values for the posture control gains K1, K2, K3, and K4 (described later) which are used when performing the posture control of the vehicle body 2. The control device 50 then determines actually used values of the posture control gains K1, K2, K3, and K4 such that they gradually approach the desired values. The processing in this STEP 407 will be described in detail later.

Next, in STEP 408, the control device 50 determines a desired front-wheel steering angular acceleration δf_dot2_cmd, a desired front-wheel steering angular velocity δf_dot_cmd, and a desired front-wheel steering angle δf_cmd, in accordance with a prescribed control law for the posture control. The processing in this STEP 408 will be described in detail later.

Next, in STEP 409, the control device 50 sets the aforesaid steering clutch 8a to the on state (the state enabling power transmission between the steering actuator 8 and the steering rotation section 12), and also controls the steering actuator 8 in accordance with the desired front-wheel steering angular acceleration δf_dot2_cmd, the desired front-wheel steering angular velocity δf_dot_cmd, and the desired front-wheel steering angle δf_cmd.

Specifically, the control device 50 for example determines an electric current command value I_δf_cmd, which is a desired value of the electric current passed through the steering actuator 8 (electric motor), from δf_dot2_cmd, δf_dot_cmd, δf_cmd, detected front-wheel steering angle δf_act, and detected front-wheel steering angular velocity δf_dot_act, by the following expression (52).

$$I\_δf\_cmd = Kδf\_p*(δf\_cmd - δf\_act) + Kδf\_v*(δf\_dot\_cmd - δf\_dot\_act) + Kδf\_a*δf\_dot2\_cmd \quad (52)$$

It should be noted that δf_act and δf_dot_act are detected values which are each indicated by an output from the front-wheel steering angle detector 52, and Kδf_p, Kδf_v, and Kδf_a are gains of prescribed values.

Therefore, the electric current command value I_δf_cmd is determined by summing up a feedback manipulated variable component responsive to the deviation of δf_act from δf_cmd, a feedback manipulated variable component responsive to the deviation of δf_dot_act from δf_dot_cmd, and a feedforward manipulated variable component responsive to δf_dot2_cmd.

Then, the control device 50 controls the actual electric current passed through the steering actuator 8 (electric motor) to match the electric current command value I_δf_cmd, by an electric current control section (not shown) which is made up of a motor driver or the like.

In this manner, the control is performed such that the actual steering angle of the front wheel 3f tracks the desired front-wheel steering angle δf_cmd. In this case, the electric current command value I_δf_cmd includes the third term on the right side of the above expression (52), i.e. the feedforward manipulated variable component, which ensures improved tracking in the above-described control.

It should be noted that the technique of controlling the steering actuator 8 to cause the actual steering angle of the front wheel 3f to track the desired front-wheel steering angle δf_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

Next, in STEP 410, the control device 50 sets the desired vehicle speed Vox_cmd to zero, and also sets the travel-assist actuator 27 to the off state. This process is identical to that in the aforesaid STEP 106.

Next, in STEP 411, the control device 50 carries out the determination process which is identical to that in STEP 107 in the aforesaid initialization mode. That is, the control device 50 determines whether a prescribed anomaly has been detected. If no anomaly has been detected, in STEP 412, the control device 50 determines the operational state of the travel-assist switch 59.

If it is determined in STEP 412 that the travel-assist switch 59 remains in the off state, next, in STEP 413, the control device 50 determines the operational state of the balance-off switch 58.

If it is determined in STEP 413 that the balance-off switch 58 remains in the off state, in STEP 414, the control device 50 sets the operating mode in the next time's control processing cycle to the balance-assist-on/travel-assist-off mode (which is the same mode as in the current time's control processing cycle), and terminates the processing in the balance-assist-on/travel-assist-off mode in the current time's control processing cycle.

If it is determined in STEP 413 that the balance-off switch 58 has been turned on, in STEP 417, the control device 50 sets the operating mode in the next time's control processing cycle to the balance-assist-off/travel-assist-off mode, and terminates the processing in the balance-assist-on/travel-assist-off mode in the current time's control processing cycle.

Further, if it is determined in the aforesaid STEP 412 that the travel-assist switch 59 has been turned on, in STEP 416, the control device 50 sets the operating mode in the next time's control processing cycle to the balance-assist-on/travel-assist-on mode, and terminates the processing in the balance-assist-on/travel-assist-off mode in the current time's control processing cycle.

Further, if it is determined in the aforesaid STEP 411 that an anomaly has been detected, in STEP 415, the control device 50 sets the operating mode in the next time's control processing cycle to the abnormal mode, and terminates the processing in the balance-assist-on/travel-assist-off mode in the current time's control processing cycle.

The processing in the above-described STEPS 407 and 408 will be described in detail below. For the sake of better understanding, the processing in STEP 408 will be described first.

In STEP 408, the control device 50 determines a desired front-wheel steering angular acceleration δf_dot2_cmd, a desired front-wheel steering angular velocity δf_dot_cmd, and a desired front-wheel steering angle δf_cmd, by carrying out the processing in the estimated inverted pendulum mass point lateral movement amount calculating section 31, the estimated inverted pendulum mass point lateral velocity calculating section 32, the desired posture state determining section 34, and the posture control arithmetic section 38 shown in FIG. 13.

The control device 50 first carries out the processing in the estimated inverted pendulum mass point lateral movement amount calculating section 31. It should be noted that the algorithm of the processing in the estimated inverted pendulum mass point lateral movement amount calculating section 31 in the present embodiment has been established assuming, by way of example, that the dynamic behavior of the two-wheeled vehicle 1A is expressed by the dynamic behavior that is obtained when the two-wheeled vehicle 1A is equivalently transformed to the system, shown in FIG. 2, which is made up of the first mass point 123 (inverted pendulum mass point) and the second mass point 124.

As shown in FIG. 13, the estimated inverted pendulum mass point lateral movement amount calculating section 31 receives a detected roll angle φb_act and a detected front-wheel steering angle δf_act.

The detected roll angle φb_act is a detected value (observed value) indicated by an output from the vehicle-body inclination detector 51.

Here, in the case where it is assumed that a mass point and an inertia moment are set only for the vehicle body 2 of the two-wheeled vehicle 1A and that the dynamic behavior of the two-wheeled vehicle 1A is expressed by the behavior of the mass point system made up of the first mass point 123 (inverted pendulum mass point) and the second mass point 124, the inclination in the roll direction of the line segment connecting the first mass point 123 and the second mass point 124 corresponds to the inclination in the roll direction of the vehicle body 2 of the two-wheeled vehicle 1A, as explained above.

Accordingly, in the case where the inclination angle φb in the roll direction of the vehicle body 2 of the two-wheeled vehicle 1A is sufficiently small, the difference between the movement amount in the Y-axis direction of the first mass point 123 and the movement amount in the Y-axis direction of the second mass point 124 coincides with a value obtained by multiplying the inclination angle φb in the roll direction of the vehicle body 2 by the height h' of the first mass point 123.

Further, in the two-wheeled vehicle 1A of the present embodiment, the front wheel 3f alone is a steered wheel. Therefore, the movement amount q in the Y-axis direction of the second mass point 124 is determined uniquely from the steering angle δf of the front wheel 3f, as explained above.

Accordingly, the movement amount in the Y-axis direction of the first mass point 123, which is the inverted pendulum mass point, is obtained as a sum of a component attributable to the inclination in the roll direction of the vehicle body 2 of the two-wheeled vehicle 1A and a component attributable to the steering angle δf of the front wheel 3f.

The estimated inverted pendulum mass point lateral movement amount calculating section 31 uses this relationship to calculate an estimated inverted pendulum mass point lateral movement amount Pb_diff_y_act on the basis of the detected roll angle φb_act and the detected front-wheel steering angle δf_act.

Figure 25:
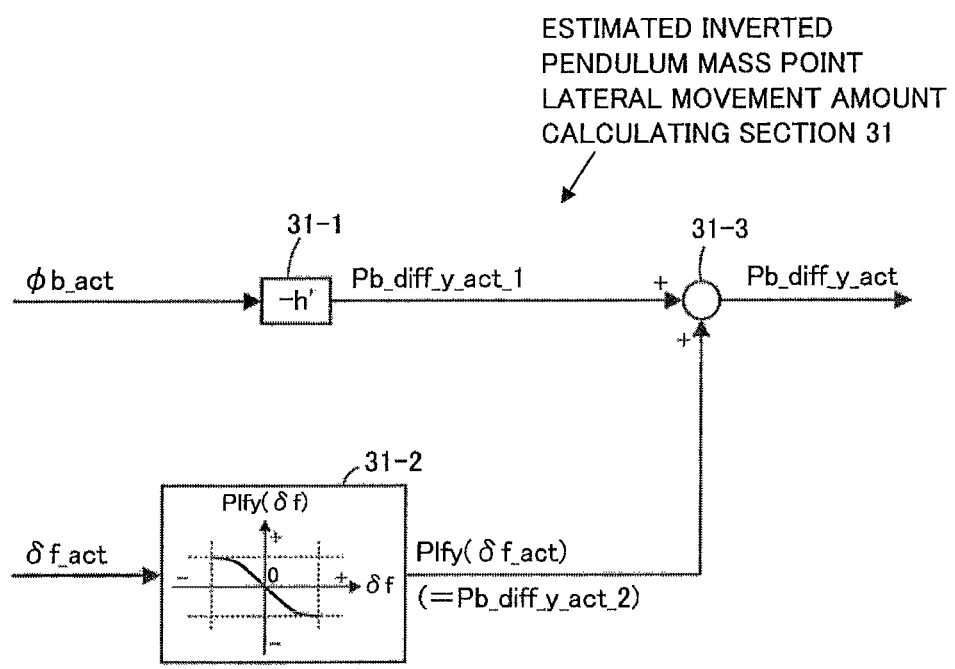
FIG. 25 is a block diagram showing the processing performed by the estimated inverted pendulum mass point lateral movement amount calculating section shown in FIG. 13.

More specifically, the estimated inverted pendulum mass point lateral movement amount calculating section 31 calculates the estimated inverted pendulum mass point lateral movement amount Pb_diff_y_act by the processing shown in the block diagram in FIG. 25.

This processing is configured to sum up a first estimated lateral movement amount component Pb_diff_y_act_1, which is an estimate of the actual movement amount in the Y-axis direction of the inverted pendulum mass point 123 caused by the inclination in the roll direction of the vehicle body 2, and a second estimated lateral movement amount component Pb_diff_y_act_2, which is an estimate of the actual movement amount in the Y-axis direction of the inverted pendulum mass point 123 caused by the steering of the front wheel 3f, to thereby calculate the estimated inverted pendulum mass point lateral movement amount Pb_diff_y_act.

In FIG. 25, a processing section 31-1 represents a processing section which obtains the first estimated lateral movement amount component Pb_diff_y_act_1, a processing section 31-2 represents a processing section which obtains the second estimated lateral movement amount component Pb_diff_y_act_2, and a processing section 31-3 represents a processing section which sums up the first estimated lateral movement amount component Pb_diff_y_act_1 and the second estimated lateral movement amount component Pb_diff_y_act_2.

The processing section 31-1 determines the first estimated lateral movement amount component Pb_diff_y_act_1 in accordance with the detected roll angle φb_act at the current time. More specifically, the processing section 31-1 multiplies the detected roll angle φb_act (angle value in [rad]) by the height h' (=c+h), multiplied by −1, of the inverted pendulum mass point 123, to calculate the first estimated lateral movement amount component Pb_diff_y_act_1 (=φb_act*(−h')).

Accordingly, the first estimated lateral movement amount component Pb_diff_y_act_1 is calculated, in accordance with the detected roll angle φb_act, as a value of a linear function with respect to the roll angle φb of the vehicle body 2 (a value of a constant multiple of φb). Further, Pb_diff_y_act_1 becomes zero in the state where φb_act=0 (where the vehicle body 2 is not leaned to the right or left), and therefore, it is the movement amount in the Y-axis direction with reference to the position of the inverted pendulum mass point 123 in that state.

It should be noted that sin(φb_act) is approximated by φb_act in the calculating processing in the processing section 31-1. Further, the value of h' (or c, h) has been preset in the two-wheeled vehicle 1A and is stored in a memory in the control device 50. For example, the value has been set to satisfy the relationship in the aforesaid expression (4) (the relationship that c(=h'−h)=I/(m*h)), from the height h of the overall center of gravity G in the basic posture state of the two-wheeled vehicle 1A, the overall inertia I of the two-wheeled vehicle 1A (inertia moment about the axis passing through the overall center of gravity G and parallel to the X-axis direction), and the total mass m of the two-wheeled vehicle 1A.

The value of h', however, may be set to a value roughly approximating the value satisfying the relationship in the above expression (4) such that optimal control characteristics can be obtained on the basis of various experiments, simulation, etc.

The processing section 31-2 in FIG. 25 determines the second estimated lateral movement amount component Pb_diff_y_act_2 in accordance with the detected front-wheel steering angle δf_act at the current time. More specifically, the processing section 31-2 obtains the second estimated lateral movement amount component Pb_diff_y_act_2 (=Plfy(δf_act)) from the detected front-wheel steering angle δf_act at the current time, by a preset conversion function Plfy(δf). That is, the processing section 31-2 obtains a value Plfy(δf_act) of the conversion function Plfy(δf) corresponding to δf_act, and determines the obtained value as the second estimated lateral movement amount component Pb_diff_y_act_2.

The above conversion function Plfy(δf) is defined, for example, by a mapping or an arithmetic expression. The conversion function Plfy(δf) has been preset, as illustrated by the graph shown in the processing section 31-2 in FIG. 25, such that it monotonically changes (in the present embodiment, monotonically decreases) with increasing steering angle δf of the front wheel 3f. Further, the conversion function Plfy(δf) is a nonlinear function which has been preset such that the magnitude of the rate of change of Plfy(δf) with respect to the steering angle δf (the amount of change of Plfy(δf) per unit increase of δf) becomes relatively small in the region where the magnitude (absolute value) of the steering angle δf of the front wheel 3f is relatively large, compared to that in the region where the magnitude of the steering angle δf is small (region where δf is near zero).

Accordingly, the second estimated lateral movement amount component Pb_diff_y_act_2 is determined, in accordance with the detected front-wheel steering angle δf_act, as a value of a nonlinear function with respect to the steering angle δf of the front wheel 3f.

The estimated inverted pendulum mass point lateral movement amount calculating section 31 determines the estimated inverted pendulum mass point lateral movement amount Pb_diff_y_act by summing up, in the processing section 31-3, the first estimated lateral movement amount component Pb_diff_y_act_1 and the second estimated lateral movement amount component Pb_diff_y_act_2 calculated in the above-described manner.

Accordingly, the estimated inverted pendulum mass point lateral movement amount Pb_diff_y_act is determined by the following expression (53).

$$Pb\_diff\_y\_act = Pb\_diff\_y\_act\_1 + Pb\_diff\_y\_act\_2 \quad (53)$$
$$= \phi b\_act * (-h') + Plfy(\delta f\_act)$$

In the above expression (53), the first term on the right side is a linear term with respect to the detected roll angle φb_act, and the second term on the right side is a nonlinear term with respect to the detected front-wheel steering angle δf_act.

It should be noted that the second term on the right side of the expression (53) can be ignored when the magnitude of the value Plfy(δf_act) of the aforesaid conversion function Plfy(δf) corresponding to the actual steering angle δf_act of the front wheel 3f is sufficiently small (when the magnitude of δf_act is small). In this case, the detected roll angle φb_act of the vehicle body 2 may be used instead of the estimated inverted pendulum mass point lateral movement amount Pb_diff_y_act.

With this configuration, the processing in the estimated inverted pendulum mass point lateral movement amount calculating section 31 becomes unnecessary, and the computational load of the control device 50 can be reduced.

Next, the control device 50 carries out the processing in the estimated inverted pendulum mass point lateral velocity calculating section 32. As shown in FIG. 13, the estimated inverted pendulum mass point lateral velocity calculating section 32 receives the estimated inverted pendulum mass point lateral movement amount Pb_diff_y_act calculated in the estimated inverted pendulum mass point lateral movement amount calculating section 31, a detected front-wheel steering angle δf_act, and an estimated front-wheel rotational transfer velocity Vf_act.

It should be noted that the estimated front-wheel rotational transfer velocity Vf_act is a velocity which is calculated by multiplying a detected value (observed value) of the rotational angular velocity of the front wheel 3f, indicated by an output from the aforesaid front-wheel rotational speed detector 54, by a predetermined effective rolling radius of the front wheel 3f.

Figure 26:
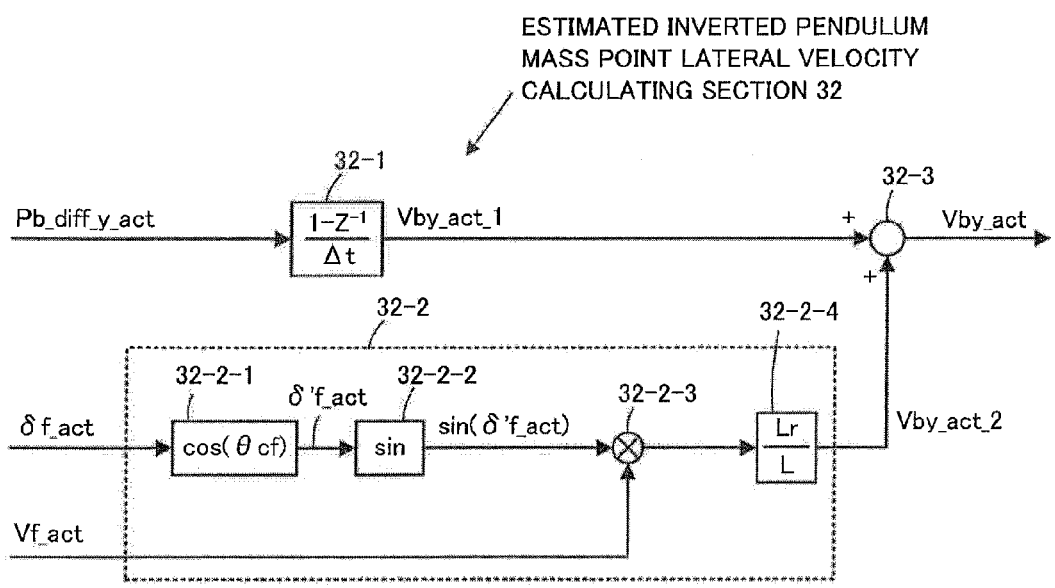
FIG. 26 is a block diagram showing the processing performed by the estimated inverted pendulum mass point lateral velocity calculating section shown in FIG. 13.

The estimated inverted pendulum mass point lateral velocity calculating section 32 carries out the processing shown in the block diagram in FIG. 26 to calculate an estimated inverted pendulum mass point lateral velocity Vby_act.

This processing is configured to sum up a first estimated lateral velocity component Vby_act_1, which is an estimate of the actual transfer velocity (relative to the origin) in the Y-axis direction of the inverted pendulum mass point 123 as seen from the origin of the XYZ coordinate system set in the above-described manner for the two-wheeled vehicle 1A, and a second estimated lateral velocity component Vby_act_2, which is an estimate of the actual transfer velocity in the Y-axis direction of the inverted pendulum mass point 123 (=transfer velocity of the origin of the XYZ coordinate system) caused by the translational movement of the two-wheeled vehicle 1A accompanying the rolling of the front wheel 3f while the front wheel 3f is being steered (when the actual steering angle of the front wheel 3f is not "0"), to thereby calculate the estimated inverted pendulum mass point lateral velocity Vby_act.

In FIG. 26, a processing section 32-1 represents a processing section which obtains the first estimated lateral velocity component Vby_act_1, a processing section 32-2 represents a processing section which obtains the second estimated lateral velocity component Vby_act_2, and a processing section 32-3 represents a processing section which sums up the first estimated lateral velocity component Vby_act_1 and the second estimated lateral velocity component Vby_act_2.

The processing section 32-1 calculates, as the first estimated lateral velocity component Vby_act_1, a temporal change rate Pb_diff_y_dot_act (amount of change per unit time) at the current time of the estimated inverted pendulum mass point lateral movement amount Pb_diff_y_act successively calculated by the estimated inverted pendulum mass point lateral movement amount calculating section 31. That is, the processing section 32-1 calculates a differential value Pb_diff_y_dot_act of Pb_diff_y_act as Vby_act_1.

Further, the processing section 32-2 multiplies, in a processing section 32-2-1, a detected front-wheel steering angle δf_act at the current time by a cosine value cos(θcf) of the caster angle θcf of the front wheel 3f, to thereby calculate the estimated front-wheel effective steering angle δ'f_act, which was described above in conjunction with the processing in the estimated vehicle speed calculating section 33.

The processing section 32-2 further calculates a sine value sin(δ'f_act) of the calculated, estimated front-wheel effective steering angle δ'f_act and multiplies the estimated front-wheel rotational transfer velocity Vf_act at the current time by the sine value, in a processing section 32-2-2 and a processing section 32-2-3, to thereby calculate a transfer velocity in the Y-axis direction (in other words, a component in the Y-axis direction of Vf_act) of the ground contact part of the front wheel 3f.

Further, the processing section 32-2 multiplies, in a processing section 32-2-4, the value as a result of calculation in the processing section 32-2-3 by Lr/L (where L=Lf+Lr), to obtain a second estimated lateral velocity component Vby_act_2 (=Vf_act*sin(δ'f_act)*(Lr/L)).

It should be noted that Lr in this processing refers to a distance in the X-axis direction between the ground contact point of the rear wheel 3r and the overall center of gravity G in the basic posture state of the two-wheeled vehicle 1A, and Lf refers to a distance in the X-axis direction between the ground contact point of the front wheel 3f and the overall center of gravity G in the basic posture state of the two-wheeled vehicle 1A.

The values of Lr and Lf have been preset for the two-wheeled vehicle 1A and are stored in a memory in the control device 50.

The value of the caster angle θcf used in the processing in the processing section 32-2 has also been preset for the two-wheeled vehicle 1A, as with the values of Lf and Lr, and is stored in the memory in the control device 50.

The estimated inverted pendulum mass point lateral velocity calculating section 32 sums up, in the processing section 32-3, the first estimated lateral velocity component Vby_act_1 and the second estimated lateral velocity component Vby_act_2 calculated in the above-described manner, to calculate an estimated inverted pendulum mass point lateral velocity Vby_act.

Accordingly, the estimated inverted pendulum mass point lateral velocity Vby_act is calculated by the following expression (54).

$$Vby\_act = Vby\_act\_1 + Vby\_act\_2 \qquad (54)$$
$$= Pb\_diff\_y\_dot\_act + Vf\_act * \sin(\delta'f\_act) * (Lr/L)$$
$$= Pb\_diff\_y\_dot\_act + Vf\_act *$$
$$\sin(\delta f\_act * \cos(\theta cf)) * (Lr/L)$$

It should be noted that in the case where the magnitude of the value of the aforesaid conversion function Plfy(δf) corresponding to the actual steering angle δf_act of the front wheel 3f is sufficiently small (when the magnitude of δf_act is small), a differential value of the value of Pb_diff_y_act obtained by ignoring the second term on the right side of the expression (53) may be adopted as Pb_diff_y_dot_act for use in the expression (54). That is, in the expression (54), a value, multiplied by –h', of the differential value of the detected roll angle φb_act of the vehicle body 2 may be used instead of Pb_diff_y_dot_act. With this configuration, the computational load of the control device 50 can be reduced.

Next, the control device 50 carries out the processing in the desired posture state determining section 34. The desired posture state determining section 34 determines a desired inverted pendulum mass point lateral movement amount Pb_diff_y_cmd, which is a desired value of the inverted pendulum mass point lateral movement amount Pb_diff_y, and a desired inverted pendulum mass point lateral velocity Vby_cmd, which is a desired value of the inverted pendulum mass point lateral velocity Vby. In the present embodiment, the desired posture state determining section 34 sets both of Pb_diff_y_cmd and Vby_cmd to zero, by way of example.

Next, the control device 50 carries out the processing in the posture control arithmetic section 38. As shown in FIG. 13, the posture control arithmetic section 38 receives the desired inverted pendulum mass point lateral movement amount Pb_diff_y_cmd and the desired inverted pendulum mass point lateral velocity Vby_cmd determined in the desired posture state determining section 34, the estimated inverted pendulum mass point lateral movement amount Pb_diff_y_act calculated in the estimated inverted pendulum mass point lateral movement amount calculating section 31, the estimated inverted pendulum mass point lateral velocity Vby_act calculated in the estimated inverted pendulum mass point lateral velocity calculating section 32, and posture control gains K1, K2, K3, and K4 (hereinafter, also simply referred to as "gains K1, K2, K3, and K4") determined in the control gain determining section 35 in the manner as will be described later.

Figure 27:
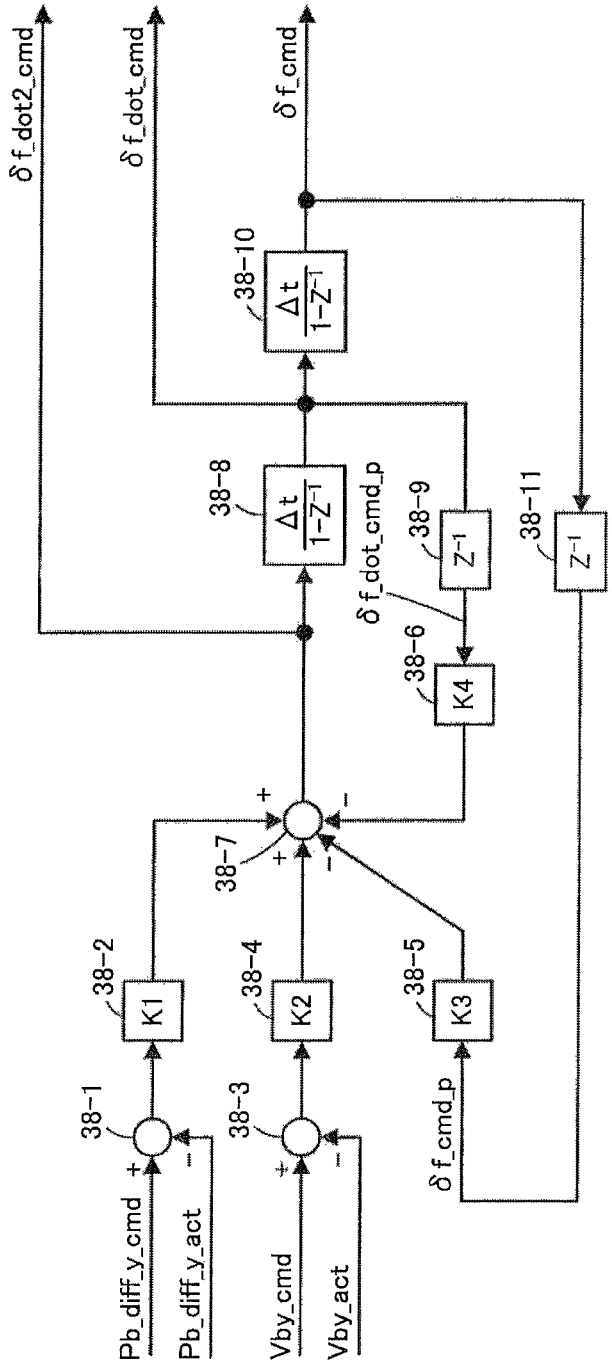
FIG. 27 is a block diagram showing the processing performed by the posture control arithmetic section shown in FIG. 13.

The posture control arithmetic section 38 uses the above-described input values to carry out the processing shown in the block diagram in FIG. 27, to thereby determine a desired front-wheel steering angle δf_cmd, a desired front-wheel steering angular velocity δf_dot_cmd, and a desired front-wheel steering angular acceleration δf_dot2_cmd.

In FIG. 27, a processing section 38-1 represents a processing section which obtains a deviation of Pb_diff_y_act from Pb_diff_y_cmd, a processing section 38-2 represents a processing section which multiplies the output of the processing section 38-1 by the gain K1, a processing section 38-3 represents a processing section which obtains a deviation of Vby_act from Vby_cmd, a processing section 38-4 represents a processing section which multiplies the output of the processing section 38-3 by the gain K2, a processing section 38-5 represents a processing section which multiplies a last time's desired front-wheel steering angle δf_cmd_p, which is a value of the desired front-wheel steering angle δf_cmd determined in the last time's control processing cycle, by the gain K3, a processing section 38-6 represents a processing section which multiplies a last time's desired front-wheel steering angular velocity δf_dot_cmd_p, which is a value of the desired front-wheel steering angular velocity δf_dot_cmd determined in the last time's control processing cycle, by the gain K4, and a processing section 38-7 represents a processing section which sums up the outputs from the processing sections 38-2 and 38-4 and the values, each multiplied by –1, of the outputs from the processing sections 38-5 and 38-6, to thereby calculate a desired front-wheel steering angular acceleration δf_dot2_cmd.

Further, a processing section 38-8 represents a processing section which integrates the output of the processing section 38-7 to obtain a desired front-wheel steering angular velocity δf_dot_cmd, a processing section 38-9 represents a delay element which outputs the output from the processing section 38-8 in the last time's control processing cycle (i.e. last time's desired front-wheel steering angular velocity δf_dot_cmd_p) to the processing section 38-6, a processing section 38-10 represents a processing section which integrates the output of the processing section 38-8 to obtain a desired front-wheel steering angle δf_cmd, and a processing section 38-11 represents a delay element which outputs the output from the processing section 38-10 in the last time's control processing cycle (i.e. last time's desired front-wheel steering angle δf_cmd_p) to the processing section 38-5.

Accordingly, the posture control arithmetic section 38 calculates the desired front-wheel steering angular acceleration δf_dot2_cmd by the following expression (55).

$$\delta f\_dot2\_cmd = (K1 * (Pb\_diff\_y\_cmd - Pb\_diff\_y\_act) + \qquad (55)$$
$$K2 * (Vby\_cmd - Vby\_act) -$$
$$K3 * \delta f\_cmd\_p - K4 * \delta_f\_dot\_cmd\_p)$$

In the above expression (55), K1*(Pb_diff_y_cmd–Pb_diff_y_act) is a feedback manipulated variable having the function of making the deviation (Pb_diff_y_cmd–Pb_diff_y_act) approach "0", K2*(Vby_cmd–Vby_act) is a feedback manipulated variable having the function of making the deviation (Vby_cmd–Vby_act) approach "0", –K3*δf_cmd_p is a feedback manipulated variable having the function of making δf_cmd approach "0", and –K4*δf_dot_cmd_p is a feedback manipulated variable having the function of making δf_dot_cmd approach "0".

The posture control arithmetic section 38 integrates δf_dot2_cmd, determined by the above expression (55), to determine a desired front-wheel steering angular velocity δf_dot_cmd. Further, the posture control arithmetic section 38 integrates this δf_dot_cmd to determine a desired front-wheel steering angle δf_cmd.

It should be noted that δf_cmd_p and δf_dot_cmd_p used in the computation of the expression (55) have the meanings as pseudo estimates (alternative observed values) of the actual steering angle and steering angular velocity, respectively, of the front wheel 3f at the current time. Therefore, instead of δf_cmd_p, a detected front-wheel steering angle δf_act at the current time may be used. Further, instead of δf_dot_cmd_p, a detected front-wheel steering angular velocity δf_dot_act at the current time may be used.

The above has described the details of the processing in STEP 408.

In accordance with the processing in STEP 408 described above, the desired front-wheel steering angular acceleration δf_dot2_cmd is determined such that any divergence of the actual inverted pendulum mass point lateral movement amount (estimated inverted pendulum mass point lateral movement amount Pb_diff_y_act) of the two-wheeled vehicle 1A from the desired inverted pendulum mass point lateral movement amount Pb_diff_y_cmd, or any divergence of the actual inverted pendulum mass point lateral velocity (estimated inverted pendulum mass point lateral velocity Vby_act) of the two-wheeled vehicle 1A from the desired inverted pendulum mass point lateral velocity Vby_cmd, is eliminated through manipulation of the steering angle δf of the front wheel 3f (and, hence, that the actual inverted pendulum mass point lateral movement amount or lateral velocity of the two-wheeled vehicle 1A is restored to the desired inverted pendulum mass point lateral movement amount Pb_diff_y_cmd or desired inverted pendulum mass point lateral velocity Vby_cmd).

Further, in the present embodiment, the desired inverted pendulum mass point lateral movement amount Pb_diff_y_cmd is "0". Therefore, in the state where the actual inverted pendulum mass point lateral movement amount of the two-wheeled vehicle 1A is held at a value which coincides, or almost coincides, with the desired inverted pendulum mass point lateral movement amount Pb_diff_y_cmd, the desired front-wheel steering angular acceleration δf_dot2_cmd is determined so as to keep the actual steering angle of the front wheel 3f at "0" or almost "0".

Consequently, the front wheel 3f is steered to stabilize the posture in the roll direction of the vehicle body 2 and to make the steering angle δf_act of the front wheel 3f ultimately converge to the neutral steering angle (zero).

The processing in STEP 407 will now be described. In STEP 407, the control device 50 determines the posture control gains K1, K2, K3, and K4 for use in the computation of the aforesaid expression (55), by the processing in the control gain determining section 35 shown in FIG. 13.

As shown in FIG. 13, the control gain determining section 35 receives an estimated vehicle speed Vox_act at the current time, calculated by the processing in the estimated vehicle speed calculating section 33, and a detected trail t_act at the current time. The control gain determining section 35 also receives, via a delay element 39, a last time's desired front-wheel steering angle δf_cmd_p, determined by the posture control arithmetic section 38.

It should be noted that the last time's desired front-wheel steering angle δf_cmd_p has the meaning as a pseudo estimate (alternative observed value) of the actual steering angle of the front wheel 3f at the current time. Therefore, it may be configured such that, instead of δf_cmd_p, a detected front-wheel steering angle δf_act at the current time, indicated by an output from the front-wheel steering angle detector 52, is input to the control gain determining section 35.

Figure 28:
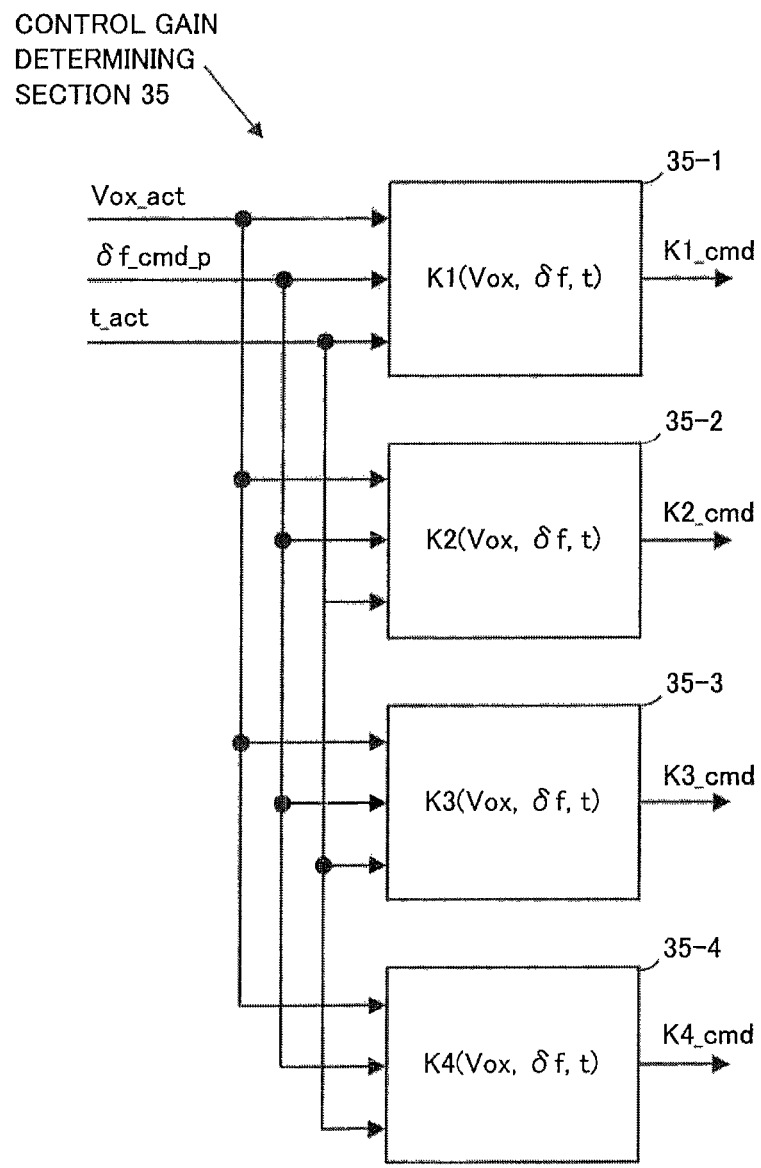
FIG. 28 is a block diagram showing the processing performed by the control gain determining section shown in FIG. 13.

The control gain determining section 35 first determines, from the estimated vehicle speed Vox_act, the last time's desired front-wheel steering angle δf_cmd_p, and the detected trail t_act input thereto, desired values K1_cmd, K2_cmd, K3_cmd, and K4_cmd of the respective gains K1, K2, K3, and K4, by processing in processing sections 35-1, 35-2, 35-3, and 35-4 shown in the block diagram in FIG. 28.

Each processing section 35-i (i=1, 2, 3, 4) determines the desired value Ki_cmd of the gain Ki by, for example, a conversion function Ki (Vox, δf, t) which is defined by a preset three-dimensional mapping.

Figure 29A:
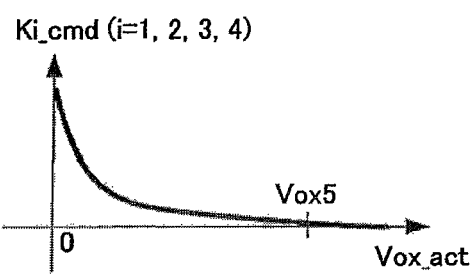
FIGS. 29A, 29B, and 29C are graphs for illustrating the processing performed by the control gain determining section shown in FIG. 13.
Figure 29B:
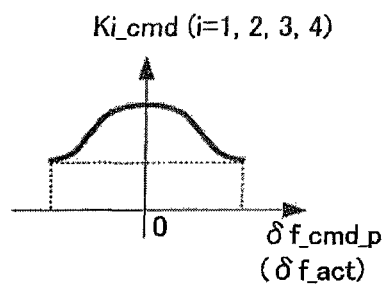
Figure 29C:
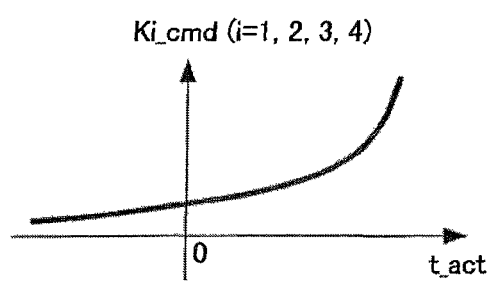

In this case, in the present embodiment, the desired value Ki_cmd of each gain Ki is determined, in accordance with Vox_act, δf_cmd_p, and t_act, such that it changes with the trends as shown in FIGS. 29A to 29C with respect to the vehicle speed Vox, the front-wheel steering angle δf, and the trail t.

Specifically, in the case where the front-wheel steering angle δf and the trail t are kept constant, each Ki_cmd is determined with the trend as shown in FIG. 29A such that the magnitude of Ki_cmd becomes smaller (approaches zero) as the vehicle speed Vox becomes higher. Particularly, Ki_cmd is determined such that its magnitude becomes zero or almost zero when the vehicle speed Vox is in a high-speed range (higher than a prescribed vehicle speed Vox5 in FIG. 29A).

In the case where the vehicle speed Vox and the trail t are kept constant, each Ki_cmd is determined with the trend as shown in FIG. 29B such that the magnitude of Ki_cmd becomes smaller (approaches zero) as the magnitude (absolute value) of the front-wheel steering angle δf becomes larger.

Further, in the case where the vehicle speed Vox and the front-wheel steering angle δf are kept constant, each Ki_cmd is determined with the trend as shown in FIG. 29C such that the magnitude of Ki_cmd becomes larger as the trail t becomes larger (as it is closer to the upper trail limit tp (>0)).

After determining the desired value Ki_cmd of each gain Ki in the above-described manner, the control gain determining section 35 determines a value of each gain Ki which is actually used for the computation of the aforesaid expression (55).

Specifically, the control gain determining section 35 determines the value of each gain Ki (i=1, 2, 3, 4) at each control processing cycle such that it gradually approaches (gradually converges to) the desired value Ki_cmd. For example, a deviation of the last time's value of the gain Ki (that was determined in the last time's control processing cycle) from the desired value Ki_cmd determined in the current time's control processing cycle is obtained, and the amount of change determined in accordance with the deviation (for example, a value obtained by multiplying the deviation by a prescribed proportionality constant) is added to the last time's value of the gain Ki, to thereby determine the current time's value (value in the current time's control processing cycle) of the gain Ki.

The above has described the details of the processing in STEP 407. In this case, each gain Ki (i=1, 2, 3, 4) is determined basically with the trend as shown in FIG. 29A with respect to the vehicle speed Vox (estimated vehicle speed Vox_act). Therefore, when the two-wheeled vehicle 1A is stopped or traveling at a low speed, the front wheel 3f is steered by the aforesaid steering actuator 8 in accordance with the desired front-wheel steering angular acceleration δf_dot2_cmd, the desired front-wheel steering angular velocity δf_dot_cmd, and the desired front-wheel steering angle δf_cmd determined in the above-described manner by the posture control arithmetic section 38, so that the posture control function for stabilizing the posture in the roll direction of the two-wheeled vehicle 1A works effectively. That is, when the estimated inverted pendulum mass point lateral movement amount Pb_diff_y_act or the estimated inverted pendulum mass point lateral velocity Vby_act deviates from a required or desired value, the front wheel 3f is steered to quickly eliminate the deviation (and, hence, to quickly stabilize the posture in the roll direction of the vehicle body 2).

On the other hand, when the vehicle speed Vox of the two-wheeled vehicle 1A has increased to a certain level, even if the estimated inverted pendulum mass point lateral movement amount Pb_diff_y_act or the estimated inverted pendulum mass point lateral velocity Vby_act deviates from the required or desired value, the posture control function for eliminating the deviation is weakened, or set to a substantially off state (disabled state). Accordingly, in the case where a rider is riding the two-wheeled vehicle 1A at a vehicle speed in a high-speed range, the rider can readily bank the vehicle body 2 for turning. That is, it is possible to make the behavioral characteristics of the two-wheeled vehicle 1A approach the characteristics comparable to those of a conventional two-wheeled vehicle.

Further, each gain Ki (i=1, 2, 3, 4) is determined basically with the trend as shown in FIG. 29B with respect to the front-wheel steering angle δf (last time's desired front-wheel steering angle δf_cmd_p).

Here, in the case where the magnitude of the actual steering angle δf_act of the front wheel 3f is large, compared to the case where it is small, the radius of curvature of the ground contact part of the front wheel 3f as seen in a cross section including the ground contact point of the front wheel 3f and having a normal in the X-axis direction (longitudinal direction of the vehicle body 2) becomes larger.

Therefore, in the case where the magnitude of the actual steering angle δf_act of the front wheel 3f is large, compared to the case where it is small, the change in movement amount of the ground contact point of the front wheel 3f responsive to the change in the steering becomes larger. Because of this, if the magnitudes of the gains K1 and K2 in particular are set independently of the actual steering angle δf_act, oscillation is likely to occur in the control of the posture in the roll direction of the vehicle body 2 of the two-wheeled vehicle 1A.

When it is configured such that the magnitudes of the gains K1 and K2 are changed in accordance with the magnitude of δf_cmd_p, as described above, the above-described oscillation can be prevented even in the case where the magnitude (absolute value) of the actual steering angle δf_act of the front wheel 3f is large.

Further, each gain Ki (i=1, 2, 3, 4) is determined basically with the trend as shown in FIG. 29C with respect to the trail t (detected trail t_act).

Here, as understood from the description about the two-wheeled vehicle 1 shown in FIG. 1, the sensitivity of the change in the aforesaid posture controlling manipulation moment Msum to the change in the steering angle δf is higher when the actual trail t_act is closer to the lower trail limit tn (<0) than to the upper trail limit tp (>0) (i.e. when the aforesaid height a is smaller).

Because of this, if the magnitudes of particularly the gains K1 and K2 are set independently of the actual trail t_act, oscillation is likely to occur in the control of the posture in the roll direction of the vehicle body 2 when the actual trail t_act is equal to or close to the lower trail limit tn. Further, when the actual trail t_act is equal to or close to the upper trail limit tp, the function of controlling the posture in the roll direction of the vehicle body 2 may not work sufficiently.

In contrast, when it is configured such that the magnitudes of the gains K1 and K2 are changed in accordance with t_act as described above, a proper posture control function can be implemented stably, irrespective of the actual trail t_act, without causing the oscillation in the control of the posture in the roll direction of the vehicle body 2.

The above has described the processing in the balance-assist-on/travel-assist-off mode. With this processing, except for the case where an anomaly has been detected, or the travel-assist switch 59 has been turned on, or the balance-off switch 58 has been turned on, the operating mode in the next time's control processing cycle is maintained in the balance-assist-on/travel-assist-off mode. When an anomaly has been detected, the travel-assist switch 59 has been turned on, or the balance-off switch 58 has been turned on, the operating mode in the next time's control processing cycle shifts to the abnormal mode, the balance-assist-on/travel-assist-on mode, or the balance-assist-off/travel-assist-off mode, respectively.

Further, in the balance-assist-on/travel-assist-off mode, the travel-assist actuator 27 is in the off state. Therefore, the rider of the two-wheeled vehicle 1A can move the two-wheeled vehicle 1A by holding the operation apparatus 7 and causing the front wheel 3f and the rear wheel 3r to roll.

At the same time, in the balance-assist-on/travel-assist-off mode, particularly when the two-wheeled vehicle 1A is stopped or running in a low vehicle speed range, the front wheel 3f is steered by the steering force of the steering actuator 8, as appropriate, such that the posture in the roll direction of the vehicle body 2 is stabilized autonomously.

Further, in the balance-assist-on/travel-assist-off mode, the trail t is controlled to match the lower trail limit to (<0) when the two-wheeled vehicle 1A is stopped or running in a low vehicle speed range. This ensures that the posture control function according to the steering of the front wheel 3f (the function of generating a moment in the roll direction for making the posture of the vehicle body 2 restored to a desired posture (posture in the basic posture state) by the steering of the front wheel 3f) works effectively, so that the stability of the posture in the roll direction of the vehicle body 2 can be enhanced.

Supplementally, in the processing in the control gain determining section 35, each gain Ki (i=1, 2, 3, 4) was determined in accordance with Vox_act, δf_cmd_p, and t_act, by using a three-dimensional mapping. Alternatively, each gain Ki may be determined by a technique not using the three-dimensional mapping.

Further, the last time's desired front-wheel steering angle δf_cmd_p has the meaning as a pseudo estimate (alternative observed value) of the actual steering angle of the front wheel 3f at the current time.

Accordingly, for determining each gain Ki, the aforesaid detected front-wheel steering angle δf_act may be used instead of δf_cmd_p.

Further, in the case where the response of the travel-assist actuator 27 is sufficiently quick, the desired vehicle speed Vox_cmd determined in the desired vehicle speed determining section 36 in the last time's control processing cycle (hereinafter, this will be denoted as "last time's desired vehicle speed Vox_cmd_p") has the meaning as a pseudo estimate (alternative observed value) of the actual vehicle speed of the two-wheeled vehicle 1A at the current time.

Accordingly, for determining each gain Ki, the above-described last time's desired vehicle speed Vox_cmd_p may be used instead of Vox_act.

Figure 20:
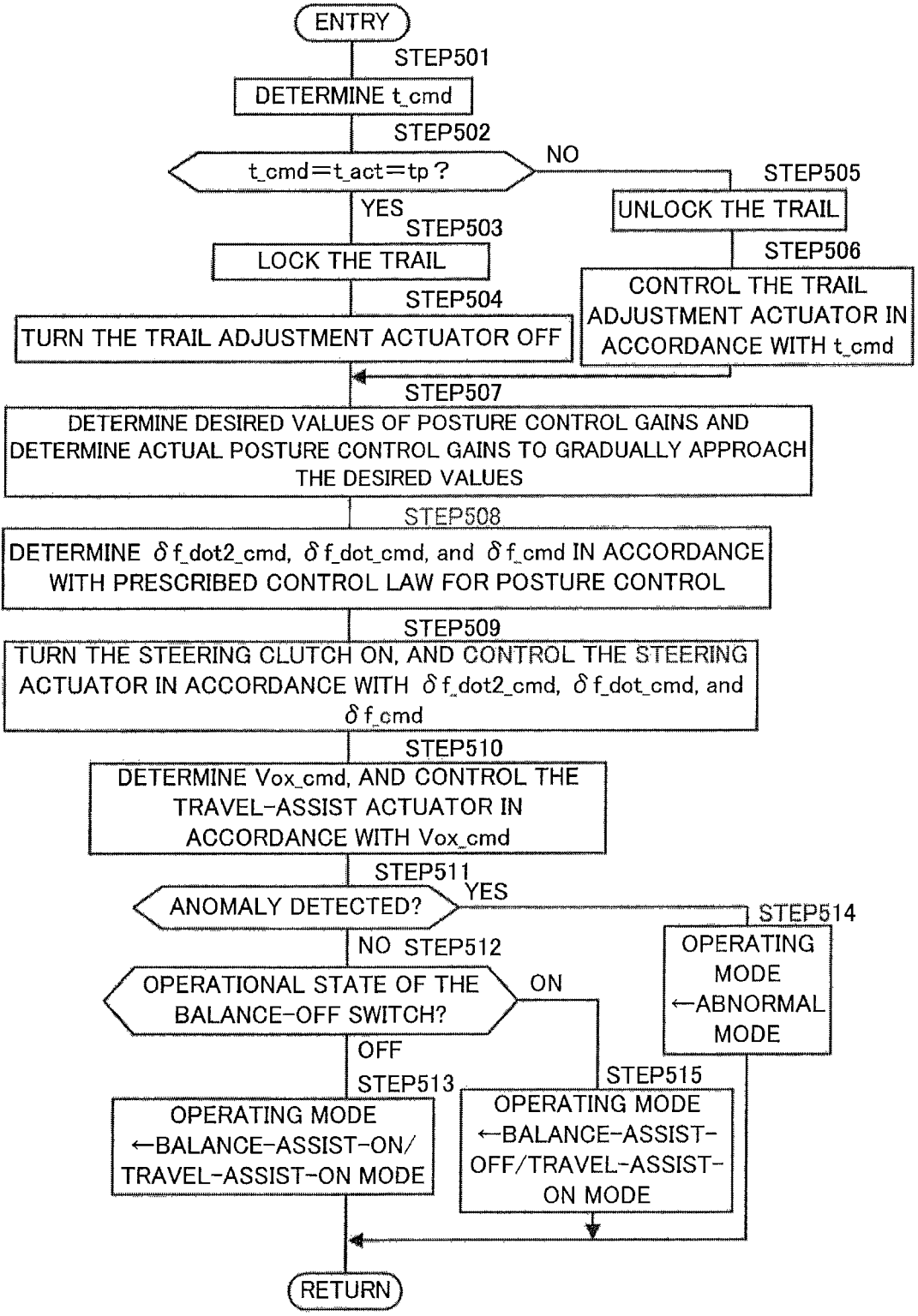
FIG. 20 is a flowchart showing the processing in the balance-assist-on/travel-assist-on mode in the flowchart in FIG. 14.

The processing in the balance-assist-on/travel-assist-on mode is carried out as shown by a flowchart in FIG. 20.

First, in STEPS 501 to 509, the control device 50 carries out the processes identical to those in STEPS 401 to 409 in the aforesaid balance-assist-on/travel-assist-off mode.

Next, in STEP 510, the control device 50 determines a desired vehicle speed Vox_cmd of the two-wheeled vehicle 1A, and controls the travel-assist actuator 27 in accordance with the desired vehicle speed Vox_cmd. The process in this STEP 510 is identical to that in STEP 309 in the aforesaid balance-assist-off/travel-assist-on mode.

Next, in STEP 511, the control device 50 carries out the determination process which is identical to that in STEP 107 in the aforesaid initialization mode. That is, the control device 50 determines whether a prescribed anomaly has been detected. If no anomaly has been detected, in STEP 512, the control device 50 determines the operational state of the balance-off switch 58.

If it is determined in STEP 512 that the balance-off switch 58 remains in the off state, in STEP 513, the control device 50 sets the operating mode in the next time's control processing cycle to the balance-assist-on/travel-assist-on mode (which is the same mode as in the current time's control processing cycle), and terminates the processing in the balance-assist-on/travel-assist-on mode in the current time's control processing cycle.

If it is determined in STEP 512 that the balance-off switch 58 has been turned on, in STEP 515, the control device 50 sets the operating mode in the next time's control processing cycle to the balance-assist-off/travel-assist-on mode, and terminates the processing in the balance-assist-on/travel-assist-on mode in the current time's control processing cycle.

Further, if it is determined in the aforesaid STEP 511 that an anomaly has been detected, in STEP 514, the control device 50 sets the operating mode in the next time's control processing cycle to the abnormal mode, and terminates the processing in the balance-assist-on/travel-assist-on mode in the current time's control processing cycle.

The above has described the processing in the balance-assist-on/travel-assist-on mode. With this processing, except for the case where an anomaly has been detected, or the balance-off switch 58 has been turned on, the operating mode in the next time's control processing cycle is maintained in the balance-assist-on/travel-assist-on mode. When an anomaly has been detected, or the balance-off switch 58 has been turned on, the operating mode in the next time's control processing cycle shifts to the abnormal mode, or the balance-assist-off/travel-assist-on mode, respectively.

In the balance-assist-on/travel-assist-on mode, as the rider manipulates the accelerator, the front wheel 3f is rotatively driven by the driving force of the travel-assist actuator 27, thereby allowing the two-wheeled vehicle 1A to travel by that driving force.

At the same time, in the balance-assist-on/travel-assist-on mode, primarily when the two-wheeled vehicle 1A is stopped or traveling in a low vehicle speed range, the front wheel 3f is steered by the steering force of the steering actuator 8, as appropriate, such that the posture in the roll direction of the vehicle body 2 is stabilized autonomously, as in the balance-assist-on/travel-assist-off mode.

Further, at this time, the control is performed such that the trail t matches the lower trail limit to (<0). This enables the posture control function according to the steering of the front wheel 3f to work effectively, to thereby enhance the stability of the posture in the roll direction of the vehicle body 2.

On the other hand, when the two-wheeled vehicle 1A is traveling in a high vehicle speed range, the control is performed such that the trail t matches the upper trail limit tp. In this case, the upper trail limit tp takes a positive value. This enables a proper self-steering function to work in the two-wheeled vehicle 1A, leading to improved operation stability.

In addition, when the two-wheeled vehicle 1A is traveling in a high vehicle speed range, the posture control function according to the steering of the front wheel 3f is sufficiently weakened, or set to a substantially disabled state. This allows the rider to readily bank the vehicle body 2 by shifting the body weight. Further, the rider can freely steer the front wheel 3f by operating the operation apparatus 7.

That is, during the traveling of the two-wheeled vehicle 1A in a high vehicle speed range, the rider can drive the two-wheeled vehicle 1A with the driving characteristics similar to those of a conventional two-wheeled vehicle.

Further, during the traveling of the two-wheeled vehicle 1A in a high vehicle speed range, in the state where the trail t_act matches the upper trail limit tp, the lock mechanism 15a is activated to fixedly hold the trail t_act at the upper trail limit tp. Therefore, in this state, the trail adjustment actuator 15 can be turned off to save the electricity otherwise consumed by the trail adjustment actuator 15. Further, the stiffness of the steering system of the front wheel 3f during the traveling of the two-wheeled vehicle 1A in a high vehicle speed range can be improved.

Figure 21:
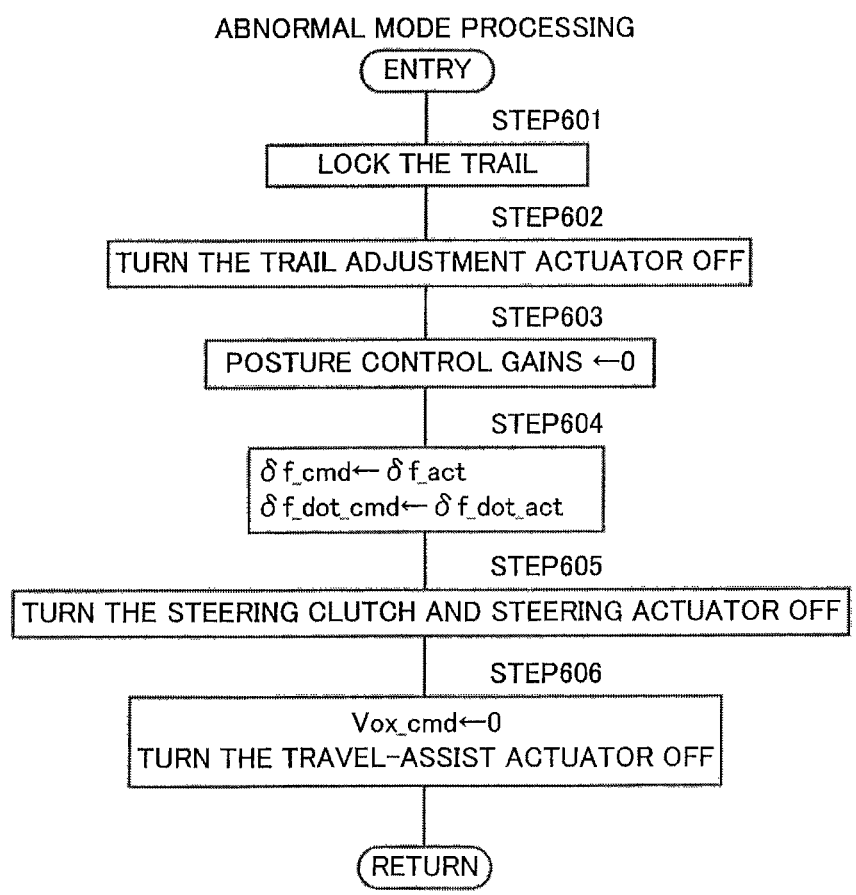
FIG. 21 is a flowchart showing the processing in the abnormal mode in the flowchart in FIG. 14.

The processing in the abnormal mode is carried out as shown by a flowchart in FIG. 21.

In STEPS 601 to 606, the control device 50 carries out the processes identical to those in STEPS 101 to 106 in the aforesaid initialization mode, and terminates the processing in the abnormal mode.

In this manner, the trail t is locked, and the actuators 8, 15, and 27 are set to the off state.

It should be noted that, in this case, a certain annunciator (alarm) provided at the operation apparatus 7 or the like gives the rider a warning (for example, visual or audio warning) that there has occurred an anomaly in the two-wheeled vehicle 1A.

The above has described the details of the control processing in the control device 50 according the present embodiment.

Here, the correspondence between the present embodiment and the present invention will be described. In the present embodiment, the control device 50 has the functions as the steering control section and the trail control section in the present invention.

In this case, the function as the steering control section is implemented by the processes in STEPS 407 to 409 in the aforesaid balance-assist-on/travel-assist-off mode, or by the processes in STEPS 507 to 509 in the aforesaid balance-assist-on/travel-assist-on mode.

The function as the trail control section is implemented by the processes in STEPS 401 to 404 in the balance-assist-on/travel-assist-off mode, or by the processes in STEPS 501 to 504 in the balance-assist-on/travel-assist-on mode.

In the function as the trail control section of the control device 50, the trail adjustment actuator 15 is controlled to change the trail t_act, in accordance with the vehicle speed Vox_act, between the upper trail limit tp (>0) and the lower trail limit to (<tp).

In this case, in a low vehicle speed range including the case where the vehicle speed Vox_act is zero (in the vehicle speed range of lower than Vox2 in the example shown in FIG. 23 or in the vehicle speed range of lower than Vox3 in the example shown in FIG. 24), the trail is controlled to a smaller value (=tn) than that in a high vehicle speed range (in the vehicle speed range of higher than Vox1 in the example shown in FIG. 23 or in the vehicle speed range of higher than Vox3 in the example shown in FIG. 24).

It should be noted that, in the example shown in FIG. 23, Vox1 and Vox2 correspond to the first prescribed speed and the second prescribed speed, respectively, in the present invention. In the example shown in FIG. 24, Vox3 corresponds to the first prescribed speed in the present invention.

Further, in the state where the trail t_act coincides, or almost coincides, with the upper trail limit tp, the swing section 14, corresponding to the mobile section in the present invention, is mechanically locked to be non-swingable, by the lock mechanism 15a. With this configuration, the trail t_act is mechanically held at tp, without the need of the driving force of the trail adjustment actuator 15.

Further, in the function as the steering control section of the control device 50, in order to stabilize the posture of the vehicle body 2, the steering actuator 8 (electric motor) is controlled to make the inverted pendulum mass point lateral movement amount and inverted pendulum mass point lateral velocity, each representing the motional state quantity of the inverted pendulum mass point 123, approach (or converge to) zero as their desired values (Pb_diff_y_cmd, Vby_cmd), and also make the steering angle and steering angular velocity, each representing the motional state quantity of the steering angle of the steered wheel (front wheel 3*f*), approach (or converge to) zero as their desired values.

Specifically, in the processing in the posture control arithmetic section 38, the desired front-wheel steering angular acceleration $\delta f\_dot2\_cmd$ as an operational target of the steering actuator 8 is determined, by a feedback control law, so as to cause a deviation of each of the estimated inverted pendulum mass point lateral movement amount Pb_diff_y_act, the estimated inverted pendulum mass point lateral velocity Vby_act, the last time's desired front-wheel steering angle $\delta f\_cmd\_p$, representing a pseudo estimate of the steering angle $\delta f$, and the last time's desired front-wheel steering angular velocity $\delta f\_dot\_cmd\_p$, representing a pseudo estimate of the steering angular velocity $\delta f\_dot$, from the corresponding desired value to converge to zero.

Further, the steering force of the steering actuator 8 is controlled by the control device 50 such that the actual steering angle of the front wheel 3*f* tracks a desired front-wheel steering angle $\delta f\_cmd$ which has been determined by performing integration twice on the above-described $\delta f\_dot2\_cmd$.

In this manner, the steering actuator 8 is controlled so as to stabilize the motional state quantity of the inverted pendulum mass point 123 and the motional state quantity of the steering angle of the front wheel 3*f* (steered wheel) and, hence, to stabilize the posture (in the roll direction) of the vehicle body 2.

It should be noted that the inverted pendulum mass point lateral movement amount Pb_diff_y has the meaning as the inclination state quantity in the present invention.

Supplementally, in the present embodiment, the lower trail limit tn, which is the desired trail t_cmd when the vehicle speed Vox_act is zero, takes a negative value. Accordingly, tn is the trail which satisfies the condition that a<a_sum (in other words, the condition that tn<a_sum*tan($\theta$cf)) and the condition that a≤a_s (in other words, the condition that tn≤a_s*tan($\theta$cf)). Further, tn is the trail which also satisfies the condition that a≤Rf (in other words, the condition that tn≤Rf*tan($\theta$cf)).

Further, in the present embodiment, the steering angular acceleration $\delta f\_dot2\_cmd$ of the front wheel 3*f* corresponds to the reference quantity in the present invention.

The aforesaid gains K1 and K2 each correspond to the sensitivity Ra of the change in value of the reference quantity ($\delta f\_dot2\_cmd$) to the change in observed value (Pb_diff_y_act, Vby_act) of the motional state quantity of the inclination state quantity. Further, the aforesaid gains K3 and K4 each correspond to the sensitivity Rb of the change in value of the reference quantity ($\delta f\_dot2\_cmd$) to the change in observed value ($\delta f\_act, \delta f\_dot\_act$) of the motional state quantity of the steering angle of the front wheel 3*f*.

In this case, the gains K1, K2, K3, and K4 are each determined with the above-described characteristic (shown in FIG. 29A) with respect to the observed value of the actual vehicle speed Vox_act of the two-wheeled vehicle 1A. Therefore, the steering force of the steering actuator 8 is controlled such that the magnitude of each of the above-described sensitivities Ra and Rb becomes smaller as the magnitude of the observed value of the vehicle speed Vox_act becomes larger.

Particularly, in the vehicle speed range of higher than the prescribed vehicle speed Vox5, the gains K1, K2, K3, and K4 each become zero (or almost zero), and accordingly, the above-described sensitivities Ra and Rb both become zero. Consequently, the steering actuator 8 enters the state where it generates substantially no steering force. It should be noted that the prescribed vehicle speed Vox5 corresponds to the third prescribed speed in the present invention.

Further, the gains K1 and K2 are each determined with the above-described characteristic (shown in FIG. 29B) with respect to the observed value ($\delta f\_cmd\_p$) of the steering angle $\delta f\_act$ of the front wheel 3*f*. Therefore, the steering force of the steering actuator 8 is controlled such that the magnitudes of the gains K1 and K2 each corresponding to the above-described sensitivity Ra become smaller as the magnitude of the observed value of the steering angle $\delta f\_act$ of the front wheel 3*f* from its non-steered state becomes larger.

Further, the gains K1 and K2 are each determined with the above-described characteristic (shown in FIG. 29C) with respect to the observed value of the trail t_act. Therefore, the steering force of the steering actuator 8 is controlled such that the magnitudes of the gains K1 and K2 each corresponding to the above-described sensitivity Ra become larger as the magnitude of the observed value of the trail t_act becomes larger.

Further, in the present embodiment, the aforesaid balance-assist-off/travel-assist-off mode and balance-assist-off/travel-assist-on mode correspond to the posture-control disabled mode in the present invention. In these balance-assist-off/travel-assist-off mode and balance-assist-off/travel-assist-on mode, the trail t_act is controlled to the upper trail limit tp (>0) as a constant trail. Further, the steering clutch 8*a*, corresponding to the clutch mechanism in the present invention, is set to the off state, and the power transmission between the steering actuator 8 and the front wheel 3*f* is interrupted.

According to the present embodiment described above, in a low vehicle speed range including the case where the vehicle speed Vox_act is zero, the trail t_act is controlled to the lower trail limit to which takes a negative value (the trail that satisfies the condition that a<a_sum or a≤a_s or a≤=Rf). Accordingly, when the posture of the vehicle body 2 of the two-wheeled vehicle 1A deviates from a desired posture (posture in the basic posture state in the present embodiment), steering of the front wheel 3*f* by the steering actuator 8 can make the posture quickly restored to the desired posture.

Further, in a high vehicle speed range, the trail t_act is controlled to the upper trail limit tp which takes a positive value. This can assure the operation stability of the two-wheeled vehicle 1A.

Further, in a high vehicle speed range, the posture control function is weakened, or set to a substantially disabled state. Therefore, in the case where a rider is riding the mobile vehicle at a vehicle speed in a high-speed range, the rider can readily bank the vehicle body of the mobile vehicle for turning.

[Modifications]

Several modifications related to the aforesaid embodiment will be described below.

In the aforesaid embodiment, the trail adjustment mechanism may have a structure different from the one illustrated in FIGS. 10 and 11. The trail adjustment mechanism for making the trail of the front wheel 3*f* adjustable may have any structure as long as the mechanism can adjust the trail of the front wheel 3*f* by an actuator. For example, the trail adjustment mechanism may be configured to use a ball screw mechanism or the like to move the front wheel 3f linearly in the longitudinal direction with respect to the aforesaid steering rotation section 12.

In the aforesaid embodiment, the rear wheel 3r is a non-steered wheel. Alternatively, the rear wheel 3r may be configured to be passively steered by, for example, the reaction force from the ground surface 110.

Further, in the aforesaid embodiment, as the motional state quantity of the inverted pendulum mass point 123, which is a constituent element of the controlled state quantities, the inverted pendulum mass point lateral movement amount Pb_diff_y and the inverted pendulum mass point lateral velocity Vby were used. Alternatively, the steering actuator 8 may be controlled, using only one of the above as the controlled state quantity related to the inverted pendulum mass point 123, to cause the one state quantity to approach its desired value.

Furthermore, as the motional state quantity of the steering angle of the steered wheel, which is another constituent element of the controlled state quantities, a value of the steering angle δf and its angular velocity δf_dot were used. Alternatively, the steering actuator 8 may be controlled, using only one of the above as the controlled state quantity related to the steering angle of the steered wheel, to cause the one state quantity to approach its desired value.

It should be noted that the desired value of the motional state quantity of the inverted pendulum mass point 123 (inverted pendulum mass point lateral movement amount Pb_diff_y, inverted pendulum mass point lateral velocity Vby) may be set to a value other than zero, as long as the value can stabilize the inverted pendulum mass point 123 and, hence, can stabilize the posture of the vehicle body 2 (preventing the posture in the roll direction of the vehicle body 2 from becoming unstable).

Further, the desired value of the motional state quantity of the steering angle (steering angle δf, steering angular velocity δf_dot) of the steered wheel may be set to zero. It should be noted that the desired value of the motional state quantity of the steering angle of the steered wheel may be set to a value other than zero, as long as the value can stabilize the inverted pendulum mass point 123 and, hence, can stabilize the posture of the vehicle body 2 (preventing the posture in the roll direction of the vehicle body 2 from becoming unstable).

The desired value of the motional state quantity of the inverted pendulum mass point 123 (inverted pendulum mass point lateral movement amount Pb_diff_y, inverted pendulum mass point lateral velocity Vby), or the desired value of the motional state quantity of the steering angle (steering angle δf, steering angular velocity δf_dot) of the steered wheel, may be a value which is determined in accordance with, for example, the force applied to the operation apparatus 7 by the rider, or the manipulated variable of the operation apparatus 7.

In the aforesaid embodiment, instead of controlling the inverted pendulum mass point lateral movement amount Pb_diff_y and the inverted pendulum mass point lateral velocity Vby, desired values may be set for the roll angle φb and its angular velocity of the vehicle body 2, for example, and the steering actuator 8 may be controlled so as to cause the actual roll angle (detected roll angle φb_act) and its angular velocity of the vehicle body 2 to approach the desired values, to thereby stabilize the posture of the vehicle body 2.

For example, in the aforesaid expression (55), instead of the deviations (Pb_diff_y_cmd−Pb_diff_y_act) and (Vby_cmd−Vby_act), a deviation of the detected roll angle φb_act from the desired value of the roll angle of the vehicle body 2 and a deviation of the detected value or estimate of the angular velocity (temporal change rate of the detected roll angle φb_act or the like) from the desired value of the angular velocity of the roll angle, respectively, may be used to determine the desired front-wheel steering angular acceleration δf_dot2_cmd as an operational target of the steering actuator 8.

Further, in this case, in determining the desired value of the roll angle φb, the centrifugal force during turning of the two-wheeled vehicle 1A may be taken into account. That is, the desired value of the roll angle φb may be determined such that a moment generated about the origin of the XYZ coordinate system in the direction about the X axis (roll direction) due to the gravitational force acting on the overall center of gravity G of the two-wheeled vehicle 1A and a moment generated about the origin of the XYZ coordinate system in the direction about the X axis (roll direction) due to the centrifugal force acting on the overall center of gravity G are balanced (so that the sum of the moments becomes "0").

In this case, the desired value of the roll angle φb (hereinafter, referred to as "desired roll angle φb_cmd") can be determined, for example, in the following manner. Hereinafter, the roll angle φb in the state where the moments generated about the origin of the XYZ coordinate system due to the gravitational force and the centrifugal force acting on the overall center of gravity G are balanced with each other will be called a "balanced roll angle φb_lean".

This balanced roll angle φb_lean is obtained approximately by the following expression (61).

$$\phi b\_lean = -Vox\_act * \omega z\_act / g \quad (61)$$

Here, ωz_act represents a turning angular velocity about the vertical axis (yaw rate) of the vehicle body 2. For this value, for example, a detected value of the yaw rate, which is indicated by an output from the aforesaid vehicle-body inclination detector 51 including the angular velocity sensor, may be used.

Alternatively, it may be obtained from, for example, an actual value of the aforesaid front-wheel effective steering angle δ'f (estimated front-wheel effective steering angle δ'f_act), an actual value of the rear-wheel effective steering angle δ'r (estimated rear-wheel effective steering angle δ'r_act), and an actual value of the vehicle speed Vox (estimated vehicle speed Vox_act) of the two-wheeled vehicle 1A, by the following expression (62).

$$\omega z\_act = Vox\_act * ((1/L) * \tan(\delta'f\_act) - (1/L) * \tan(\delta'r\_act)) \quad (62)$$

It should be noted that the rear-wheel effective steering angle δ'r corresponds to the rotational angle in the yaw direction of the rear wheel 3r. Therefore, the estimated rear-wheel effective steering angle δ'r_act, which is an estimate of the actual value δ'r_act of the rear-wheel effective steering angle δ'r, may be calculated by multiplying the detected value of the actual steering angle of the rear wheel 3r by a cosine value of the caster angle of the rear wheel 3r, for example, as in the case of calculating the estimated front-wheel effective steering angle δ'f_act.

In the case where the rear wheel 3r is a non-steered wheel, as in the case of the two-wheeled vehicle 1A described in the aforesaid embodiment, the computation of the expression (62) can be performed by setting: δ'r_act=0.

The balanced roll angle φb_lean calculated in the above-described manner may be determined as a desired value of the desired roll angle φb_cmd. Alternatively, a value obtained by multiplying φb_lean by a positive constant of 1 or less may be determined as the desired roll angle φb_cmd.

It should be noted that the desired roll angle φb_cmd may be "0" when the two-wheeled vehicle 1A is stopped before it starts moving, or when the vehicle speed Vox_act is sufficiently low.

Further, the desired value of the angular velocity of the roll angle φb may be set to zero. It should be noted that the desired value of the angular velocity of the roll angle φb may be set to a value other than zero, as long as the value can stabilize the posture of the vehicle body 2.

For example, the desired value of the angular velocity of the roll angle φb may be determined in accordance with the force applied to the operation apparatus 7 by the rider, or the like.

In the aforesaid embodiment, in the processing in the posture control arithmetic section 38, the desired front-wheel steering angular acceleration δf_dot2_cmd was determined as an operational target of the steering actuator 8.

Alternatively, a desired value of the torque about the steering axis Csf of the front wheel 3f may be determined instead of the desired front-wheel steering angular acceleration δf_dot2_cmd. Then, the steering force (torque) of the steering actuator 8 may be controlled to cause the actual torque about the steering axis Csf to match the desired value.

Further, in the aforesaid embodiment, the lower trail limit tn as a desired trail t_cmd at the time when the two-wheeled vehicle 1A is stopped or traveling in a low vehicle speed range was set to be negative. Consequently, the height a of the aforesaid intersection point Ef corresponding to the lower trail limit tn was made to take a negative value. Alternatively, the desired trail t_cmd at the time when the two-wheeled vehicle 1A is stopped or traveling in a low vehicle speed range may be determined to satisfy: a<a_sum, or a≤a_s, or a≤Rf, or a≤0.

Further, in the aforesaid embodiment, the description was made by giving, as an example, the case where the mass and the inertia moment were set only for the vehicle body 2. The mass or the inertia moment, however, may also be set for the front wheel 3f. In such a case as well, the two-wheeled vehicle 1A may be equivalently transformed to a system made up of an inverted pendulum mass point and a ground surface mass point, so that the posture of the vehicle body 2 can be controlled as in the aforesaid embodiment.

Further, similarly to a case where a variable related to the position of a mass point may be converted to a variable related to the angle of the line segment connecting the mass point and the origin, any one of the variables and constants used in the embodiment may be replaced with another variable or constant that has a one-to-one relationship therewith. Any variables or constants for which such replacement is possible can be regarded as equivalent to each other.

Furthermore, those equivalently transformed from the techniques, means, and algorithms shown in the above-described embodiment to produce the same result can be regarded as being identical thereto.

What is claimed is:

1. A mobile vehicle having a vehicle body and a front wheel and a rear wheel arranged spaced apart from each other in a longitudinal direction of the vehicle body, the front wheel being a steered wheel which can be steered about a steering axis, the mobile vehicle comprising:
a front-wheel support mechanism configured to support the front wheel so as to be steerable about the steering axis and having a trail adjustment mechanism which makes a trail of the front wheel adjustable;
a steering actuator which generates a steering force for steering the steered wheel;
a trail adjustment actuator which generates a driving force for changing the trail of the front wheel; and
a control device which controls the steering actuator and the trail adjustment actuator, wherein
the control device is configured to include
a steering control section which controls the steering actuator so as to stabilize a posture of the vehicle body in accordance with at least an observed value of an inclination angle in a roll direction of the vehicle body, and
a trail control section which controls the trail adjustment actuator in accordance with an observed value of a vehicle speed of the mobile vehicle such that at least the trail in a case where the observed value of the vehicle speed is zero becomes smaller than the trail in a case where the observed value of the vehicle speed is greater than a first prescribed speed,
wherein the steering control section is configured to control the steering actuator so as to stabilize controlled state quantities for stabilizing the posture of the vehicle body, wherein the controlled state quantities include a motional state quantity of an inclination state quantity which is a prescribed kind of state quantity having a value responsive to the inclination angle in the roll direction of the vehicle body and a motional state quantity of a steering angle of the front wheel.

2. The mobile vehicle according to claim 1, wherein the trail control section is configured to control the trail adjustment actuator such that the trail takes a prescribed positive value in the case where the observed value of the vehicle speed is greater than the first prescribed speed.

3. The mobile vehicle according to claim 1, wherein the trail control section is configured to control the trail adjustment actuator to make the trail match a prescribed upper trail limit in a case where the observed value of the vehicle speed is greater than the first prescribed speed, and control the trail adjustment actuator to make the trail match a prescribed lower trail limit which is smaller than the prescribed upper trail limit in a case where the observed value of the vehicle speed is zero, and wherein the trail control section is configured to control the trail adjustment actuator to make the trail match the prescribed lower trail limit while the observed value of the vehicle speed increases from zero to the first prescribed speed, control the trail adjustment actuator to make the trail match the prescribed upper trail limit when the observed value of the vehicle speed has exceeded the first prescribed speed and until the observed value of the vehicle speed drops below a second prescribed speed which is smaller than the first prescribed speed, and control the trail adjustment actuator to make the trail match the prescribed lower trail limit when the observed value of the vehicle speed has dropped below the second prescribed speed.

4. The mobile vehicle according to claim 3, further comprising a lock mechanism operable, at least in a state where the trail matches the prescribed upper trail limit, to lock a mobile section which is included in the trail adjustment mechanism and which moves in conjunction with a change of the trail.

5. The mobile vehicle according to claim 1, wherein the trail control section is configured to successively determine a desired trail as a desired value of the trail such that the desired trail changes continuously between a prescribed upper trail limit and a prescribed lower trail limit which is smaller than the prescribed upper trail limit in accordance with the observed value of the vehicle speed, and such that the desired trail becomes larger as the observed value of the vehicle speed becomes larger, and wherein the trail control section is configured to control the trail adjustment actuator to make an actual trail track the desired trail.

6. The mobile vehicle according to claim 5, further comprising a lock mechanism operable, at least in a state where the trail matches the prescribed upper trail limit, to lock a mobile section which is included in the trail adjustment mechanism and which moves in conjunction with a change of the trail.

7. The mobile vehicle according to claim 1, wherein in a case where a steering angular acceleration of the front wheel steered by the steering actuator or a torque about the steering axis applied to the front wheel from the steering actuator is defined as a reference quantity, the steering control section is configured to control the steering actuator such that a sensitivity Ra of the change in value of the reference quantity to the change in observed value of the motional state quantity of the inclination state quantity included in the controlled state quantities changes in accordance with the trail, with a characteristic that the sensitivity Ra becomes higher as the trail becomes larger.

8. The mobile vehicle according to claim 7, wherein the steering control section is configured to control the steering actuator such that the sensitivity Ra of the change in value of the reference quantity to the change in observed value of the motional state quantity of the inclination state quantity changes in accordance with the observed value of the vehicle speed, with a characteristic that the sensitivity Ra becomes lower as the vehicle speed becomes higher.

9. The mobile vehicle according to claim 7, wherein the steering control section is configured to control the steering actuator such that the sensitivity Ra of the change in value of the reference quantity to the change in observed value of the motional state quantity of the inclination state quantity changes in accordance with an observed value of the steering angle of the front wheel, with a characteristic that the sensitivity Ra becomes lower as a magnitude of the steering angle of the front wheel becomes larger.

10. The mobile vehicle according to claim 7, wherein the steering control section is configured to control the steering actuator such that the sensitivity Ra of the change in value of the reference quantity to the change in observed value of the motional state quantity of the inclination state quantity and sensitivity Rb of the change in value of the reference quantity to the change in observed value of the motional state quantity of the steering angle of the front wheel both become zero in the case where the observed value of the vehicle speed is greater than a third prescribed speed.

11. The mobile vehicle according to claim 1, wherein in a case where a steering angular acceleration of the front wheel steered by the steering actuator or a torque about the steering axis applied to the front wheel from the steering actuator is defined as a reference quantity, the steering control section is configured to control the steering actuator such that a sensitivity Rb of the change in value of the reference quantity to the change in observed value of the motional state quantity of the steering angle of the front wheel included in the controlled state quantities changes in accordance with the observed value of the vehicle speed, with a characteristic that the sensitivity Rb becomes lower as the vehicle speed becomes higher.

12. The mobile vehicle according to claim 11, wherein the steering control section is configured to control the steering actuator such that sensitivity Ra of the change in value of the reference quantity to the change in observed value of the motional state quantity of the inclination state quantity changes in accordance with the observed value of the vehicle speed, with a characteristic that the sensitivity Ra becomes lower as the vehicle speed becomes higher.

13. The mobile vehicle according to claim 11, wherein the steering control section is configured to control the steering actuator such that sensitivity Ra of the change in value of the reference quantity to the change in observed value of the motional state quantity of the inclination state quantity changes in accordance with an observed value of the steering angle of the front wheel, with a characteristic that the sensitivity Ra becomes lower as a magnitude of the steering angle of the front wheel becomes larger.

14. The mobile vehicle according to claim 11, wherein the steering control section is configured to control the steering actuator such that sensitivity Ra of the change in value of the reference quantity to the change in observed value of the motional state quantity of the inclination state quantity and the sensitivity Rb of the change in value of the reference quantity to the change in observed value of the motional state quantity of the steering angle of the front wheel both become zero in the case where the observed value of the vehicle speed is greater than a third prescribed speed.

15. The mobile vehicle according to claim 1, wherein
the control device has a posture-control disabled mode which is an operating mode in which the control of the steering actuator by the steering control section is disabled, and in the posture-control disabled mode, the trail control section is configured to control an actual trail to become a prescribed trail determined in advance, and
the mobile vehicle further comprises a clutch mechanism which interrupts power transmission between the steering actuator and the front wheel in the posture-control disabled mode.

* * * * *